United States Patent
Lee

(10) Patent No.: US 9,858,255 B1
(45) Date of Patent: Jan. 2, 2018

(54) COMPUTER-IMPLEMENTED METHOD AND SYSTEM FOR AUTOMATED CLAIM CONSTRUCTION CHARTS WITH CONTEXT ASSOCIATIONS

(76) Inventor: Eugene M. Lee, Annandale, VA (US)

(*) Notice: Subject to any disclaimer, the term of this patent is extended or adjusted under 35 U.S.C. 154(b) by 1300 days.

(21) Appl. No.: 13/338,098

(22) Filed: Dec. 27, 2011

Related U.S. Application Data

(63) Continuation of application No. 10/891,478, filed on Jul. 15, 2004, which is a continuation-in-part of application No. 10/725,531, filed on Dec. 3, 2003, now Pat. No. 7,885,987, which is a continuation-in-part of application No. 10/692,793, filed on Oct. 27, 2003, which is a continuation-in-part (Continued)

(51) Int. Cl.
*G05D 1/00* (2006.01)
*G05D 3/00* (2006.01)
*G06F 7/00* (2006.01)
*G06F 17/27* (2006.01)

(52) U.S. Cl.
CPC .................... *G06F 17/27* (2013.01)

(58) Field of Classification Search
CPC ..... G06Q 8/35; G06F 17/27; G06F 17/30011; G06F 17/30477; G06F 17/3053; G06F 17/305554
See application file for complete search history.

(56) References Cited

U.S. PATENT DOCUMENTS 5,175,681 A   12/1992   Iwai et al.
5,623,679 A   4/1997    Rivette et al.

(Continued)

FOREIGN PATENT DOCUMENTS

JP   A-10-171843   6/1998
JP   A-11-039394   2/1999

(Continued)

OTHER PUBLICATIONS

'Patent Claim Interpretation After Markman How the Federal Circuit Interprets Claims': Romary, 46 Am. U.L. Rev. 1887 (1996-1997) pp. 1887-1933.*

(Continued)

*Primary Examiner* — Stanley K Hill
*Assistant Examiner* — Peter Coughlan
(74) *Attorney, Agent, or Firm* — Posz Law Group, PLC

(57) ABSTRACT

A system correlates intellectual property analyzes, for example, patent claim charts, with respect to analyzed intellectual property and a target product or other intellectual property. Analyzes are stored to enable searching and/or creating reports over multiple analyzes. Units of the analysis are associated with a context, inherited, e.g., from the intellectual property document's assignment to a relative role within organizational hierarchy; and associated with a context derived from the analysis itself. The analysis and respective documents and/or targets of the analysis can be searched/retrieved/analyzed from the hierarchical analysis, the context analysis, and/or the content of the analysis. This obviates the need to store each analysis as a separate document. The target or annotations may be visually represented by an item such as a thumbnail or hyperlink, and the system automatically associates the item with the appropriate application program.

18 Claims, 39 Drawing Sheets

Related U.S. Application Data of application No. 10/229,273, filed on Aug. 28, 2002.

(60) Provisional application No. 60/315,021, filed on Aug. 28, 2001.

(56) References Cited

U.S. PATENT DOCUMENTS

| | | | |
|---|---|---|---|
| 5,721,910 A | | 2/1998 | Unger et al. |
| 5,754,840 A | | 5/1998 | Rivette et al. |
| 5,774,833 A | * | 6/1998 | Newman ............................ 704/9 |
| 5,819,092 A | | 10/1998 | Ferguson et al. |
| 5,895,468 A | | 4/1999 | Whitmyer, Jr. |
| 5,991,751 A | | 11/1999 | Rivette et al. |
| 5,995,947 A | | 11/1999 | Fraser et al. |
| 6,029,141 A | | 2/2000 | Bezos et al. |
| 6,038,561 A | * | 3/2000 | Snyder et al. |
| 6,048,801 A | | 4/2000 | Whitmyer, Jr. |
| 6,049,811 A | | 4/2000 | Petruzzi et al. |
| 6,115,690 A | | 9/2000 | Wong |
| 6,134,563 A | * | 10/2000 | Clancey et al. .............. 715/210 |
| 6,154,725 A | | 11/2000 | Donner |
| 6,195,646 B1 | | 2/2001 | Grosh et al. |
| 6,236,972 B1 | | 5/2001 | Shkedy |
| 6,263,314 B1 | | 7/2001 | Donner |
| 6,298,327 B1 | | 10/2001 | Hunter et al. |
| 6,339,767 B1 | | 1/2002 | Rivette et al. |
| 6,385,594 B1 | | 5/2002 | Lebda et al. |
| 6,434,580 B1 | | 8/2002 | Takano et al. |
| 6,499,026 B1 | | 12/2002 | Rivette et al. |
| 6,549,894 B1 | | 4/2003 | Simpson et al. |
| 6,574,645 B2 | | 6/2003 | Petruzzi et al. |
| 6,604,135 B1 | | 8/2003 | Rogers et al. |
| 6,606,744 B1 | | 8/2003 | Mikurak |
| 6,662,178 B2 | | 12/2003 | Lee |
| 6,694,331 B2 | | 2/2004 | Lee |
| 6,789,092 B1 | | 9/2004 | Oppedahl et al. |
| 6,877,137 B1 | | 4/2005 | Rivette et al. |
| 6,978,253 B2 | | 12/2005 | Lin |
| 7,016,851 B1 | | 3/2006 | Lee |
| 7,117,443 B1 | | 10/2006 | Zilka |
| 7,716,060 B2 | | 5/2010 | Germeraad et al. |
| 7,849,117 B2 | | 12/2010 | Barnett et al. |
| 8,041,739 B2 | | 10/2011 | Glasgow |
| 2001/0049707 A1 | | 12/2001 | Tran |
| 2002/0022974 A1 | * | 2/2002 | Lindh ............................... 705/3 |
| 2002/0059076 A1 | | 5/2002 | Grainger et al. |
| 2002/0069154 A1 | | 6/2002 | Fields |
| 2002/0073095 A1 | | 6/2002 | Ohga |
| 2002/0111824 A1 | | 8/2002 | Grainger |
| 2002/0116363 A1 | | 8/2002 | Grainger |
| 2002/0143760 A1 | | 10/2002 | Kim et al. |
| 2002/0161733 A1 | | 10/2002 | Grainger |
| 2002/0165707 A1 | | 11/2002 | Call |
| 2003/0046307 A1 | | 3/2003 | Rivette et al. |
| 2003/0191654 A1 | | 10/2003 | Panchal |
| 2004/0230574 A1 | | 11/2004 | Kravets |
| 2006/0259321 A1 | | 11/2006 | Gabrick et al. |
| 2007/0005374 A1 | | 1/2007 | Harkin |

FOREIGN PATENT DOCUMENTS

| | | |
|---|---|---|
| JP | A-11-134399 | 5/1999 |
| WO | WO 98/26343 | 6/1998 |

OTHER PUBLICATIONS http://www.inventnet.com, printed Jan. 22, 2003, 5 pages.
http://www.inventnet.com, printed Jan. 21, 2003, 11 pages.
http://www.lloydwise.com, printed Jan. 21, 2003, 21 pages.
Lasinski, M. and D. Davison, "Systems & Tools for Visualizing & Organizing IP Portfolios to Meet Business & Licensing Objectives," LES Annual Meeting, San Antonio, Texas, Oct. 27, 1999, 18 sheets.
Lucas, Carl, "Visualization of Intellectual Property: Visualization Framework, Patent Maps, Patent Trees," LES Annual Meeting, San Antonio, Texas, Oct. 27, 1999, 19 sheets.
Aureka 7.0: Open Platform for Intellectual Property Asset Management, materials distributed at 1999 LES Annual Meeting, San Antonio, Texas, Oct. 24-27, 1999, 18 pages.
Pruzin, Daniel, "WIPO Outlines Nine-Point Agenda for Tackling IP Protection on Internet," *Electronic Commerce & Law Report*, vol. 4, No. 36, BNA, Sep. 22, 1999, pp. 849-850.
Tapling, Peter, Aurigin, Presentation at Licensing Executives Society Michigan Chapter Meeting, Sep. 17, 1999, 32 pages.
Computer Packages, Inc., CPI Homepage, http://www.computerpackages.com, printed Jul. 28, 1999, 14 pages.
Herhold, Scott, "Patent War Pending: Once-arcane field emerges as battleground between online start-ups and established companies," *San Jose Mercury News*, Jul. 18, 1999, pp. 1-7.
Lovett, Wayne J., "Choosing the Right IP Software," *IP Worldwide*, Mar./Apr. 1999, pp. 31-34.
Lovett, Wayne J., "Special Report: The New Essentials for Managing IP: Choosing the Right IP Software," *IP Worldwide*, Mar./Apr. 1999, 11 pages.
Stephens, Keith, "Creating and Implementing the IP Plan," *IP Worldwide*, Mar./Apr. 1999, pp. 35-37.
"EPC & PCT forms," http://web.archive.org/web/19980703181993/www.epo.co.at/eop/formul/index.htm, printed Mar. 24, 2004, 11 pages.
"PTO Forms," http://web.archive.org/web/19900128095111/www.uspto.gov/web/forms, printed Mar. 24, 2004, 5 pages.
Stephens, Keith, "Creating and Implementing the IP Plan," *IP Worldwide*, Mar./Apr. 1999, 7 pages.
Woodbridge, Richard C. and Paul A. Gardon, "Selecting an IP Docket Management System," *Intellectual Property Today*, Jan. 1999, pp. 25-27.
http://web.archive.org/web/19980224075432/www.lightlink.com/bbm/, printed Mar. 24, 2005, 28 pages.
PCT-Easy, User Reference Manual, PCT-Easy V 2.80, WIPO (www.wipo.int/) Jan. 1999.
"Enabling the Virtual Enterprise: the Supply Chain Meets the Demand Chain," The Yankee Group, 1998.
http://web.archive.org/web/19981206010357/www.inventnet.com, printed Mar. 24, 2004, 11 pages.
Vollendorf, Stefanie, "IP Docketing Software—A Practical Tool," *Intellectual Property Today*, May 1998, pp. 54-56 and 58.
Dutton, Gail, "Protecting Intellectual Property," *Chemical Market Reporter*, Mar. 23, 1998.
http://web.archive.org/web/19961219063059/http://www.inventnet.com, printed Nov. 7, 1996, 14 pages.
Forstner, James A. "Managing international patent litigation," *Managing Intellectual Property Litigation Yearbook*, 1995, pp. 3-6.
Stallings, William, Ph.D., "*Computer Organization and Architecture*", MacMillan Publishing Company, 1993, preface and contents, pp. iii-x.
Spohn, Darren L. "*Data Network Design*", McGraw-Hill, Inc., 1993, contents and preface, pp. vii-xxx.
Gitlin, Richard D., Jeremiah F. Hayes, and Stephen B. Weinstein, "*Data Communications Principles*", Plenum Press, 1992, preface and contents, pp. vii-xix.
Green, James Harry, "*The Irwin Handbook of Telecommunications*", Irwin Professional Publishing, 2d ed., 1992, preface and table of contents, pp. iii-xv.
Gisler et al., eGovernment Experiences of the Swiss Federal Institute of Intellectual Property, IEEE Database and Expert Systems Applications, 2000 Proceedings, 11th International Workshop, pp. 278-281, Sep. 4-8, 2000.
Cappellini et al., Copyright Protection of Cultural Heritage Multimedia Data through Digital Watermarking Techniques, IEEE Database and Expert Systems Applications, 2000 Proceedings, 11th International Workshop, pp. 935-939, Sep. 4-8, 2000.
Manual of Patent Examining Procedures, Eighth Edition, revised Sep. 2007, pp. 2100-2101, 2100-2175, 2100-2188, 2100-2234, 2100-2235, 2100-2236, 2100-2237, 2100-2240, 2100-2241, 2100-2243, 2100-2244, and 2100-2247.

* cited by examiner

MARKUP - LIC: BANDAGES-R-US.20010910

SECTION 1.1

PAT: US03885559

LIC: STICKY-STUFF-ADHESCO.19980301
PAT: US03885559
PROD: BAND-ITS.39L007Q

CONFLICTS

○ YES
● POSSIBLE
○ NO
☐ SIMILAR

IT'...
IIN...
AR... ...
OUR USE OF MULTIPLE ADHESIVE LAYERS DOES
NOT VIOLATE THIS CLAIM, EVEN THOUGH HENRY
Q. QUESTIONS THIS. GIVEN THE PERFORATED
SUBSTRATE USED IN OUR BAND-ITS PRODUCT,

NAME: HARVEY WALLENBARGER   DATE: 10/12/02

| CONFORMANCE | NOTES | HISTORY | ATTRIBUTES |

FIG. 5

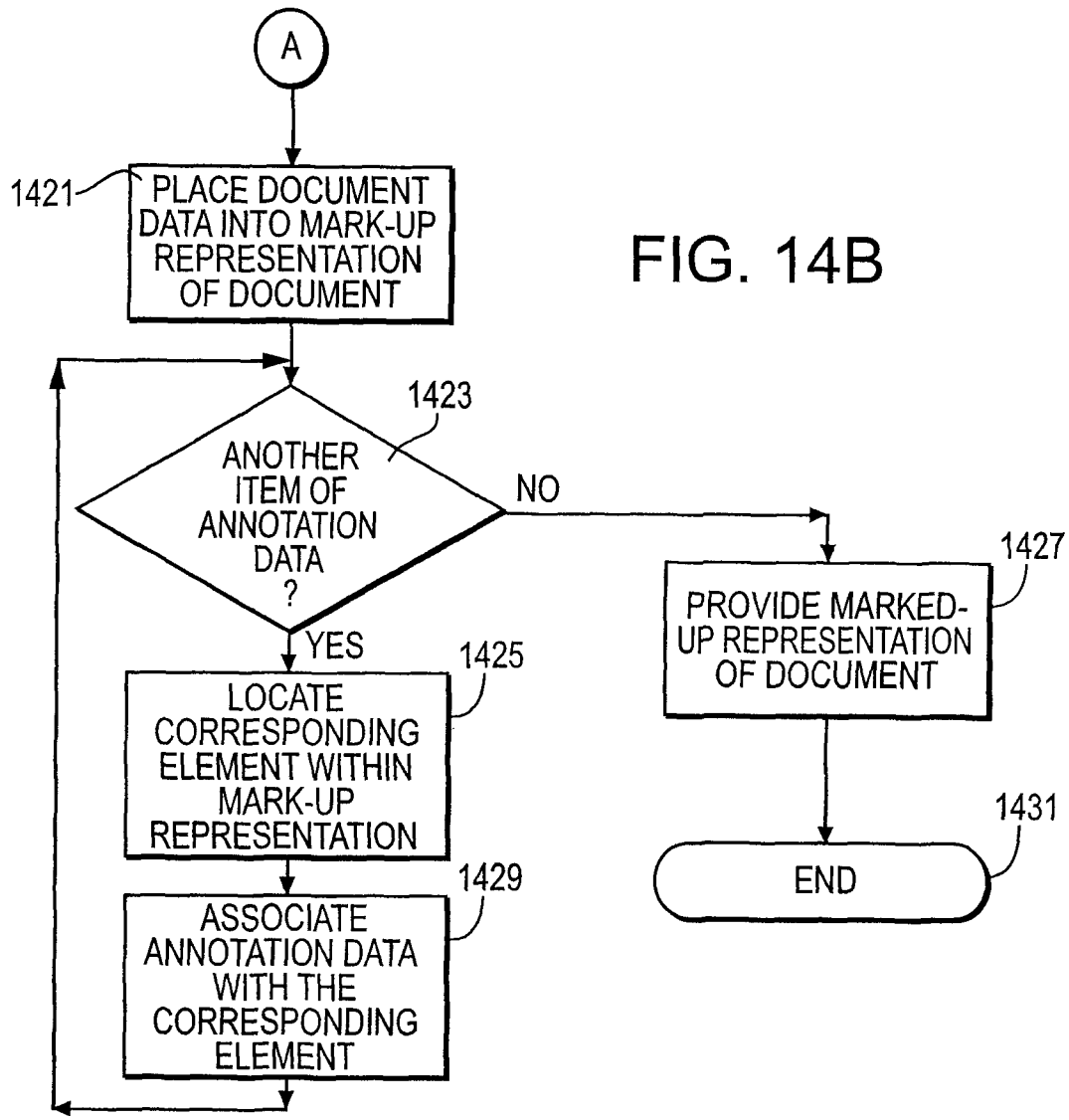

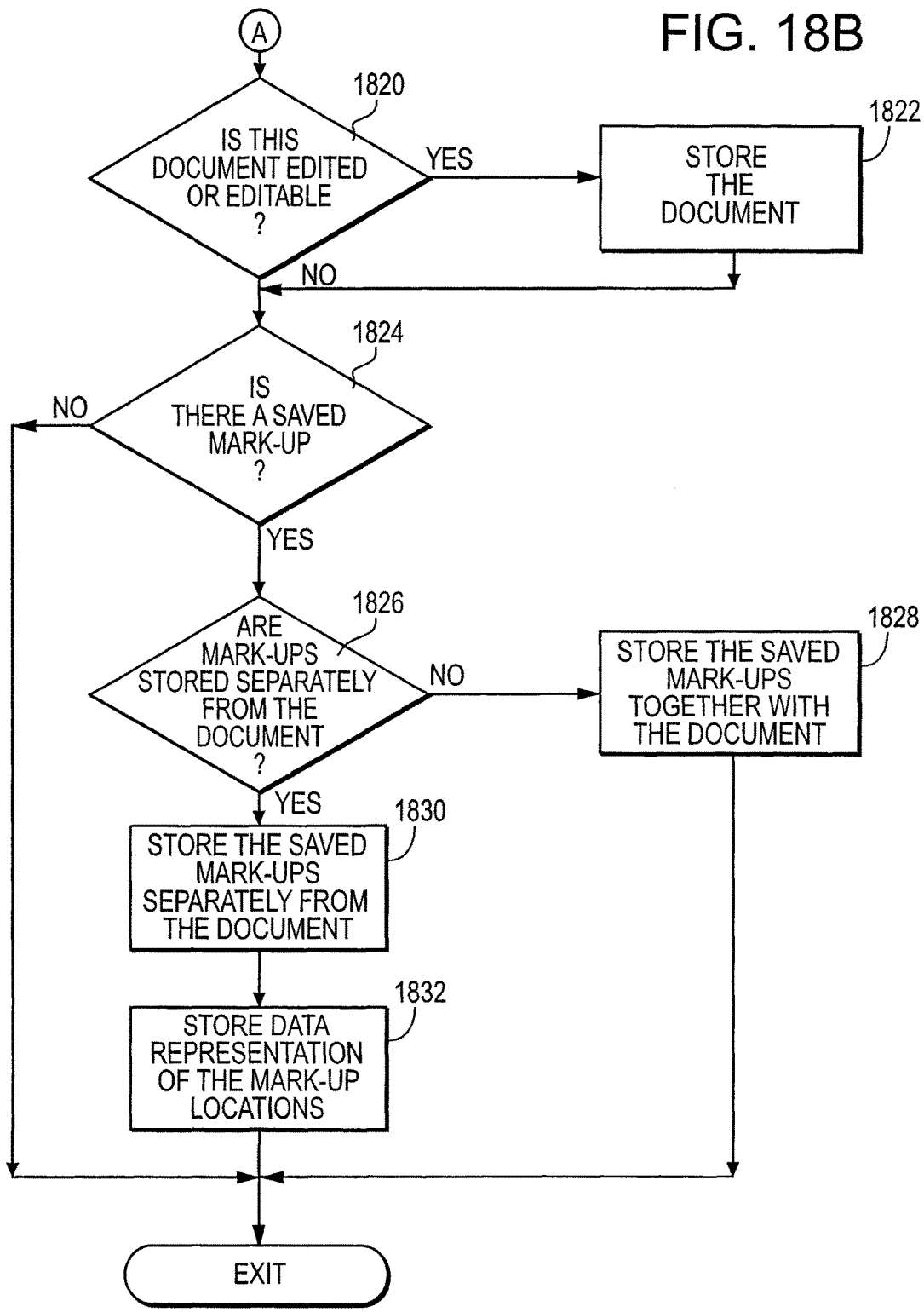

| CLAIM # | CLAIM LANGUAGE | ANNOTATIONS | CONFORMANCE | | |
|---|---|---|---|---|---|
| | | | Y | N | ? |
| 1 | PREAMBLE-INDEPENDENT | | | | |
| | ELEMENT 1 | | | | |
| | ELEMENT 2 | | | | |
| | ELEMENT 3 | | | | |
| 2 | PREAMBLE-DEPENDENT | | | | |
| | ELEMENT 4 | | | | |
| | ELEMENT 5 | | | | |
| 3 | PREAMBLE-DEPENDENT | | | | |
| | ELEMENT 6 | | | | |
| | ELEMENT 7 | | | | |
| 4 | PREAMBLE-DEPENDENT | | | | |
| | ELEMENT 8 | | | | |
| | ELEMENT 9 | | | | |

FIG. 24

| CLAIM # | CLAIM LANGUAGE | COMPARISON OBJECT | CONFORMANCE | | | ANNOTATIONS | ATTACHMENT / REFERENCE |
|---|---|---|---|---|---|---|---|
| | | | Y | N | ? | | |
| 1 | PREAMBLE-INDEPENDENT | | | | | | |
| | ELEMENT 1 | | | | | | |
| | ELEMENT 2 | | | | | | |
| | ELEMENT 3 | | | | | | |
| 2 | PREAMBLE-DEPENDENT | | | | | | |
| | ELEMENT 4 | | | | | | |
| | ELEMENT 5 | | | | | | |
| 3 | PREAMBLE-DEPENDENT | | | | | | |
| | ELEMENT 6 | | | | | | |
| | ELEMENT 7 | | | | | | |
| 4 | PREAMBLE-DEPENDENT | | | | | | |
| | ELEMENT 8 | | | | | | |
| | ELEMENT 9 | | | | | | |

FIG. 25

| CLAIM # | CLAIM TYPE | REF. CLAIM | CLAIM LANGUAGE | COMPARISON OBJECT | CONFORMANCE Y | CONFORMANCE N | CONFORMANCE ? | ANNOTATIONS |
|---|---|---|---|---|---|---|---|---|
| 1 | I | 0 | PREAMBLE-INDEPENDENT | | | | | |
| | | | ELEMENT 1 | | | | | |
| | | | ELEMENT 2 | | | | | |
| | | | ELEMENT 3 | | | | | |
| 2 | D | 1 | PREAMBLE-DEPENDENT | | | | | |
| | | | ELEMENT 4 | | | | | |
| | | | ELEMENT 5 | | | | | |
| 3 | D | 2 | PREAMBLE-DEPENDENT | | | | | |
| | | | ELEMENT 6 | | | | | |
| | | | ELEMENT 7 | | | | | |
| 4 | D | 1 | PREAMBLE-DEPENDENT | | | | | |
| | | | ELEMENT 8 | | | | | |
| | | | ELEMENT 9 | | | | | |

FIG. 26

| GRAPHICAL REPRESENTATION OF THE RETRAINING AND SELECTION AREA | | | |
|---|---|---|---|
| POTENTIAL INVALIDATING OR INFRINGING ART | RELEVANCE RANKING | USER RANKING | OTHER INFORMATION |
| PATENT A | 1.000 | 3 | |
| TECHNICAL PAPER | 0.88 | 1 | |
| PATENT B | 0.85 | 1 | |
| PATENT C | 0.75 | 2 | |
| TECHNICAL PAPER | 0.62 | 3 | |
| PATENT D | 0.60 | 3 | |
| DATA BOOK | 0.42 | 2 | |
| NEWS ARTICLE | 0.41 | 1 | |
| IEEE BOOK | 0.32 | 1 | |

COMPUTER-IMPLEMENTED METHOD AND SYSTEM FOR AUTOMATED CLAIM CONSTRUCTION CHARTS WITH CONTEXT ASSOCIATIONS

RELATED APPLICATIONS

This application is a continuation of U.S. application Ser. No. 10/891,478, filed on Jul. 15, 2004, which is a continuation-in-part of U.S. application Ser. No. 10/725,531, filed Dec. 3, 2003, which is a continuation-in-part of U.S. application Ser. No. 10/692,793, filed Oct. 27, 2003, which is a continuation-in-part of U.S. application Ser. No. 10/229,273 filed Aug. 28, 2002, which claims priority from U.S. Provisional Application Ser. No. 60/315,021, filed Aug. 28, 2001, all of which are expressly incorporated herein by reference.

BACKGROUND OF THE INVENTION

Field of the Invention

The present invention is directed to computer-related and/or assisted systems, methods and computer readable mediums for creating and optionally automating intellectual property analyses, e.g., claim charts; and sorting, organizing, reporting and/or providing analysis documents in connection with the analyses.

Description of the Related Art

Many corporations are focusing on their intellectual property assets as being quite valuable. Hence these companies strive to develop large intellectual property portfolios, and indeed spend time and money on these assets. There is a concomitant pressure to leverage and/or better manage these portfolios of intellectual property assets. As a result, a great deal of emphasis has been placed on better ways to analyze the value of a portfolio, better processes for managing the portfolio and better strategies for creating opportunities to extract value from the portfolio.

One of the many ways corporations analyze their intellectual property assets is by analyzing the validity of the intellectual property asset, or by comparing the intellectual property to their own products or products of another company. Preparation of the comparison or analysis, such as in a claim chart, is painstaking, though portions may be rote. Each individual analysis or comparison is discrete.

Perhaps because the individual analyses are discrete and painstaking, various attempts have been made to analyze the relevance of intellectual property documents as a group, or to automate portions of the analysis process. Some aspects of conventional systems are illustrated by way of example in FIG. 33, also described in U.S. Pat. No. 6,665,656, Carter (expressly incorporated herein by reference). Carter provides an example illustration, in a table, of a rank-ordered output of correlating information related to an asset (e.g., infringement or invalidity references related to a patent) after performing a search. The displayed information 3301 includes a list of retrieved documents, such as potentially invalidating or infringing references 3305, a relevance ranking 3302, a user ranking 3304 and other optional information fields 3303. In this particular illustrative example, the target document input from the user is labeled Patent A. An ontology builder can parse the terminology within a target patent (or other document), determine relationships between terms in the document, and determine which terms in the document are more dominant than others. There is a high correlation of the target document to itself, thus, the first entry in the displayed information table 3305 is the target document Patent A. The relevance ranking for Patent A is 1.000, the highest correlation rank. The relevance ranking is a correlation indicator between a comparison of the ontology for the target document and an ontology created for the listed document. In addition to correlation, the user may rank the documents based or other criteria, such as company owner, date, perceived importance, or other factors. In the particular example, various technical papers, patents, data books, and other information sources such as news articles, SEC filings, data books of competitors web sites, IEEE industry standard documents, and the like are listed.

Another aspect of conventional systems is illustrated in FIG. 34, also described in U.S. Pat. No. 6,038,561, Snyder et al. (expressly incorporated herein by reference), concerning analyzing and displaying information contained in multiple documents employing both term-based analysis and conceptual-representation analysis, for, e.g., analyzing patent texts, such as patent claims, abstracts and other portions of a patent document. Snyder illustrates the steps to produce an S-curve for analyzing documents from Company A verses documents from Company B. The process depicted in the flow chart 3401 begins with the generation of all scores (either term or concept) from a claim level data set A versus data set B analysis 3450. For example, the patents from Company A compared with the patents from Company B on a claim by claim basis. These scores are in the range of 0.0 to 1.0. Next, in step 3452, all claims are sequentially numbered such that the first claim from Company A is 1 and the last claim from Company B is n and all claims from A precede all claims from B. In step 3454, for each claim index I from Company A the closest claim from Company B is found, and the pair (I, S-1.0) where S is the similarity score of A compared with B is recorded. Next, in step 3456, for each claim index I from Company B the closest claim from company A is found, and the pair (I, 1.0-S) where S is the similarity score of A compared to B is recorded. Finally, in step 3458, all pairs are sorted in increasing order of second coordinate and displayed on a plot where the x-axis represents the claim index and the y-axis represents the claim score. The result is a plot in the form of an S-curve where the bottom part of the S represents claims unique to company A; the middle part represents claims with possible overlaps between the two companies, and the top part represents claims unique to Company B.

FIG. 35 illustrates other aspects of conventional systems, also described in U.S. Pat. No. 5,774,833, Newman (expressly incorporated herein by reference). Newman is an example of syntactic and semantic analysis of patent text and drawings. Newman discloses a method for processing patent text 3501 in a computer, including identifying boundaries of parts of patent text 3502, selecting a section of the patent text 3503, loading at least one of the parts of the patent text into a working memory 3204, analyzing at least one of the parts of the patent text 3505, and reporting results 3506 to a user. Patent text sections generally include the title, the field of the invention, background of the invention, summary of the invention, brief description of the drawings, detailed description of the drawings (or preferred embodiments), claims, and the abstract of the invention. Identification of claim elements can be accomplished with a combined syntactic and semantic analysis of the claim wording. Alphanumeric drawing data can also be compared to patent text. Newman can loop through more sections 3508, selecting the next section 3509 until done 3507. Newman's invention can be coupled to work with a word processor program. Newman can recognize and report, e.g., claim dependency specific characteristics of patent text.

While these management and analysis techniques have resulted in more efficient use of attorney resources, and more targeted intellectual property filings and funding, relatively little has been done to take advantage of current computational technologies, the integration of data resources (largely through the Internet), and better knowledge-based software systems to handle aspects of intellectual property. As a result, no process or product exists for handling the full range of intellectual property functions in an automated manner.

Accordingly, there exists a need in the market for a comprehensive system that incorporates tools that will give the intellectual property professional the ability to work in all aspects of their practice area using automated, analysis tools to assist them in their practice.

Moreover, many corporations have a wide range of intellectual property assets, but no technique to make associations between assets. For example, a particular license may implicate several patents. Conventional systems do not support the association of the intellectual property assets, and they certainly do not support a memorialized explanation of the association. Even if a user is able to determine a few related intellectual property assets, the problem of determining associated intellectual property assets grows geometrically more complex with the number of intellectual property assets.

Accordingly, I have determined that the complexities affecting the analysis, use, accessing, researching, presenting, etc., of intellectual property and related information make it extremely difficult for a customer to integrate information in various scenarios. I have determined that a customer might want to create or provide an analysis of intellectual property (e.g., a patent claim chart, a trademark comparison chart, a copyright comparison chart, etc.) for multiple products, patents, and/or other intellectual property; and a customer that has, e.g., multiple analyses such as claim charts might be able to leverage an analysis of intellectual property coverage. A customer might desire to automate some or all of the process of creating a claim chart (or other infringement or comparison analysis), in particular as it relates to other intellectual property and/or other analyses. In addition, a customer might want to determine, e.g. which patents (or other intellectual property documents, including trademarks, copyrights, etc.) and/or analyses are implicated by and/or related to, for example, a particular component, a particular product, a particular technology, a license for a particular product, a company, a corporate division, a type of service, or other, perhaps company-specific, criteria. I have further determined that a customer might want to ascertain the intellectual property documents and analyses that are related on multiple levels, optionally including details relating to the relationships. There exists a profound need for such a method and/or system.

BRIEF SUMMARY OF THE INVENTION

I therefore contemplate providing methods and/or computer systems that will provide an automated or semi-manual process for searching, editing, reporting, analyzing, and/or viewing intellectual property analyses; and/or for assisting the creation of intellectual property analysis, e.g., claim charts and comparison charts, including, e.g., automatic evaluation, automatic population of claim language with collapsing/expanding rows and accommodation of chemical formulas, equations and other non-standard format components. One or more aspects of the present invention provides for context to be assigned to analyses, and to relationships between intellectual property assigned to the analyses. I further propose to provide, in one or more embodiments of the present intention, optional claim chart presentations, e.g., a static chart with items embedded therein, a dynamic chart, and optional features, e.g., dependencies. I further propose that one or more aspects of the invention provide for analysis of various types of intellectual property, e.g., patents, trademarks, and/or copyrights. Further, one or more aspects of the invention may be adapted to traditional analysis, e.g., infringement, product coverage, validity, and/or design around. One or more aspects of the present invention provide that the analyses of intellectual property documents themselves may be sorted, organized, reported, and or analyzed, e.g., through contexts of the analyses and/or relationships of intellectual property documents assigned to the analyses. Related tools are optionally included.

Consequently, the present invention alleviates the deficiencies of conventional techniques described above. Aspects of the present invention provide for the significant improvement of the management of intellectual property, by for example, enabling personnel to document the associations between various intellectual properties, to analyze various intellectual properties in context of a company, its partners, and/or competitors, to automate the analysis, and/or to relate the various analyses, optionally to products and/or services, and/or provide annotations capturing their conclusions from analyzing those associations.

By way of example, a clause within a sublicense agreement may reference a paragraph within an original license agreement, a spreadsheet containing royalty payment schedules, a copyright registration, and/or a photograph of the cover of a book. Furthermore, a clause within the sublicense may have textual and/or multimedia annotations, explanations, etc. containing comments by attorneys and/or corporate management emphasizing specific aspects of importance about the related item. Another example is a product specification referencing an individual claim of a patent, specific paragraphs of a license agreement, a registered trademark, a product web page on the Internet, and/or a link to a product drawing file. The reference to the patent claim may contain, e.g., a conformance analysis of why the product does not violate a competitor's patent or why a particular patent may be invalid over a particular prior art reference or why a competitor's product infringes a particular patent, or a comment identifying how a key competitive feature of the product is protected by the patent.

One or more embodiments of the present invention may be capable of various configurations to adapt to user needs. For example, in one or more embodiments it may be used in conjunction with a customer site with a single server containing all data, for use by a small number of simultaneously connected users. Alternatively, one or more embodiments may be set up for use in conjunction with a multi-server distributed environment, for use, e.g., by a large number of simultaneously connected users at a large corporate use site. In another embodiment, the invention supports users connected to an Internet backbone as part of a licensed service.

One or more embodiments of the present invention may provide for readily navigating and/or annotating intellectual property documents.

One or more embodiments of the present invention optionally allow a user to download a set of related documents, for example to work offline while disconnected from the server, and to reconnect and synchronize changes with a server. In accordance with the present invention, there are provided methods, systems and at least one computer-readable medium for providing a searchable set of contexts of intellectual property documents assigned within a hierarchy, and intellectual property analyses of the documents, for searching, editing, reporting, analyzing and/or viewing, implemented by one or more computers. Where the invention comprises steps, the steps can be sequential, non-sequential, and/or sequence-independent.

One or more embodiments of the present invention includes determining one or more intellectual property documents, which has one or more contextual tags associated therewith. The contextual tag(s) includes information derived from an assignment of the document(s) within the hierarchy. Also included is determining one the types of analyses to be applied to the intellectual property document(s), wherein one or more type of analysis corresponds to a type of intellectual property, and the type(s) of analysis includes one or more units of analysis determined by the type of analysis. Also included is processing the intellectual property document(s) according to the type of analysis, including associating the unit(s) of analysis with (i) an analysis context determined by the type of analysis and the intellectual property document(s), (ii) a reference to a portion (or more) of the content of the intellectual property document(s), and (iii) a contextual tag. Further included is interacting with a user to determine the content of the unit(s) of analysis corresponding to the intellectual property document(s) and the type of analysis applied to the intellectual property document(s). Also provided for is storing the analysis context, the content of the analysis, and the contextual tag corresponding to the unit(s) of analysis, in association, for later search and retrieval.

One or more embodiments of the present invention further provide for utilizing the analysis context and/or the contextual tag as search criteria for searching and/or retrieving (i) the intellectual property document(s), (ii) the contextual tag(s), (iii) the analysis context(s), and/or (iv) the content(s) of the analysis.

According to one or more embodiments of the present invention, the analysis context corresponding to a patent type of intellectual property refers to a patent, a patent claim, a patent claim element, and/or a target to which at least a portion of the patent is compared.

According to one or more embodiments of the present invention, the analysis context includes one or more targets of the analysis and, if the at least one target is not stored locally, stores a local copy of the target(s).

One or more embodiments of the present invention further include providing a representation of the analysis applied to the intellectual property document(s), including associating a representation of the analysis context with a representation of the content of the analysis.

One or more embodiments of the present invention provide for one or more intellectual property analysis with respect to a target intellectual property or product, implemented by one or more computers. There is provided one or more intellectual property analysis, associated with a first intellectual property, wherein the analysis includes elements. Also included is providing one or more target including a second intellectual property and/or a representation of a product. Also provided is associating one or more of the elements with at least a portion of the target(s), and determining at least one reference corresponding thereto. Further provided is storing the reference(s) in association with the target(s), and the first intellectual property, for later retrieval of the reference(s), the target(s), and/or the first intellectual property.

One or more embodiments of the present invention includes providing a representation of the analysis, wherein the representation is static and/or dynamic.

According to one or more embodiments of the present invention, the analysis is a patent non-infringement analysis, a patent invalidity analysis, a patent freedom to operate analysis, a patent product coverage analysis, a patent claim construction analysis, a patent infringement analysis, a trademark infringement analysis, or a copyright infringement analysis.

One or more embodiments of the present invention include providing a representation of the analysis, wherein the target is visually represented by one or more items embedded in the representation, further including determining a program to display the embedded item(s).

One or more embodiments of the present invention include searching for one or more documents based on criteria including the portion (or more) of the target(s), the reference(s), and/or the element(s).

One or more embodiments of the present invention include providing a representation of the analysis, and accessing the at least one document from the representation(s), the target(s), the first intellectual property, and the reference(s) stored in association therewith.

One or more embodiments of the present invention further include displaying information characterizing the document(s).

Optionally, the intellectual property is representative of an invention disclosure, a patent application, draft patent claims, a patent document, a utility model, a trademark document, a copyright document, a product description document, a license document, a non-disclosure agreement (NDA), a memorandum of understanding (MOU), a sui generis protection document, a design registration document, a trade secret document, and/or an opinion document.

Optionally, the reference(s) corresponds to the serial number of the document(s).

One or more embodiments of the present invention further include automatically populating the element(s) from the first intellectual property.

One or more embodiments of the present invention further include, responsive to user input, collapsing and/or expanding the element(s) with respect to an adjacent element.

One or more embodiments of the present invention further include, for the element(s), prompting the user to indicate a correspondence between the element(s) and the portion (or more) of the target.

One or more embodiments of the present invention provide for sorting, organizing, searching, reporting and/or analyzing more than one intellectual property analyses, implemented on at least one computer. Accordingly, one or more embodiments of the present invention provide for selecting intellectual property analyses, wherein information characterizing the analysis is stored in the computer system(s); selecting a target, an intellectual property, and/or the information characterizing the analysis; and processing the information characterizing the analysis to determine one or more of the intellectual property analyses corresponding to the target, the intellectual property, and/or the information characterizing the analysis.

According to one or more embodiments of the present invention, the intellectual property analysis relates to a first intellectual property and the analysis includes elements; the target includes a second intellectual property and/or a representation of a product. According to one or more embodiments of the present invention, the analysis and/or one or more of the elements is associated with a portion (or more) of the target(s). Further, one or more reference is stored in association with the target(s), and the first intellectual property, for later retrieval of the reference(s), the target(s), and/or the first intellectual property.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the forgoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These together with other objects of the invention, along with the various features of novelty that characterize the invention, are pointed out with particularity in the claims annexed to and forming a part of this disclosure. For a better understanding of the invention, its operating advantages and specific features attained by its uses, reference should be had to the accompanying drawings and descriptive matter in which there is illustrated preferred embodiments of the invention.

BRIEF DESCRIPTION OF THE SEVERAL VIEWS OF THE DRAWING(S)

The above-mentioned and other features and advantages of the present invention will be better understood from the following detailed description of the invention with reference to the accompanying drawings, in which:

FIG. 5 is a user interface illustrating an example of annotation for an intellectual property document, according to one or more embodiments of the present invention.

Figure 14A:
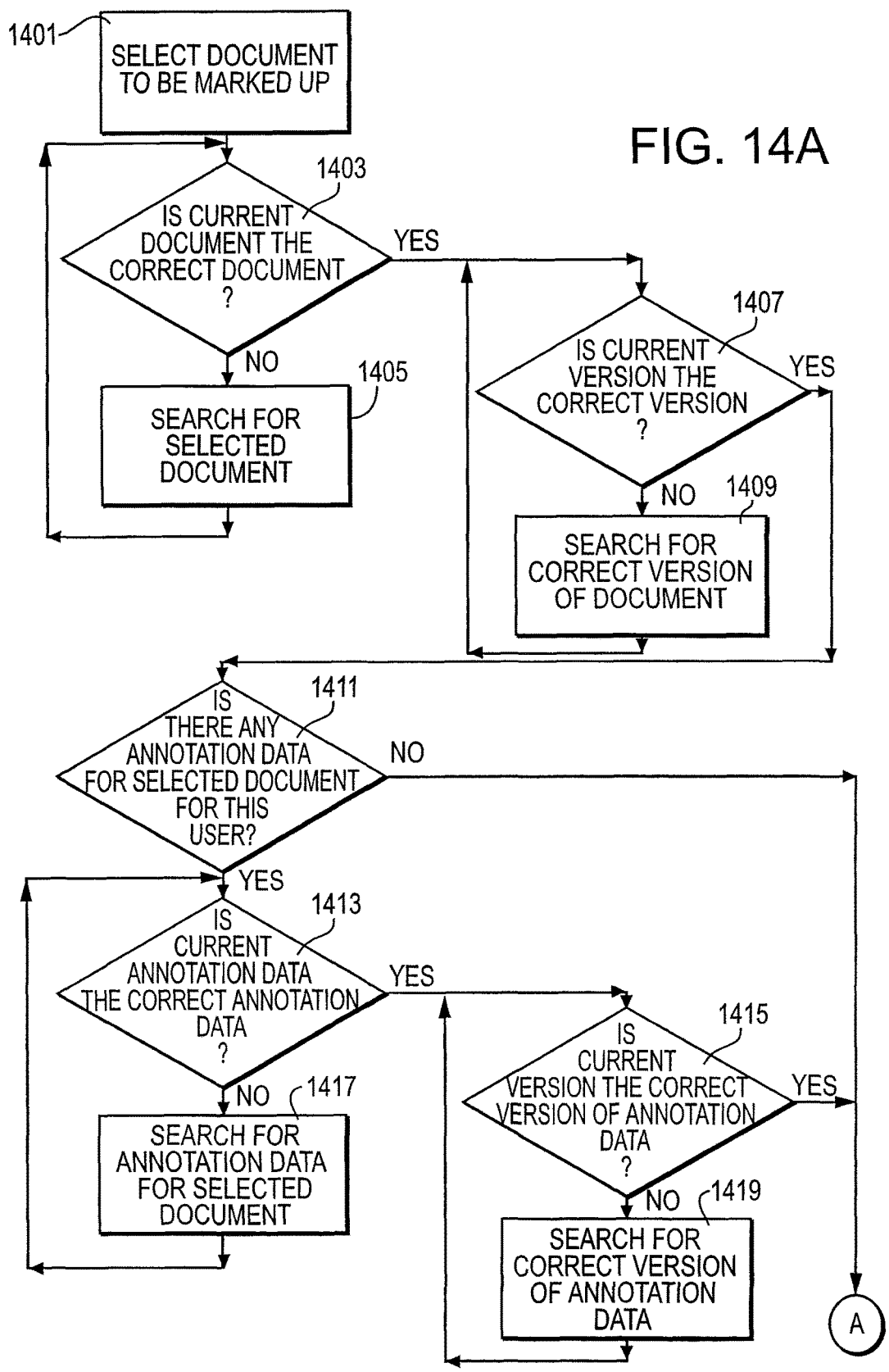

FIGS. 14A-B are a flow chart illustrating merging of document data with annotation data to produce a marked-up representation of the document, according to one or more embodiments of the present invention.

Figure 15:
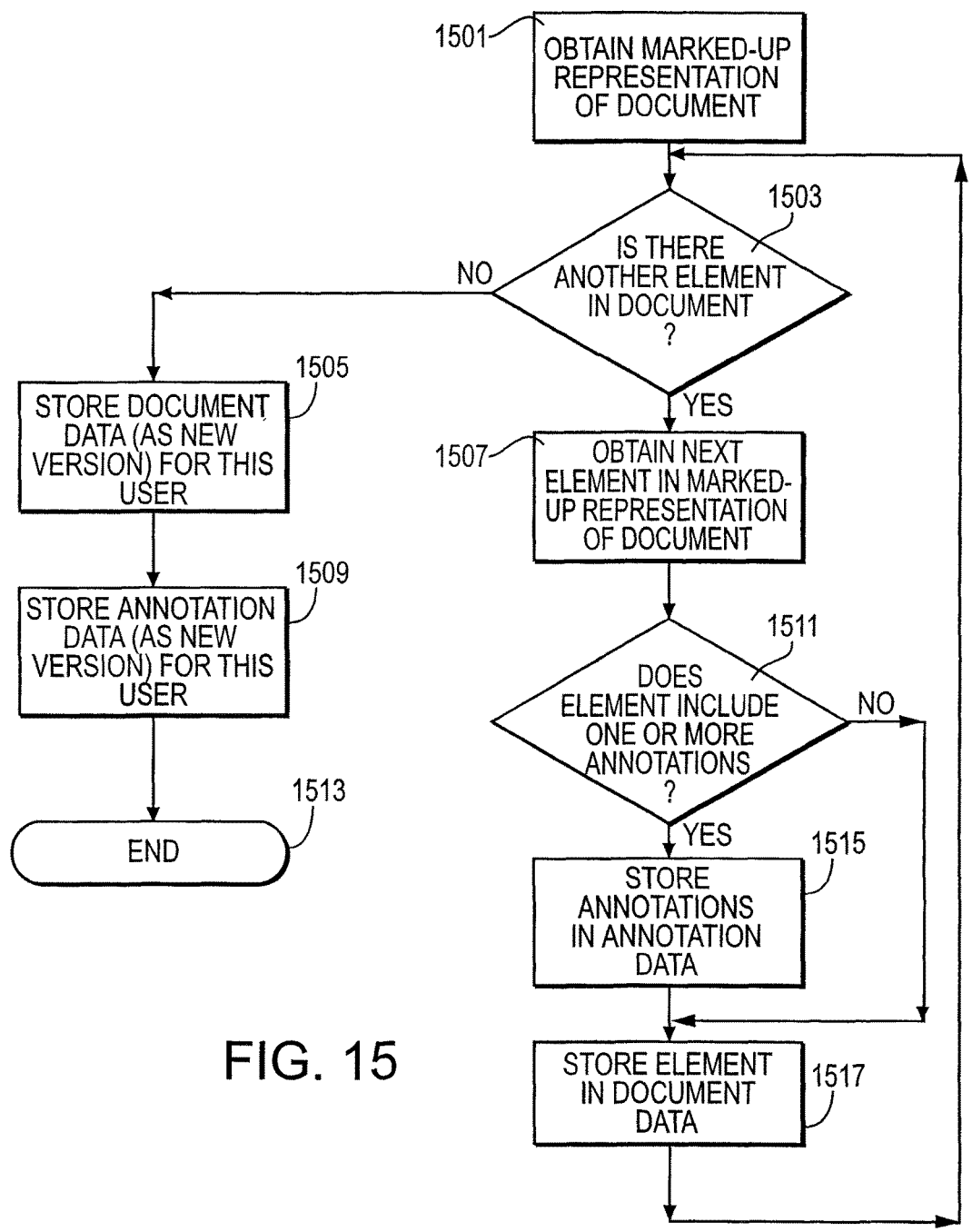

FIG. 15 is a flow chart illustrating splitting a marked-up representation of a document into annotation data and document data, according to one or more embodiments of the present invention.

Figure 16:
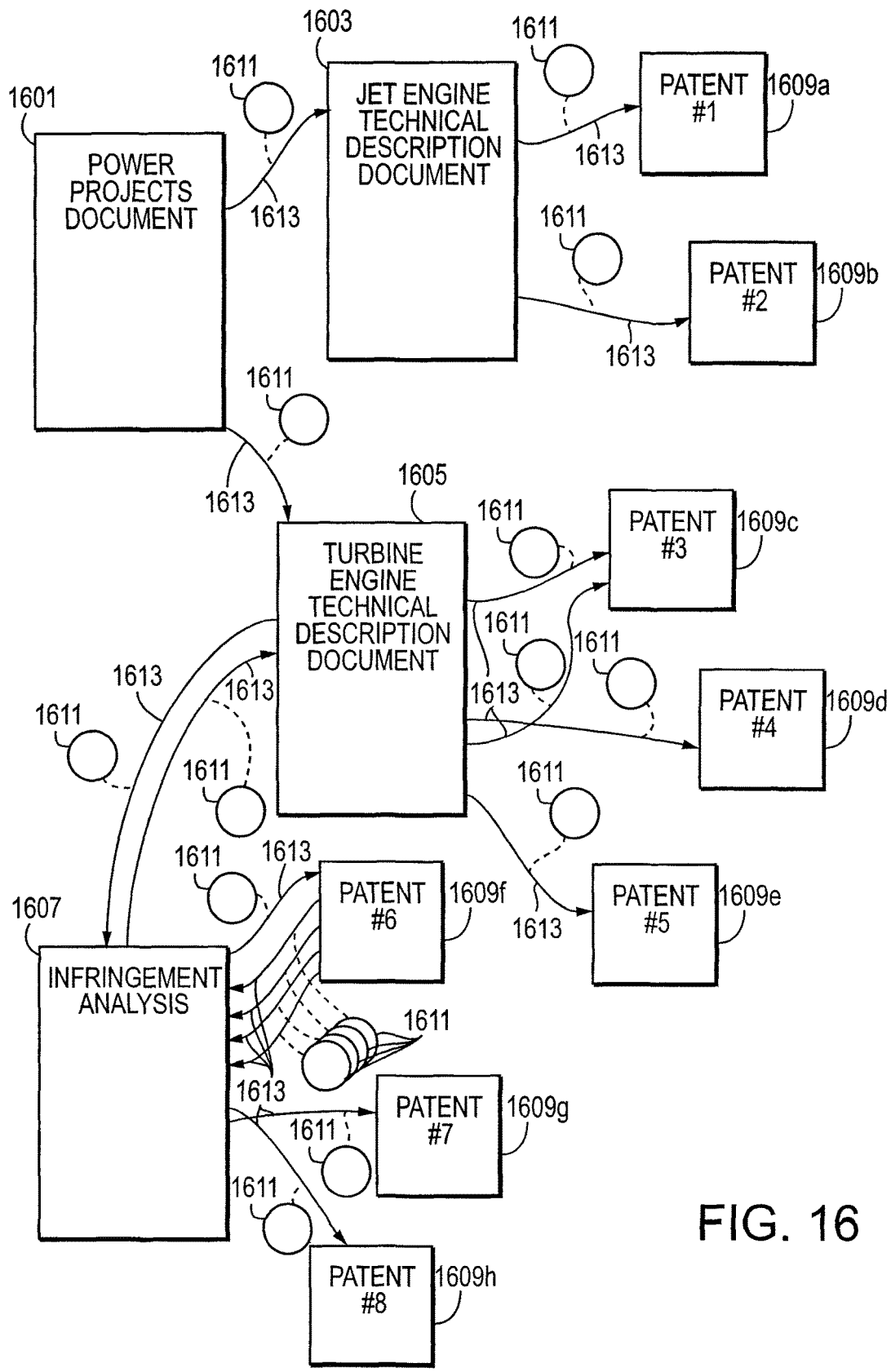

FIG. 16 is a linked diagram illustrating an example of annotated intellectual property documents and data, according to one or more embodiments of the present invention.

Figure 17:
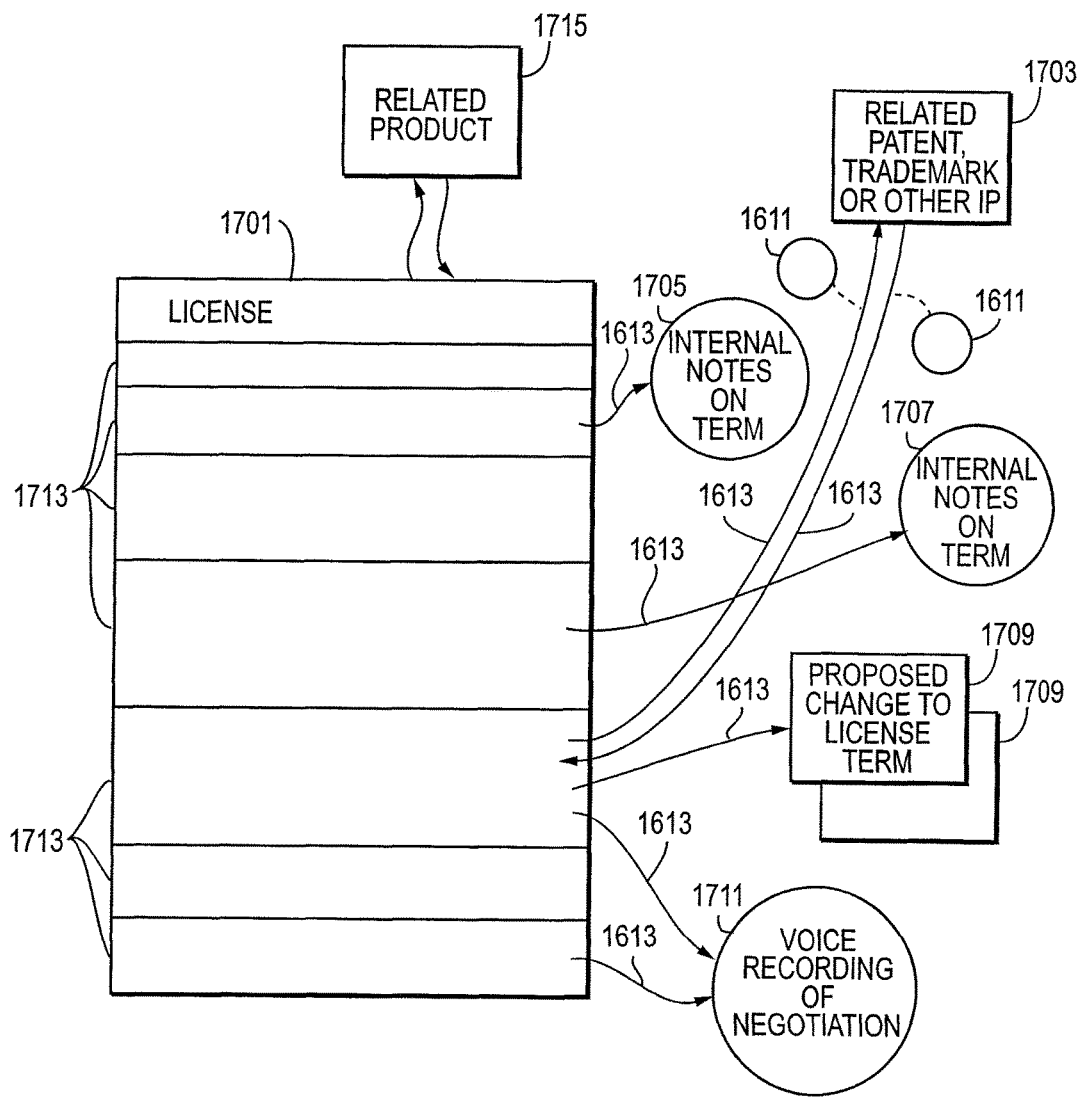

FIG. 17 is a linked diagram illustrating another example of annotated intellectual property documents and data, according to one or more embodiments of the present invention.

Figure 18A:
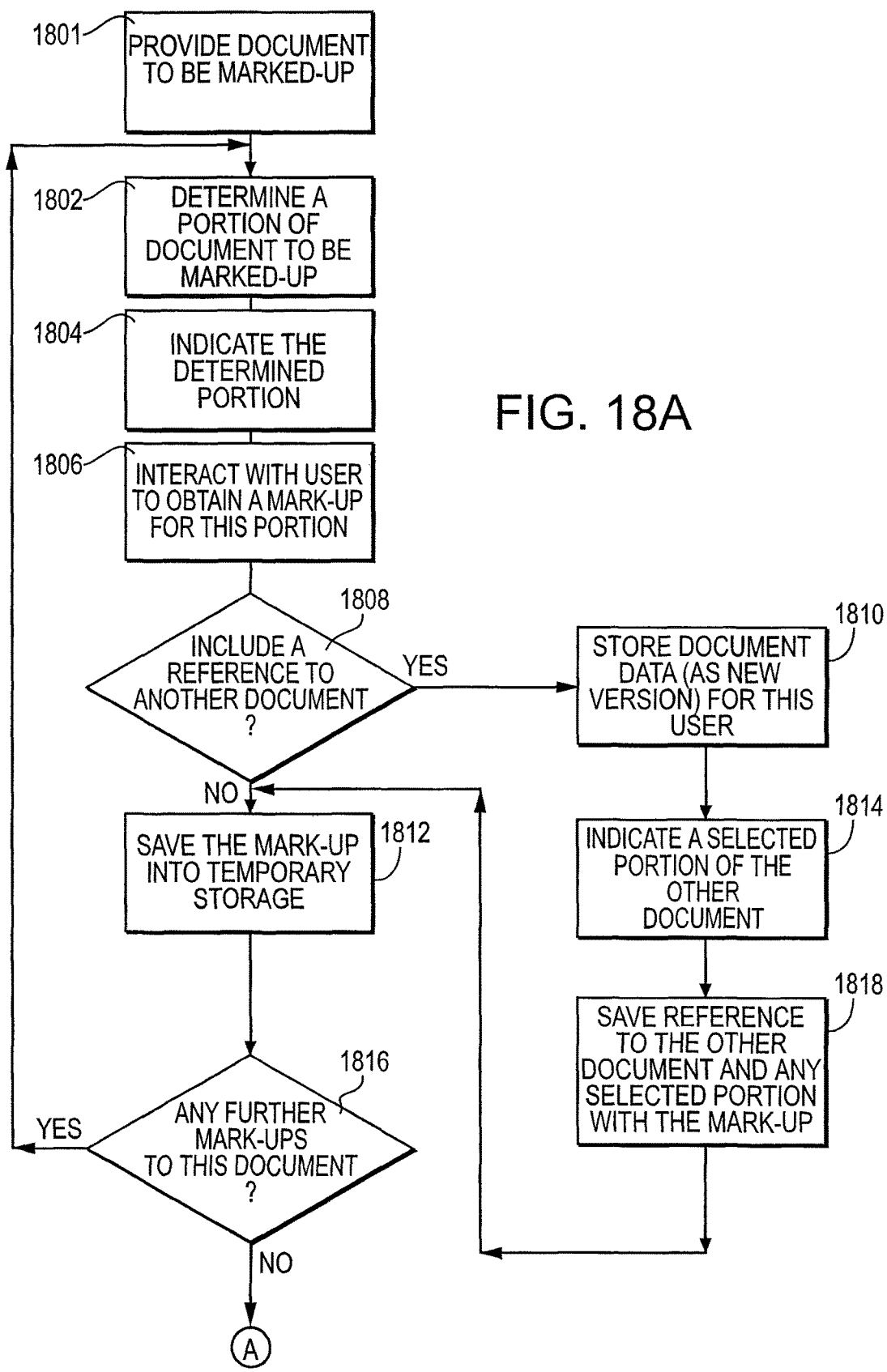

FIGS. 18A-B are a flow chart of an example of annotating a document and/or linking the document to another document (or portion thereof), according to one or more embodiments of the present invention.

Figure 19:
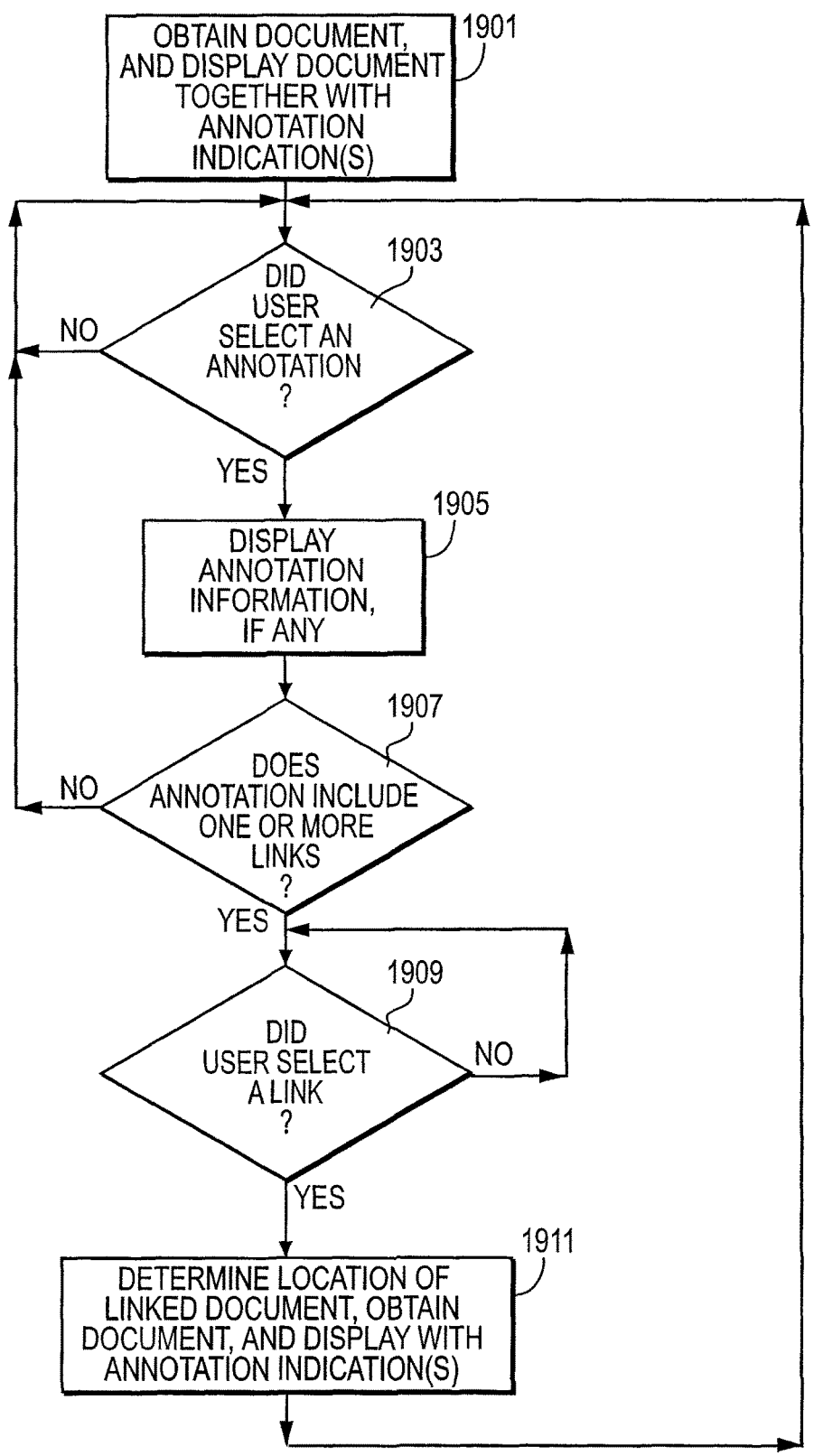

FIG. 19 is a flow chart illustrating an example of traversing intellectual property documents via links in an annotation thereto, according to one or more embodiments of the present invention.

Figure 20:
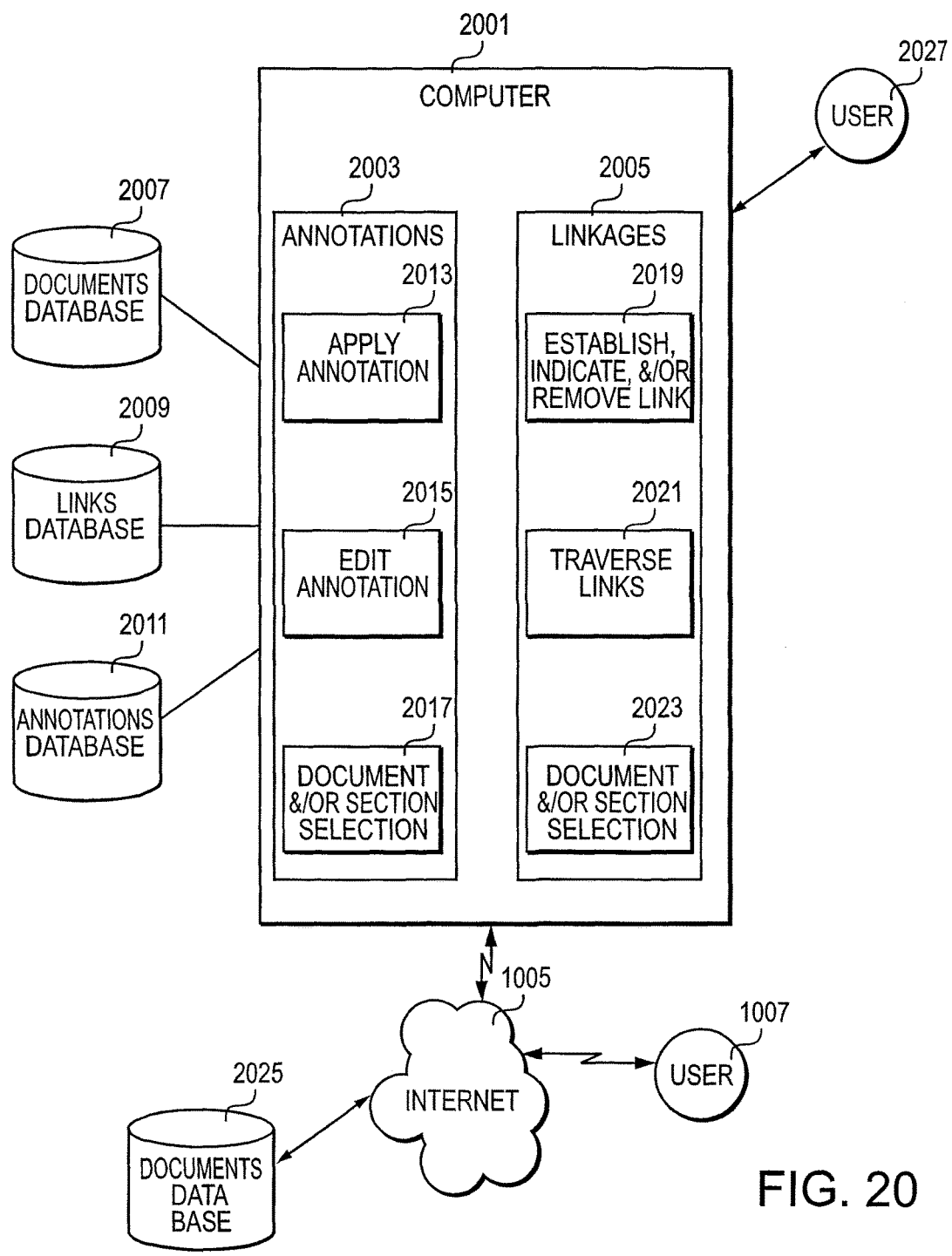

FIG. 20 is a block diagram illustrating a computer architecture, for use in connection with one or more embodiments of the present invention.

Figure 21:
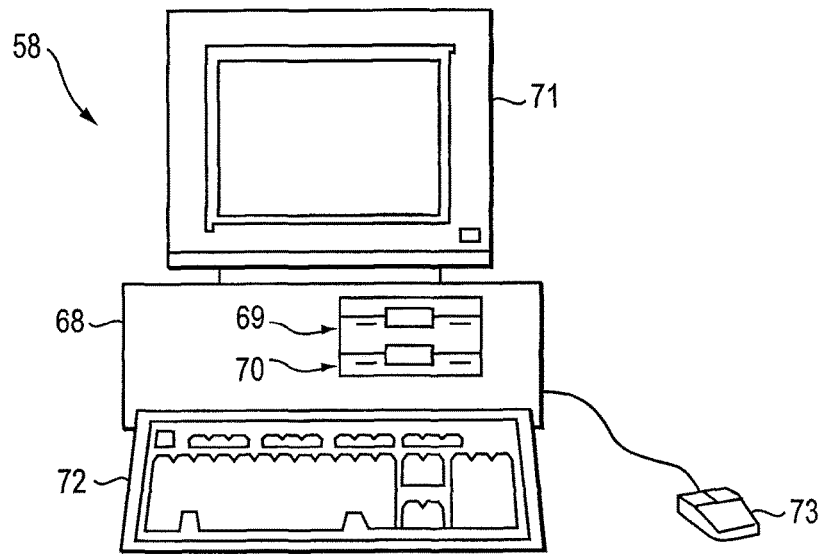

FIG. 21 is an illustration of a computer appropriate for use in connection with one or more embodiments of the present invention.

Figure 22:
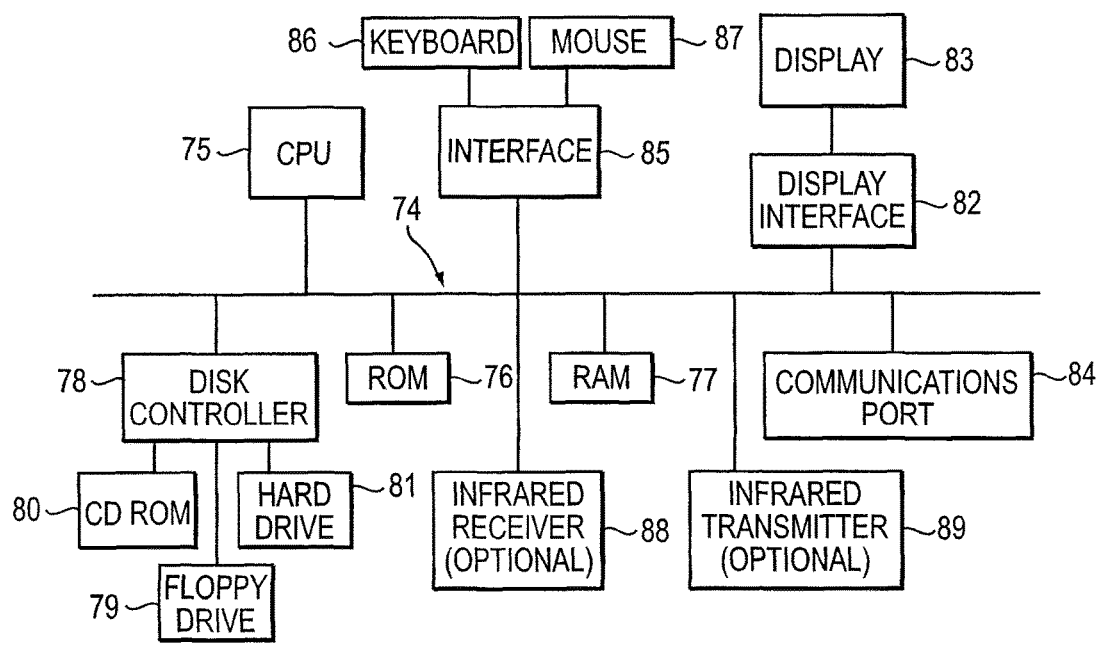

FIG. 22 is a block diagram illustrating the internal hardware of the computer of FIG. 21.

Figure 23:
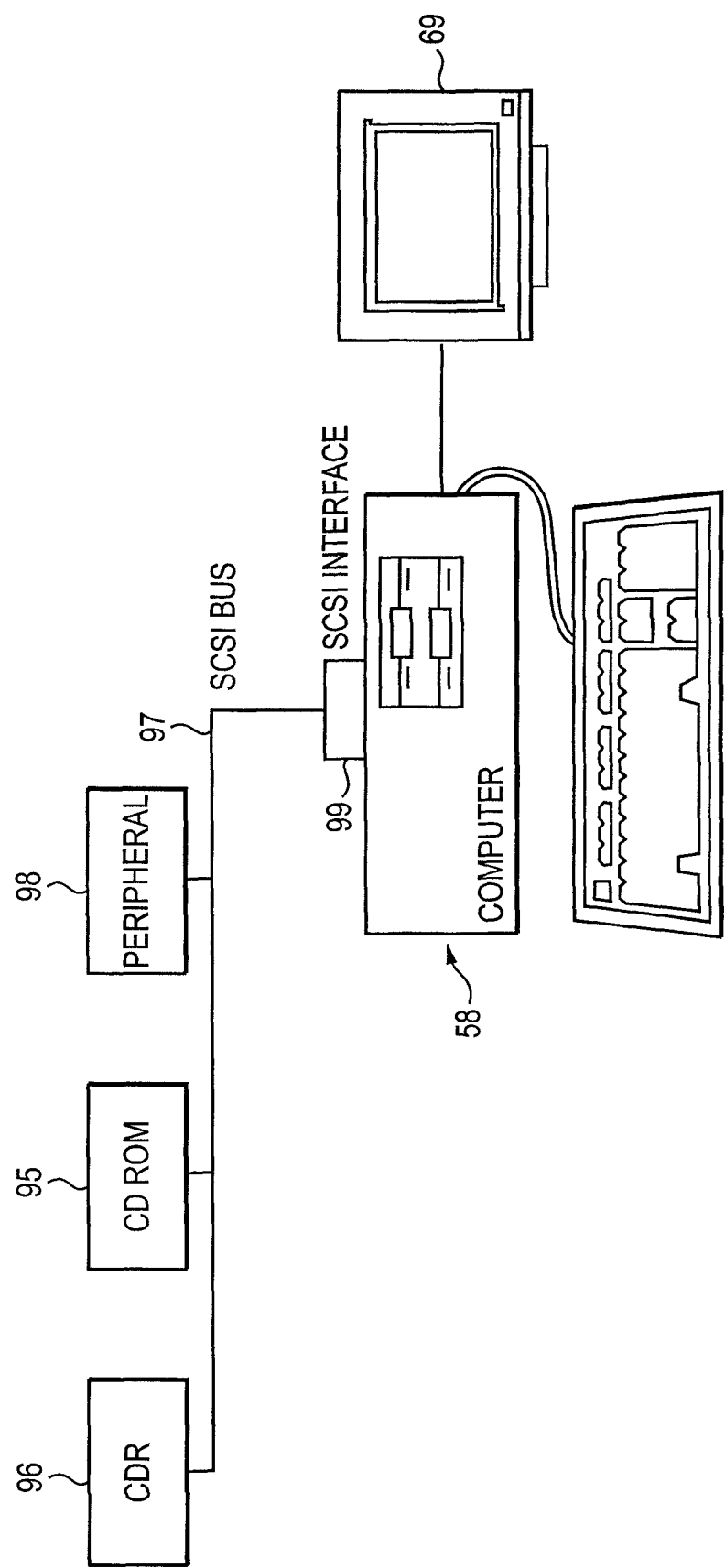

FIG. 23 is an illustration of an alternative computer appropriate for use in connection with one or more embodiments of the present invention.

FIG. 24 is an example of a claim chart, in a static style, with example items embedded therein.

FIG. 25 is an example of a claim chart corresponding to FIG. 24, in a dynamic style, wherein the cells of the chart are windows.

FIG. 26 is an example of a claim chart corresponding to FIG. 24, including an example of a dependencies feature.

Figure 27:
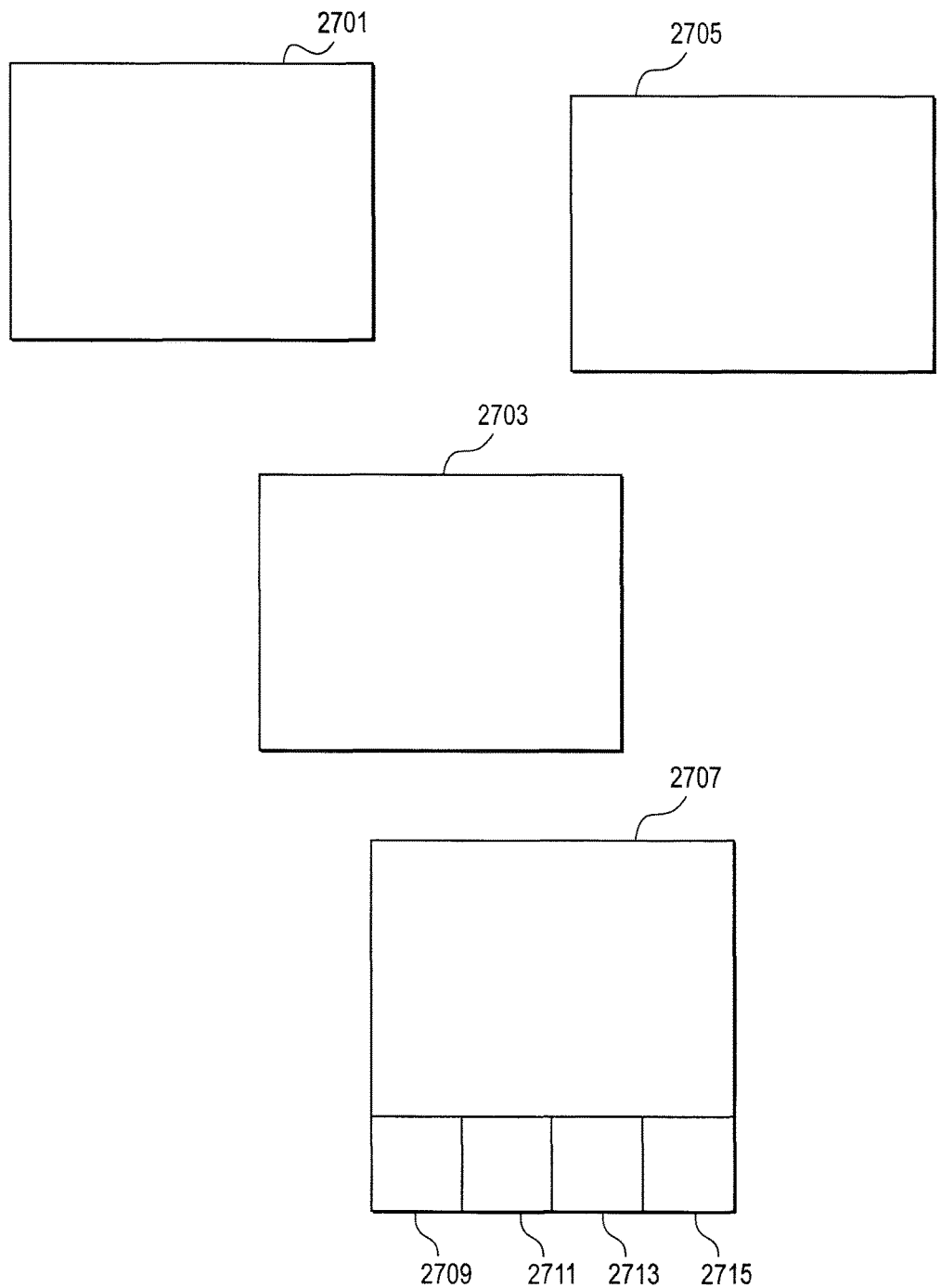

FIG. 27 is an example of an alternative, multiple-window view of a claim chart.

Figure 28:
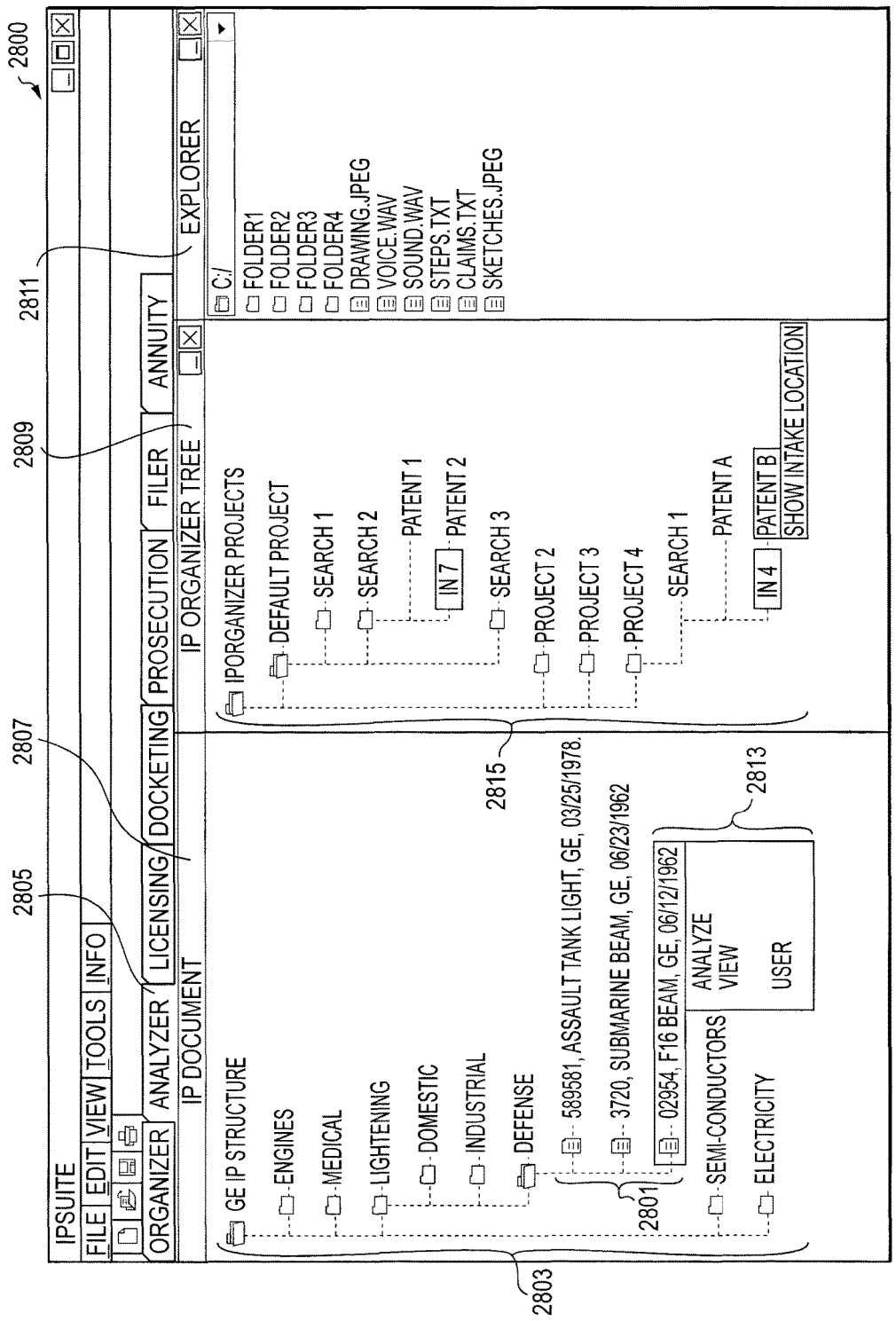

FIG. 28 is an example of a user interface including an intellectual property document tree, an intellectual property organizer tree, and an optional explorer, illustrating an example of initiating an analysis.

Figure 29:
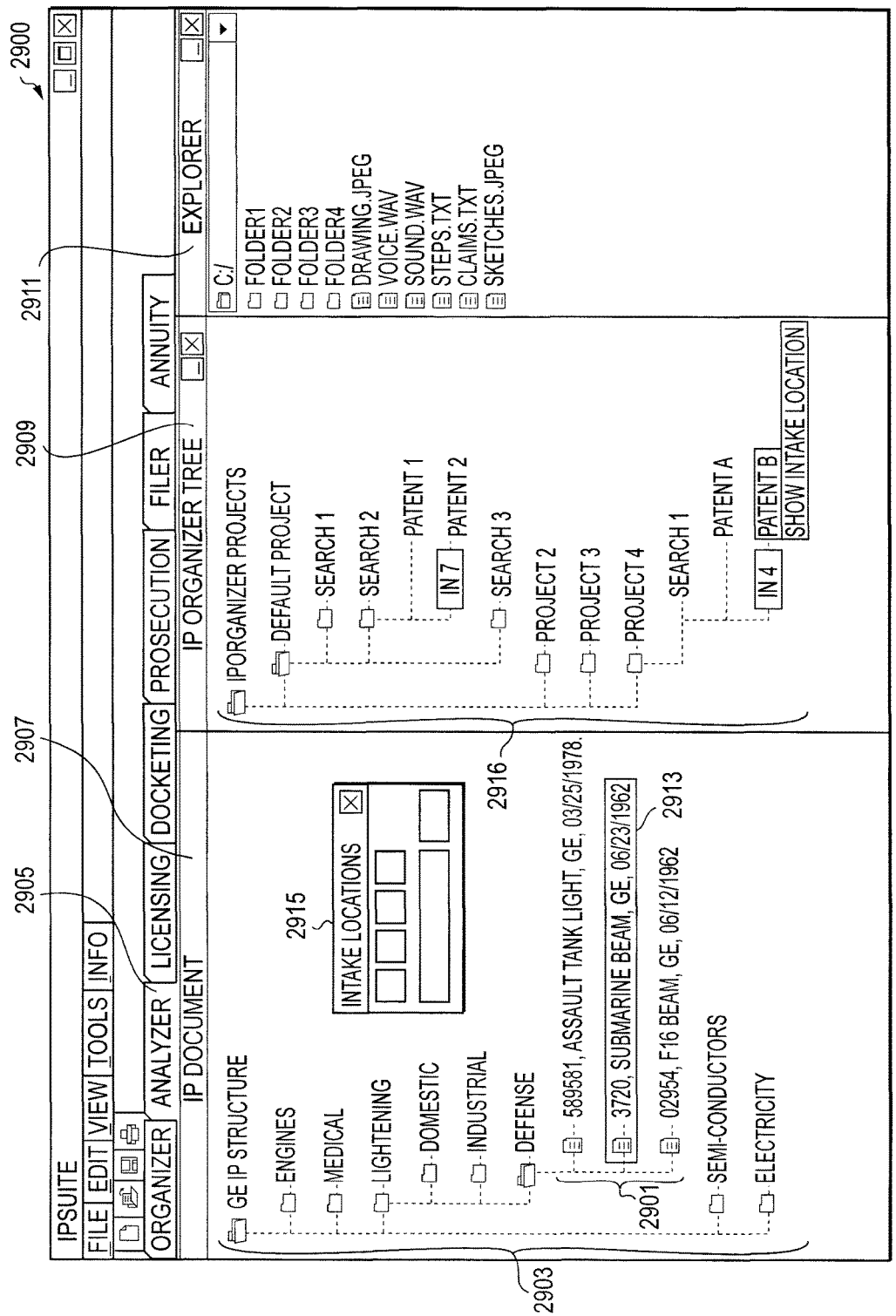

FIG. 29 is an example of a user interface including an intellectual property document tree, an intellectual property organizer tree, and the optional explorer, showing selection of an intellectual property document being assigned to a location in the document tree.

Figure 30:
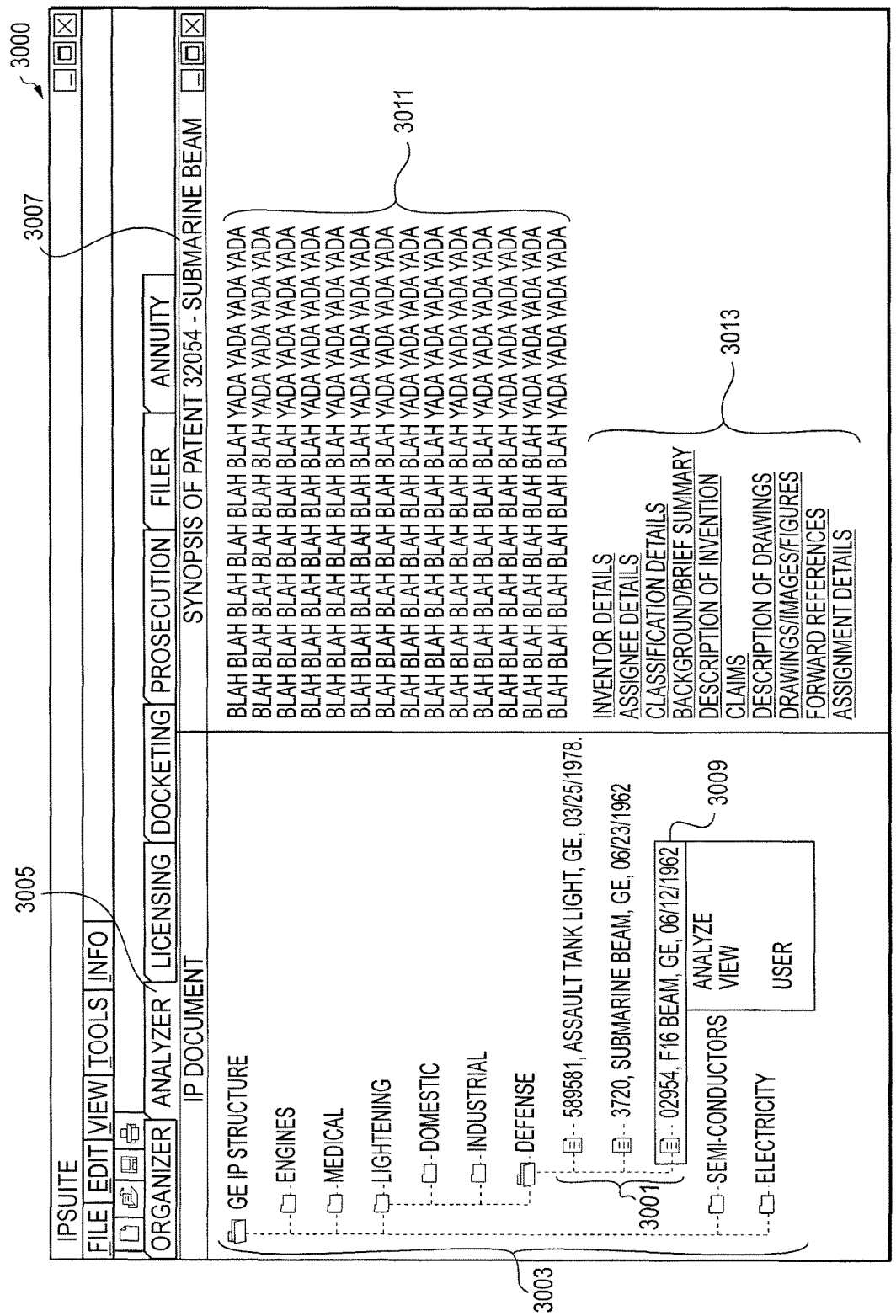

FIG. 30 is an example of a user interface including an intellectual property document tree, and an optional view of the selected intellectual property document.

Figure 31:
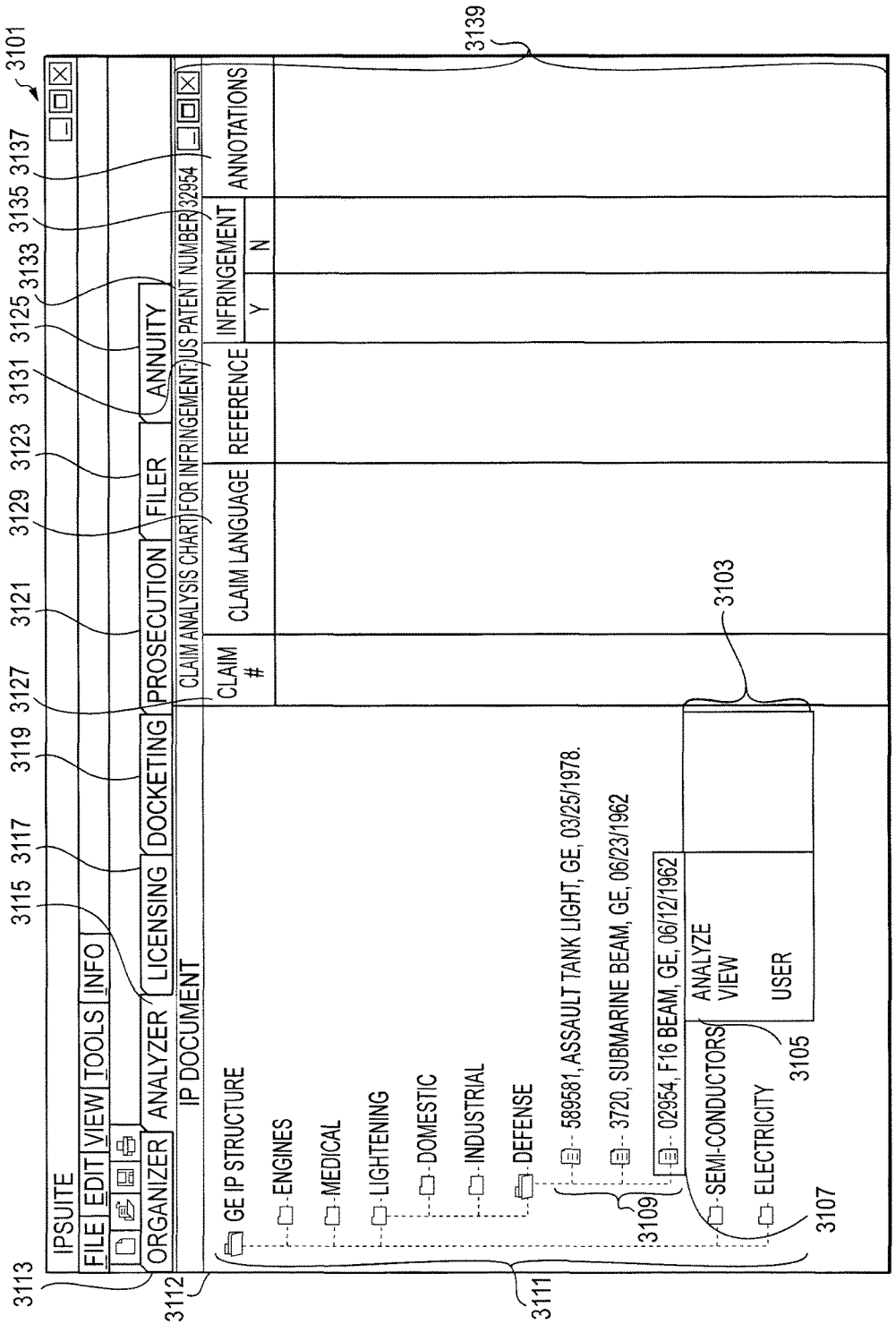

FIG. 31 is an example of a user interface including an intellectual property document tree and an intellectual property analysis.

Figure 1:
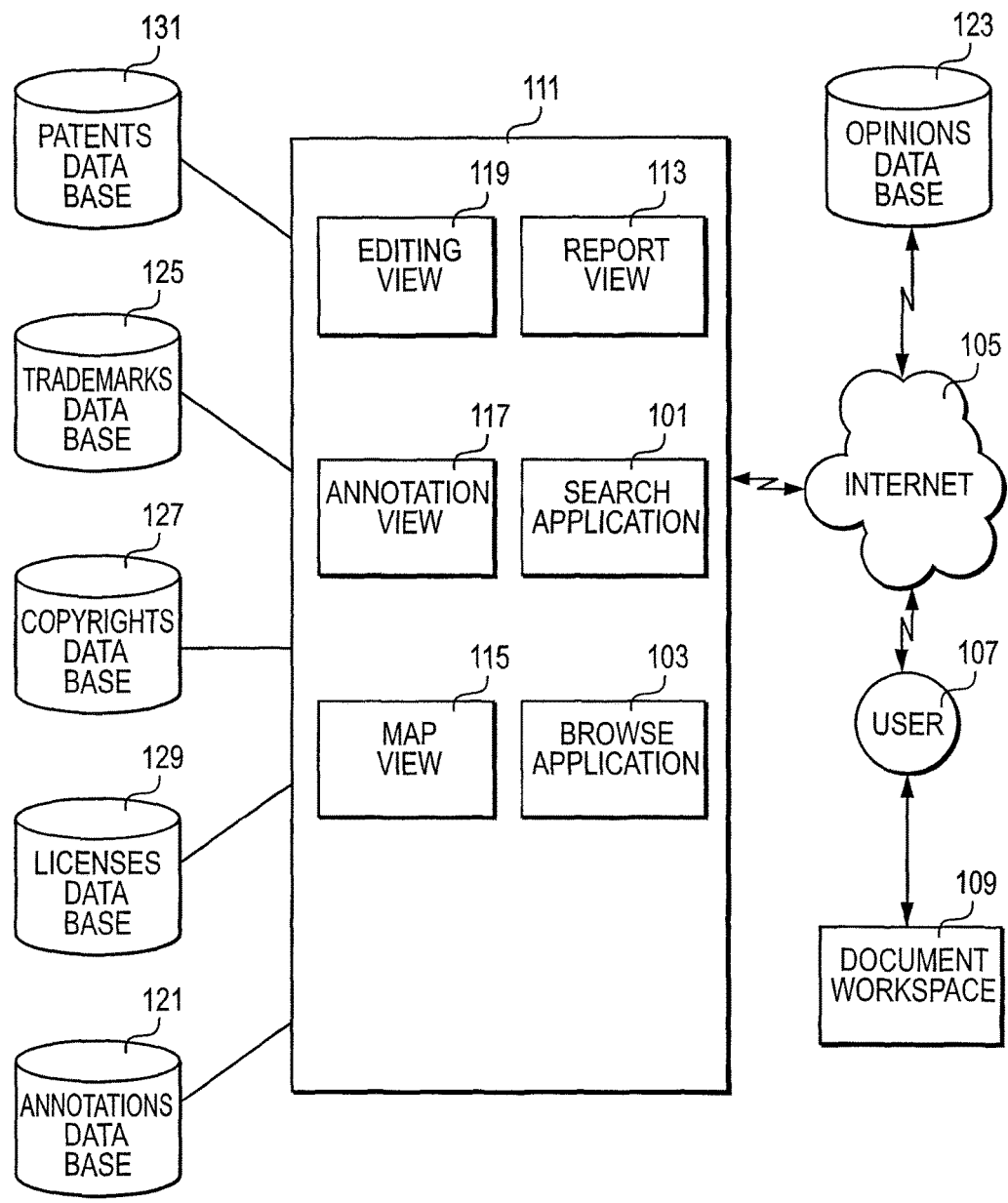
FIG. 1 is a functional block diagram illustrating a system architecture providing for annotating intellectual property documents and data, according to one or more embodiments of the present invention.
Figure 32:
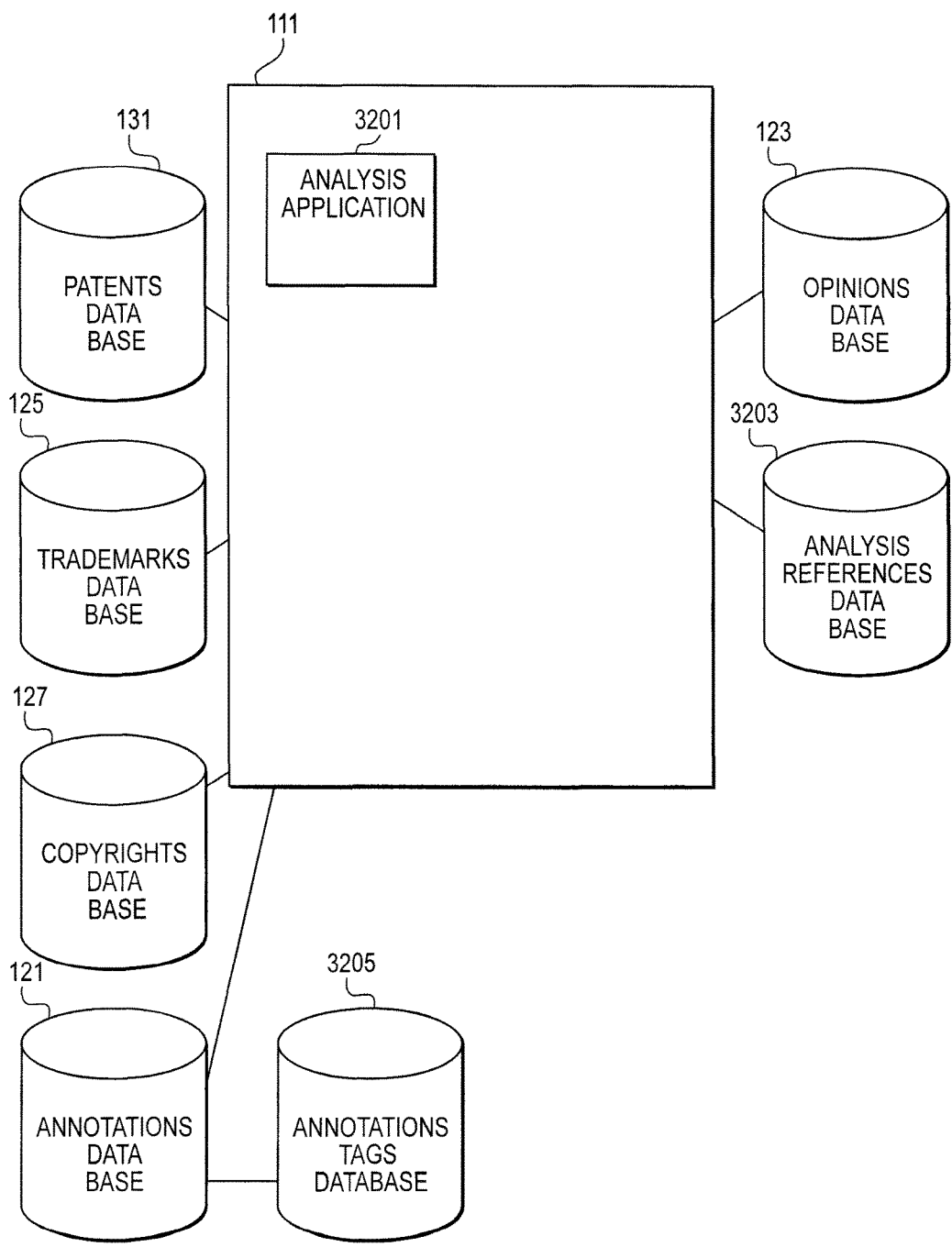

FIG. 32 is an example block diagram of the embodiment according to FIG. 1, with some elements omitted for clarity of illustration, illustrating one or more portions of databases relevant to analysis.

FIG. 33 is an example of a related art tabular display of a rank-ordered output of information correlation to an asset, e.g., infringement or invalidity references for a patent.

Figure 34:
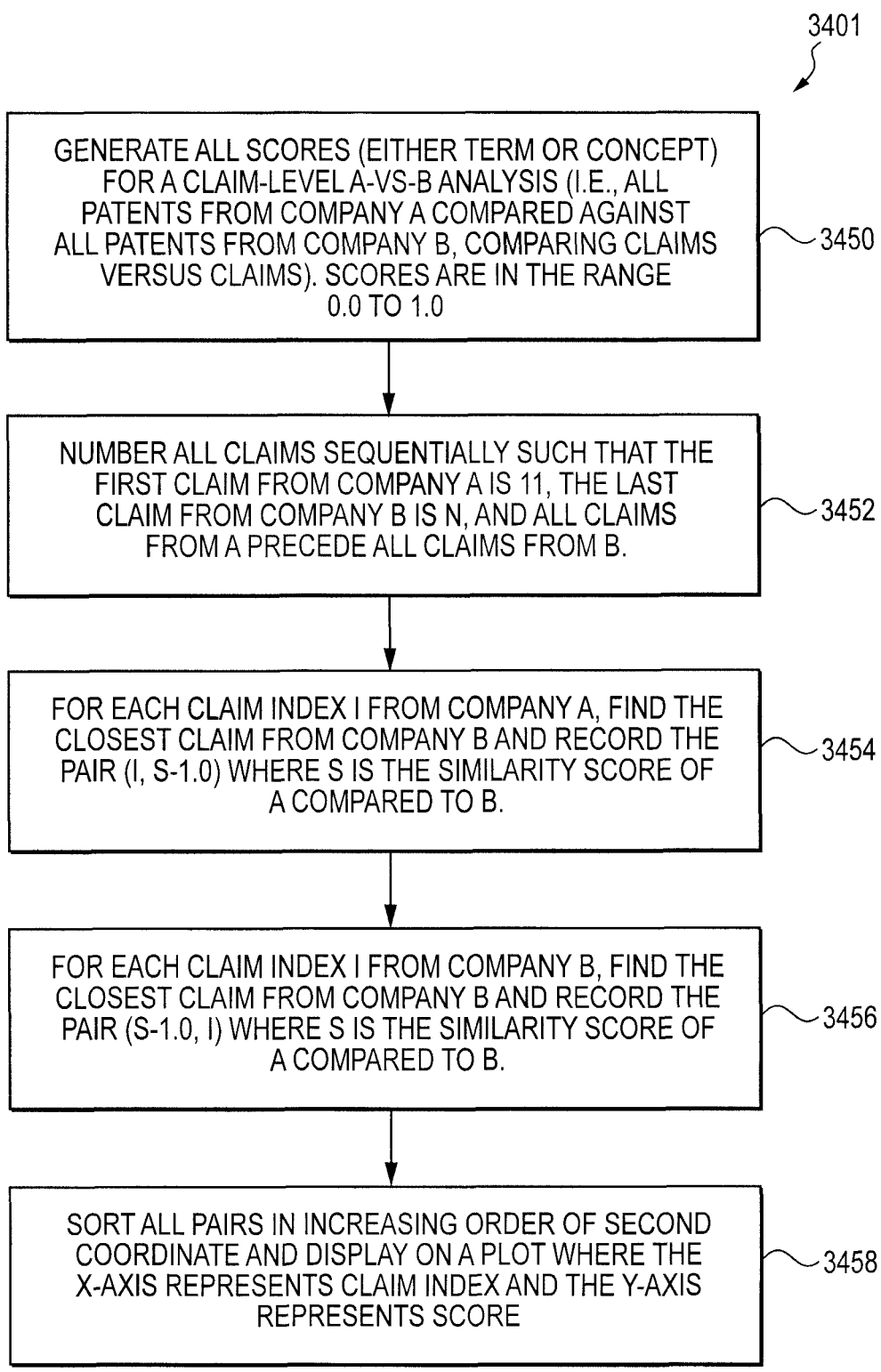

FIG. 34 is an example flow chart for a related art for analyzing and reporting information in multiple documents utilizing term-based analysis and conceptual-representation analysis for, e.g., analyzing patent documents.

Figure 35:
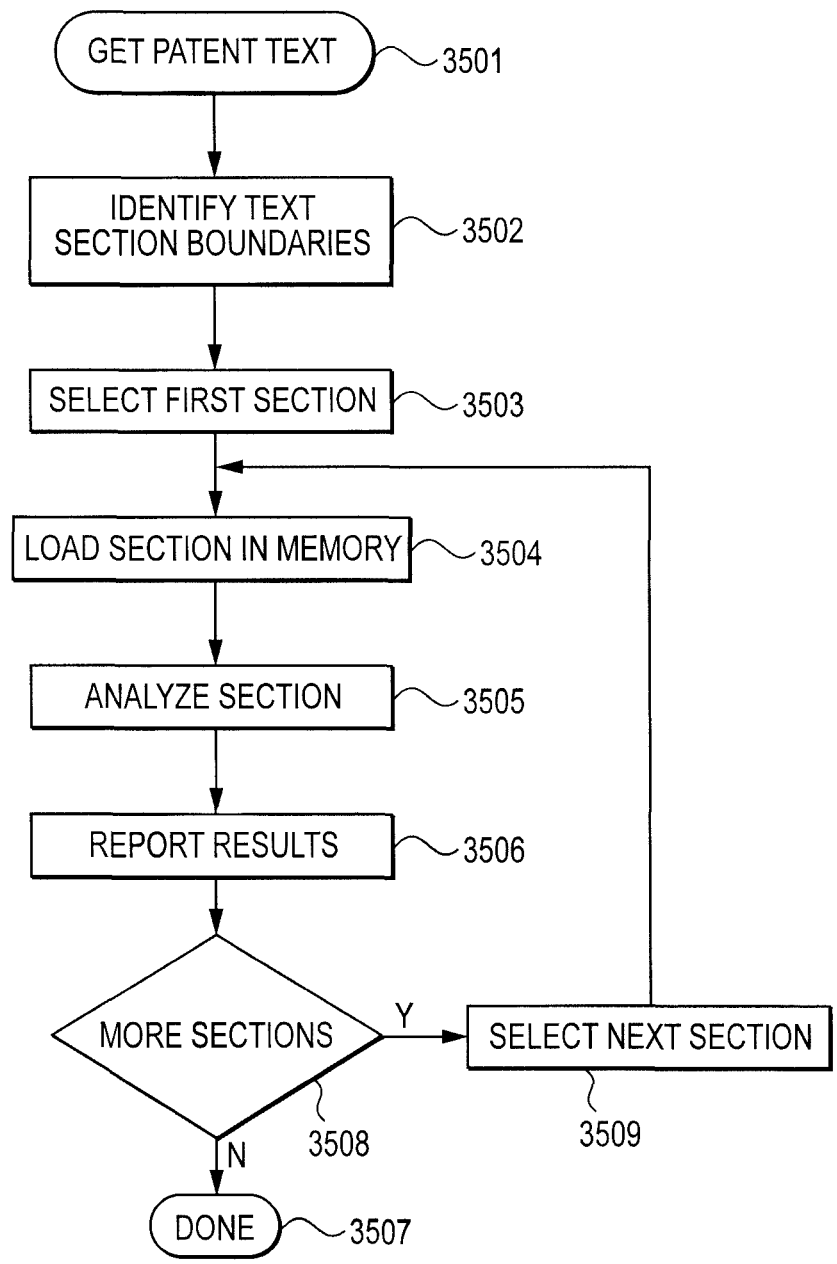

FIG. 35 is an example flow chart for a related art for analyzing patent text, including identifying boundaries of parts of a patent text.

Figure 36:
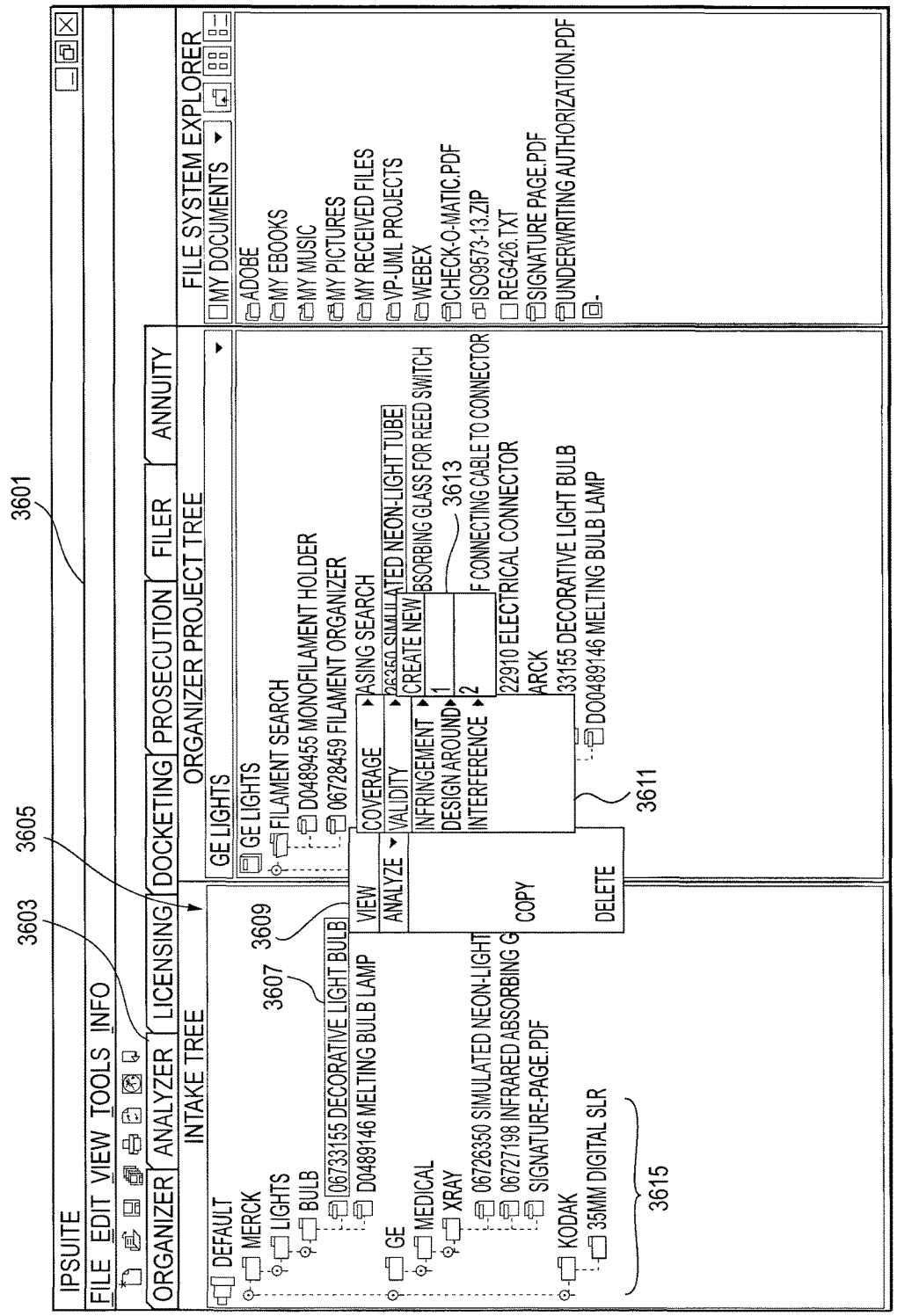

FIG. 36 is an alternative example of a user interface illustrating selecting an intellectual property document from an intellectual property document tree and determining an intellectual property analysis.

Figure 37:
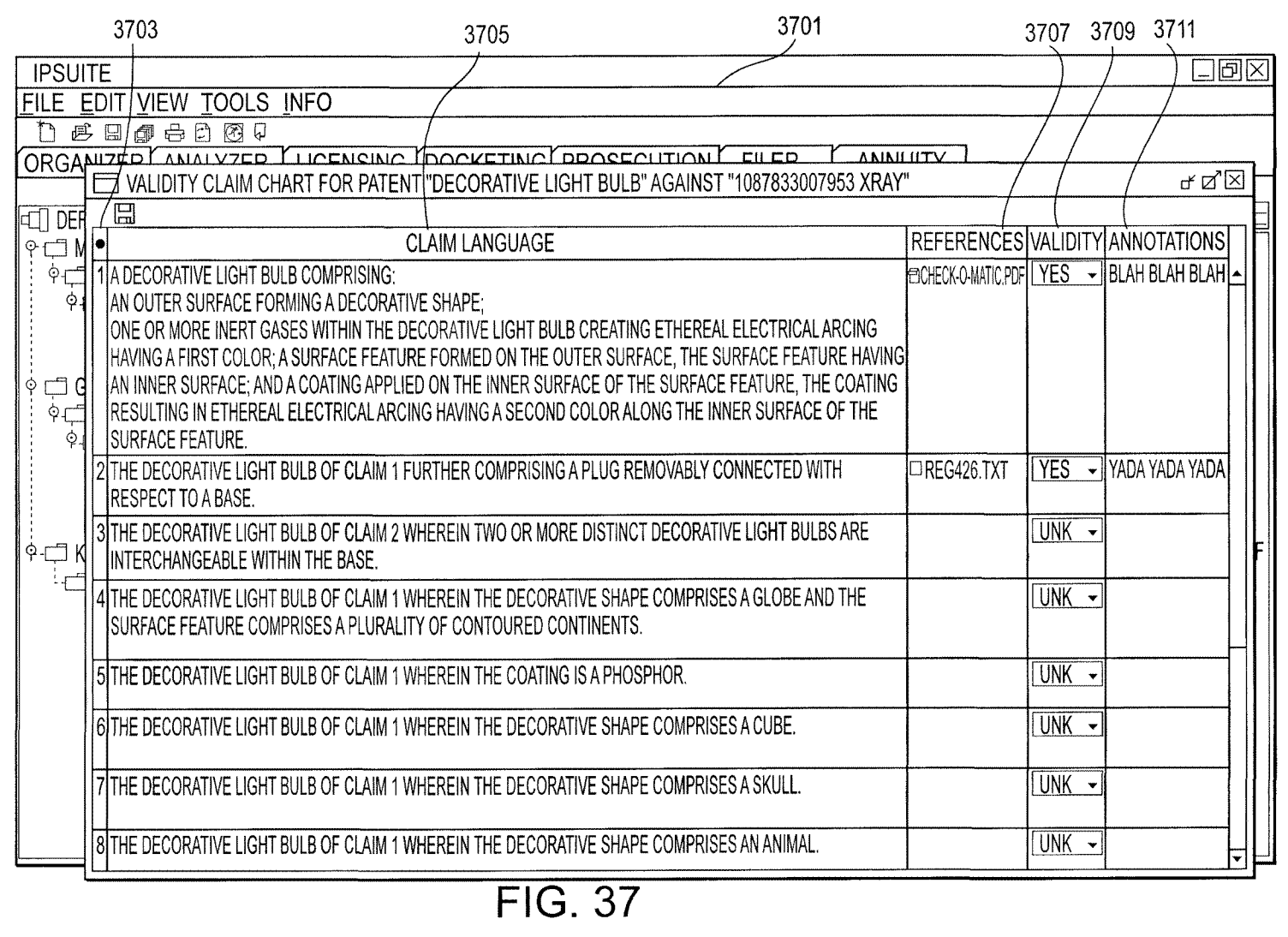

FIG. 37 is an alternative example of a user interface illustrating an intellectual property analysis.

Figure 38:
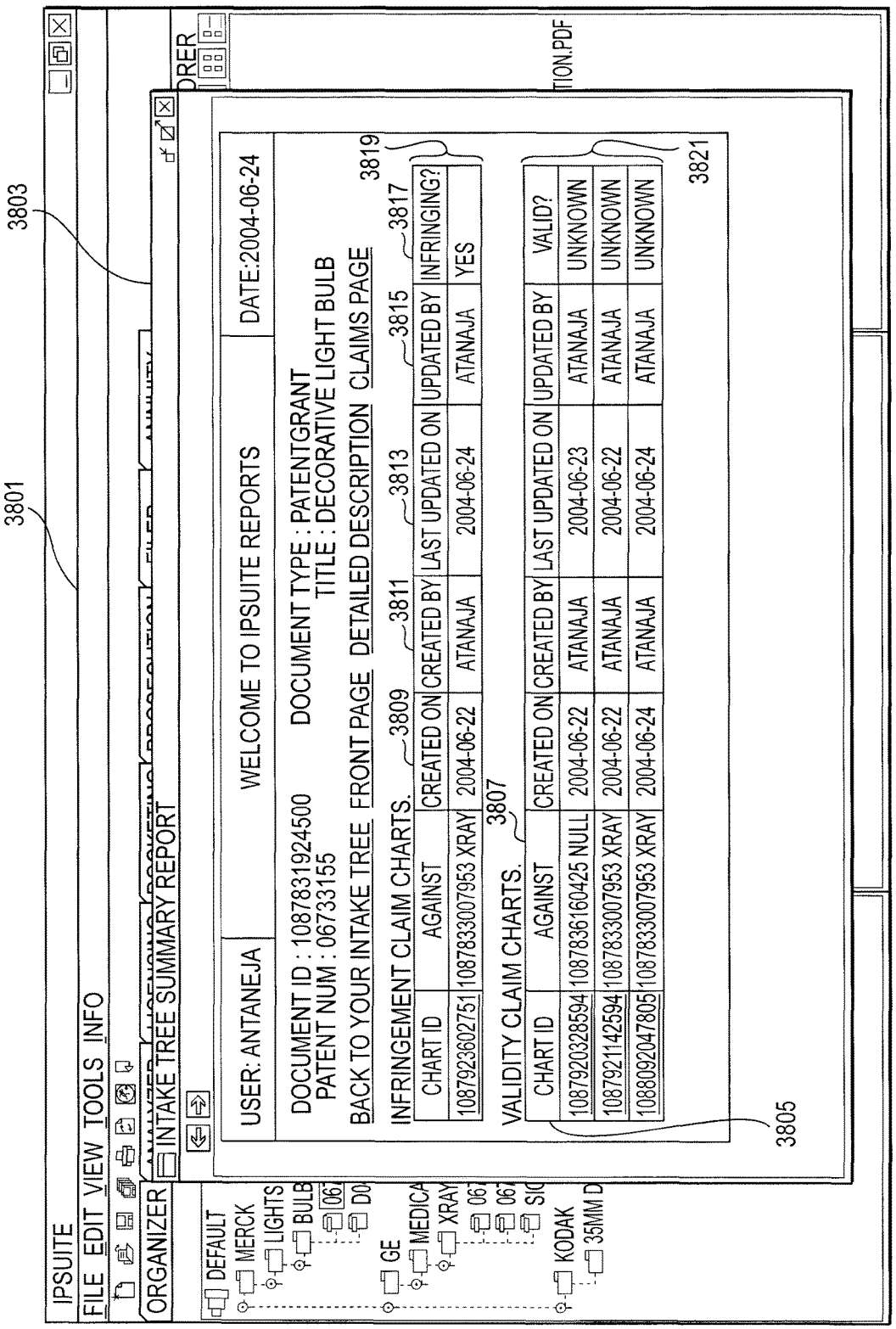

FIG. 38 is an example of a user interface illustrating an example summary report of intellectual property analyses.

DETAILED DESCRIPTION OF THE INVENTION

The following detailed description includes many specific details. The inclusion of such details is for the purpose of illustration only and should not be understood to limit the invention. Throughout this discussion, similar elements are referred to by similar numbers in the various figures, for ease of reference. In addition, features in one embodiment may be combined with features in other embodiments of the invention.

Intellectual property information regarding intellectual property documents by a customer, intellectual property service provider, government entity or other source has been collected. Likely such information is extracted and deposited into one or more databases. Ultimately at least a portion of such intellectual property information is presented to an end user on behalf of a customer, such as via an intellectual property application, which may be executing locally, or via a web site over the World Wide Web, i.e., the Internet. For ease of description, such a collection of information will be referred to herein as "database", although it should be recognized that the information might be collected in other formats as well, and that an intellectual property application might not be restricted to data stored in a database.

The association between selected intellectual property information is realized and optionally annotated. The annotation enables users to annotate images and text in intellectual property, such as, e.g., patent drawings. Those annotations are saved and optionally categorized. For example, annotated drawings or images are saved in the context of projects in order that notes and other thoughts of the user are memorialized and tied to a project.

FIG. 1 is a functional block diagram illustrating a system architecture providing for annotating intellectual property documents and data, according to one or more embodiments of the present invention. In the illustrated example, the system is realized as an intellectual property portal 111 on a general purpose computer, communicating with a network, e.g., the Internet 105. A user 107 accesses the portal 111 via the Internet 105. A document workspace 109 is provided on a computer for the user 107. Applications for locating, viewing and annotating intellectual property documents and data are provided on the portal 111. In the present example, the applications include an editing view 119, an annotation view 117, a map view 115, a report view 113, a search application 101, and a browse application 103. Any application program useful for searching or browsing intellectual property documents may be utilized to implement the search application 101 or the browse application 103. Intellectual property documents and data may be stored in any appropriate manner. In the present example, the intellectual property documents and data are stored in a patents database 131, a trademarks database 125, a copyrights database 127, a licenses database 129, and an opinions database 123. In this example, the opinions database 123 is separate from the portal 111. The system also includes storage of the annotations in an annotations database 121. The user accesses one or more of the intellectual property documents together with any annotations, e.g., by searching or browsing for the selected document. The user may manipulate, annotate, and/or link one or more selected documents via one or more of the applications. The annotated and/or linked document(s) are stored into the appropriate databases by the user. Access to annotations and/or annotated documents optionally is limited, e.g., by corporate affiliation of the user and annotation, by user, by express permission to one or more users, etc.

Figure 2:
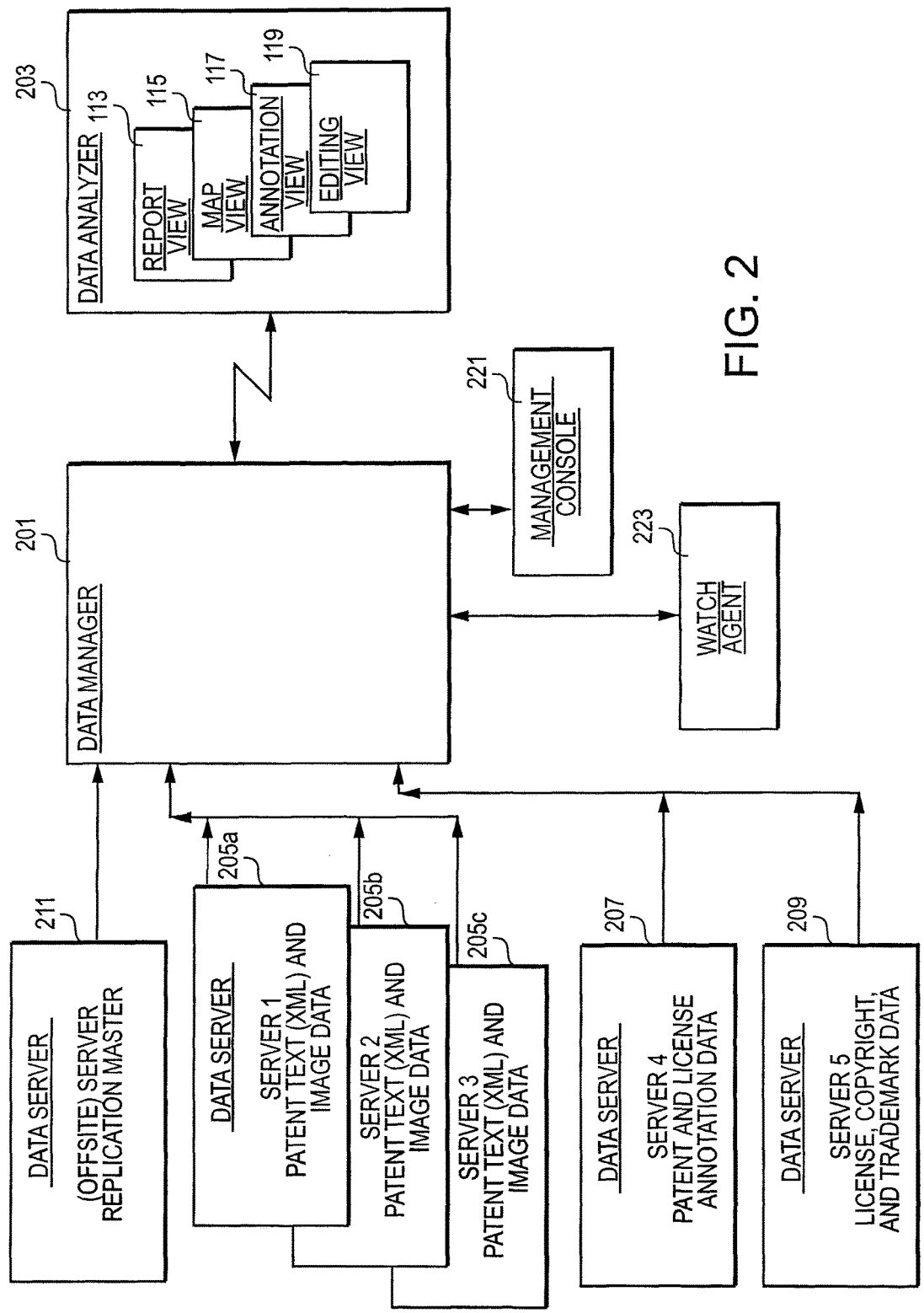
FIG. 2 is a block diagram of one example of a system for use in connection with analyzing and managing intellectual property documents, according to one or more embodiments of the present invention.

A system design for use in connection with one or more embodiments of the present invention, as illustrated in FIG. 2, may advantageously comprise a number of interconnected components. Each component may focus on a specific task, and advantageously provides and/or utilizes an Application Programming Interface (API) to communicate with other components within the system, according to the illustrated realization of one example system. Components may include, for example, one or more data servers 205-211, a data manager 201, one or more analyzer views 113, 115, 117, 119, a management console 221, and/or a watch agent 223. Components and/or functions thereof may be omitted, replaced, subdivided and/or combined and still remain within the scope of the invention. The data servers 205-211 provide access to the data representing the intellectual property documents; the data analyzer 203 provides user interfaces to obtain, analyze and/or traverse intellectual property documents; and the data manager 201 breaks down documents into storable units and builds up documents for the user interfaces.

In accordance with one or more embodiments of the present invention, scalability may be provided by the logical and/or physical separation of data server 211 functionality from the data manager 201. For example, the data manager may reside with one (or more) data server on e.g., a single machine storing all patent, licensing, and annotation data. As one of many alternatives, the data manager may connect to multiple data servers, each running on a separate machine, and each storing only a portion of the data.

According to one or more optional realizations of the present invention, offline storage and/or operation may be provided for example, by a document manager, discussed below, which stores some or all working data locally on the user's machine, and/or by API functionality to retrieve and store documents from the data manager 201.

FIG. 2 illustrates one or more embodiments of a general overall architecture for use in connection with the present invention. This figure illustrates internal architecture, useful for illustrating the concepts in relation to the invention. Portions of the architecture may be omitted and/or replaced and/or combined when used in connection with certain embodiments of the present invention. This example of one or more embodiments of the present invention illustrates an optional 3-tier architecture, including the data server tier, the data manager tier, and the data analyzer tier. More or fewer tiers may be utilized, in other embodiments of the present invention. The data server (or multiple data servers) 205-211, according to one or more embodiments of the present invention, may provide for storage, versioning, indexing and/or searching of (possibly a subset of) document data (e.g., XML) annotation data, and/or image data.

Optionally, there may be provided one or more data servers 205a-c, 207, 209, 211 amongst which the data server functions may be divided. In the present example, several data servers are provided. Optionally, a multiple data server format may house one or more sets of related information. In this illustration, one data server might contain the entire United States Patent and Trademark Office ("USPTO") database; and/or one data server might contain multiple databases. According to one example alternative, the related information (in this case, the USPTO database) may be spread over multiple data servers 105a-c. According to a convenient realization, for example, one data server may contain only the patents ending in "1", another server might contain patents ending in "2", a third might contain patents ending in "3", and so on; according to this example, there are 10 servers, across which is distributed, preferably in a logical manner, preferably the entire USPTO database. By distributing the data servers and functions, one or more embodiments of the present invention may provide for a scalable solution for storing generalized data used by the system.

According to one or more embodiments of the present invention, the data may be stored in its original format. Alternatively, it may be reformatted at some point or points prior to storage. The format for the data that the USPTO currently provides data for patents is XML, a mark-up language which is fairly similar to HTML. XML is a generalized syntax for creating a document structure and tags, unlike HTML, which has predefined tags. XML essentially leaves the meaning of those tags to the developer of the dialect. In this case the USPTO has defined the individual tags that exist within this language and the meaning tag of each. The system may use the syntax as provided by one or more patent/trademark offices, government, and/or commercial data providers, or optionally, the syntax may be converted, e.g., into one or more standard formats. In the illustrated example, the USPTO patent database (both text (XML) and image data) is distributed across three data servers 205 *a, b* and *c*.

Similarly, one or more embodiments of the present invention may accommodate other data and/or other formats, e.g., an XML schema for license agreements. Such a schema for a license agreement may accommodate, e.g., typical, usual, optional and/or advanced elements that are available within the license agreement, e.g., a preamble, definition section, individual definitions, paragraphs, clauses, sections, articles, etc. In the illustrated example, license documents are stored on the data server 209.

As illustrated in the example of FIG. 2, each data server in a multi-data server embodiment within the system may contain all, a subset and/or a portion of the information that is available to the user. Data server 5 209 stores, in the present example, license data, copyright data, and trademark data. These databases are likely to be much smaller than the USPTO patent database. Hence, a single server may store more than one type of data. Optionally, non-USPTO data is included.

According to the illustrated example, data server 4 207 stores annotation data (discussed below), e.g., having annotations corresponding to some of the patents and/or licenses. The annotation data may include, e.g. electronic mark-ups that attorneys or other users would make, e.g., in connection with a document. Further in this example, data servers 1 through 3 store the patent text and image data of the USPTO patent database (or a portion thereof).

The optional data manager 201 may pull together the data that may be distributed across one or more servers. The data manager advantageously provides a single cohesive and comprehensive management of a given database. The data manager, according to one or more embodiments of the present invention, provides for the seamless distribution, coordination, and searching, of documents (e.g., XML), or merging of annotation data (e.g., XML), and image data across one or more data servers. It optionally may support caching of search requests and/or results, and/or replication of data to and/or from remote servers.

Figure 3:
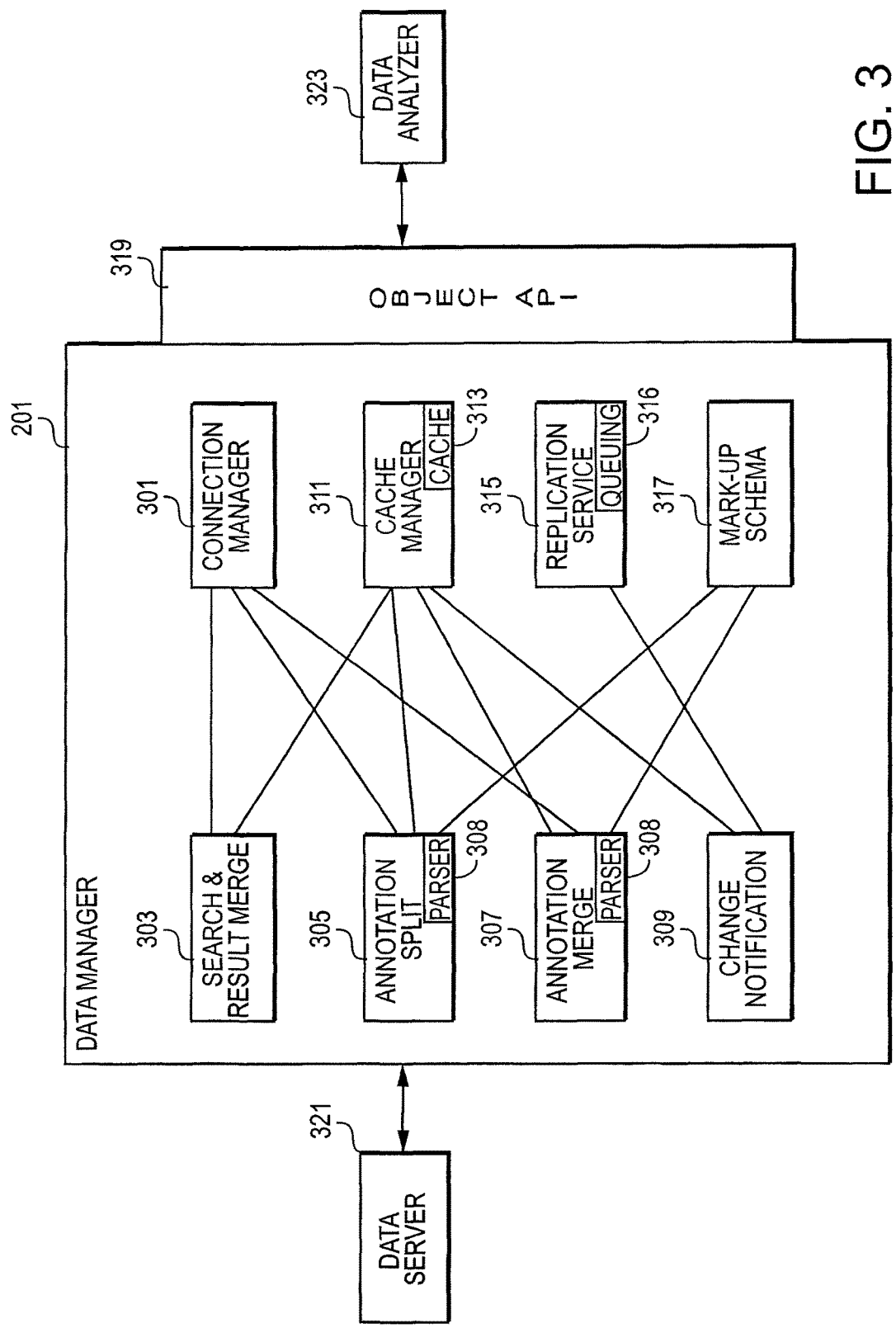
FIG. 3 is a combined functional block diagram with data flow, illustrating an exemplary data manager according to one or more embodiments of the present invention.

Reference is made to FIG. 3, providing one or more example embodiments of the data manager 201 architecture. The data manager may provide an object API 319 having services to receive requests and/transmit information to/from the data analyzer 323, e.g., to insert, update, delete, and/or request document data, e.g. XML data. The object API may have and/or retrieve binary data, such as for images and/or sound, for example. XML data requests may be further processed within the data manager; and, if appropriate, passed to a data server 321; binary requests may be passed on through to the underlying data server 321.

Consider for example that documents are provided in XML format, and that annotations for each document are provided as annotation data entities therein. When an XML data insertion or update occurs, the XML data is first parsed by an XML parser 308. This parser maybe driven by a mark-up schema 317, which identifies XML tags within the document for annotation data entities, and the relationship of the XML tags to the document data entities. The annotation data entities are extracted from the XML document. They may be used to create an annotation XML data stream. The remainder of the XML data, that is, the potentially revised document without the annotations, may be used to create a document XML data stream.

Where multiple data servers are provided, an optional connection manager 301 may be provided, to identify which data server(s) stores the data at issue if distributed, e.g., the document data, the annotation data and/or the image data, such as by maintaining a mapping. Image data may be stored on the same data server as the document data or may be stored elsewhere.

Continuing with the above example of XML documents, when an XML request occurs, the data manager 201 retrieves the document XML data and the annotation XML data from their respective one or more data servers. It then parses both these XML data streams with one or more XML parsers 308. Using the mark-up schema 317, it embeds the annotations from the annotation XML data within the corresponding tagged elements of the document XML data, and with annotation merge logic 307, merges both streams into a single XML document.

When a search request occurs, search and result merge logic 303 optionally looks up each keyword in the one or more thesauri of the data server(s), and any match is added to a search keyword list. The search request may contain a list of searchable fields appropriate to the documents being searched (e.g. Abstract, Inventor, Claims, etc. for patents), and/or the scope of the search (e.g. Patent, Copyright, Annotation, etc.). The search is then executed on the relevant Data Servers, the results are collected, and they are returned to the caller. Search results optionally may be returned from the data server in partial result groupings, such as of a specified fixed size; this permits the data manager 201 to satisfy a search request quickly, while deferring much of the processing overhead for result fetching until actually needed.

If a user is browsing back and forth through a number of items returned from a search, it is likely that they will request the same document repeatedly within a short period of time. An optional cache manager 311 maintains a mapping of client search requests to search results. If a request is repeated while the result is cached, the result may be returned from an Image and XML cache 313 through the cache manager 311, instead of generating a new data server search request.

When the optional change notification event is received from a data server, it is passed in to the change notification handler 309, then through to the object API 319. It may be passed to an optional replication service, which maintains a list of registered downstream data managers. One or more data managers may be registered for replication of information, as identified e.g., by data server and item type, and will be notified of such changes. A notified data server may request the information. The replication service 315 maintains a queuing 316 of notifications for those registered data managers that are unreachable or are flagged for queuing. The optional change notification event may provide the basis for a subscription service, in order to provide customers with updated latest patent and trademark information. The optional change notification event and replication service may be used for enabling a system to distribute to multiple data servers, even if distributed around the world, while maintaining synchronization between them. The optional change notification event may be provided to the cache manager 311, which may be used to enable it to flush an image and XML cache 313 of outdated items. Reference is made back to FIG. 2. According to one or more embodiments of the present invention, an optional search engine locates stored documents by performing searches on phrases and/or individual words. For example, the search engine interface may provide a column for proceeding word and another for following word. As a further example, to access intellectual property patent data, when doing a search, a search request may result in a hit to all three of the Data Servers 205 a, b, c in parallel. According to one or more embodiments of the present invention, the data manager 201 is responsible for coordinating among the distributed Data Servers where multiple data servers have potentially relevant data, and for being aware of the range of specific data on each data server. If a search request is received, the data manager 201 may broadcast that request to all of the relevant data servers (three in the illustrated example), receive the search request results returned from those data servers, and then merge the results back together again and create a single common results set. The advantage of distributing a search is that one may speed up the search, average-out the effect of multiple users, and/or numerous requests being received, and load-level the users working with an individual patent and its image data. The data manager 201 thus provides an optional second logical level, where it pulls together the content of the data servers, and/or provides among other things a view into a company's intellectual property database.

An optional third logical level is the data analyzer 203. The data analyzer 203 performs, inter alia, formatting of information into a representation that is user friendly, so that a user may read and/or edit. The data analyzer 203 may include prompting the user for annotations, for accepting annotation data, for displaying data, for creating reports, for creating a document map which demonstrates the relationships of one set of information to another, etc.

Reference is made to FIGS. 4-8, illustrating several example windows 401, 501, 601, 701, and 801, open within a user interface according to one or more embodiments of the present invention. One or more aspects of the present invention assist in working with relationships between documents and/or portions thereof.

The user interfaces to the intellectual property documents are optionally enabled by the data analyzer 203, illustrated in FIG. 2. Reference is made to FIGS. 1 and 4-7. In this example, the license in the editing window 401 (FIG. 4) correlates to the editing view 119 (FIG. 1). A report window 701 (FIG. 7) demonstrates the report view 113 (FIG. 1), a map window 801 (FIG. 8) demonstrates the map view 115 (FIG. 1) and a mark-up window 501 (FIG. 5) represents the annotation view 117 (FIG. 1).

Figure 4:
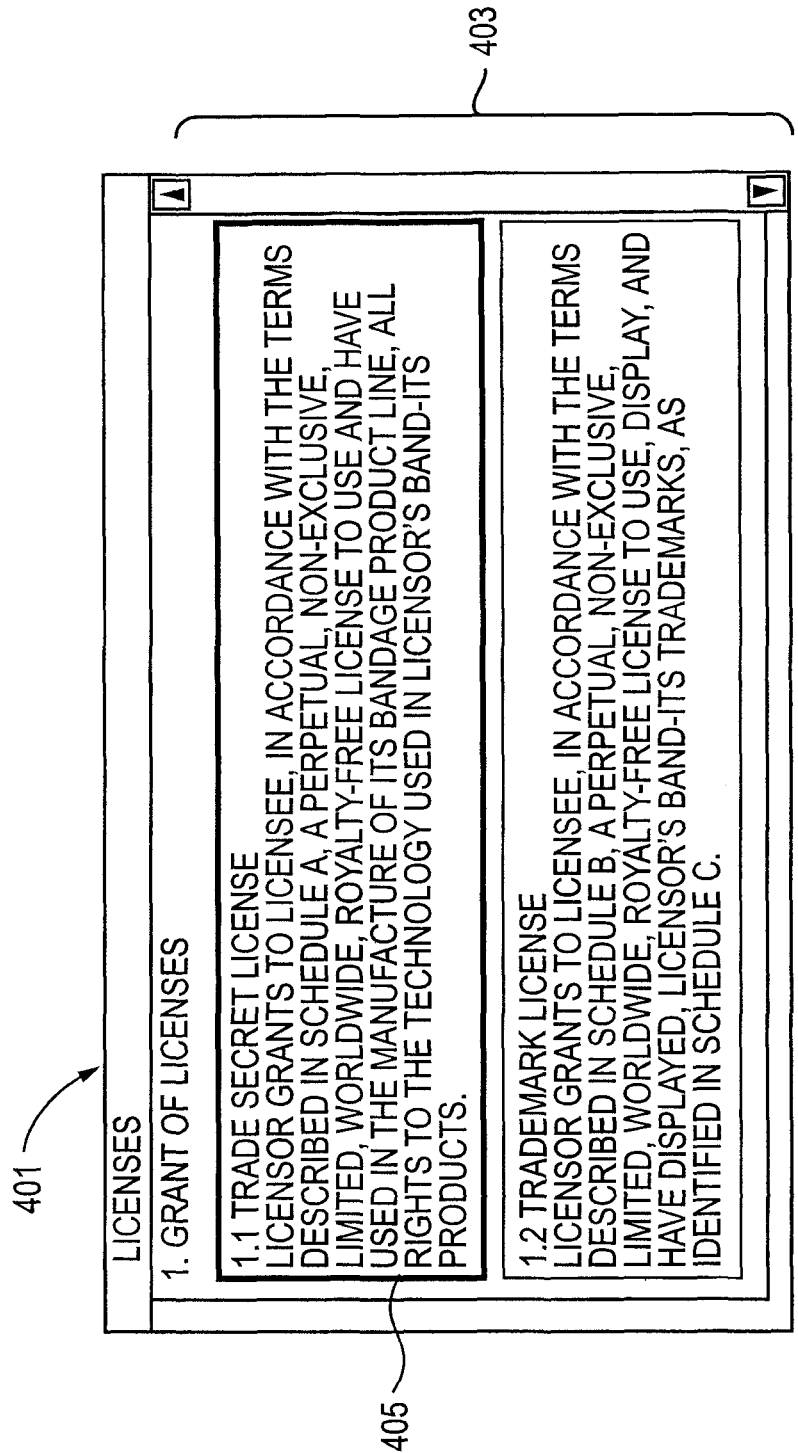
FIG. 4 is a user interface, illustrating editing of an intellectual property document, according to one or more embodiments of the present invention.
Figure 6:
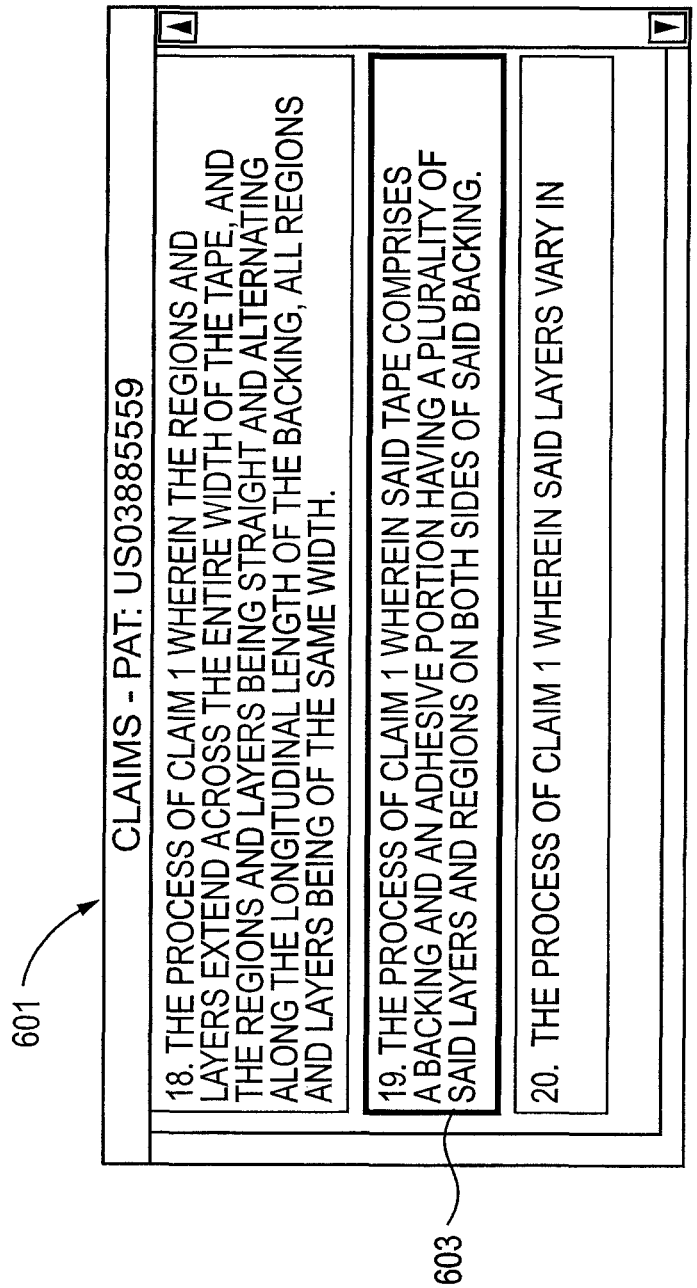
FIG. 6 is a user interface illustrating an example of an additional window for linking a selected document to another intellectual property document, according to one or more embodiments of the present invention.

Reference is now made to FIG. 4. The user in this example has retrieved an intellectual property document to edit and/or annotate, e.g., a license, into an editing window 401. One or more aspects of the present invention provide that the user may logically subdivide that document into sections. Those sections may then be related to sections within that or another document. The relationship between one document and another, and/or between one section in one document and a section in another document (or the document itself) may be annotated. The annotation allows a user, e.g., an attorney who is analyzing this information, to indicate within a document, for example, an issue, the result of an analysis, how this portion of this document relates to that portion of that document, etc.

Referring again to FIG. 4, the intellectual property document 403 (in this example, the license) is displayed in the editing window 401. The editing window 403 presently displays that portion of the document encompassing "Article 1," "Section 1.1," which in the example is entitled "Trade Secret License." In one or more embodiments of the present invention, one or more active portions 405, e.g., "Trade Secret License", may be outlined, and/or highlighted such as in red on the screen, in order to indicate that this is an active portion 405 of the document being viewed. A further indication, e.g., a special highlight or color, e.g., optionally may be used to indicate that there is an annotation associated therewith, e.g. a possible conformance issue or a failed conflict.

By way of example of a possible use of one aspect of the invention, if a user is performing, e.g. evaluation of a license against a patent or a product against a patent, for each of the claims in the patent, the user may be viewing parts of the license and the claims one at a time and indicating that a certain aspect of this product, license, or document fails to conform to some aspect of this patent claim. The user may select one of several standard notations reflecting, for example, a standard, system provided relation, and/or a super-user-customized attribute concerning the respective documents, e.g. that a product or license, etc. is in violation of this patent claim, or may be in violation of this patent claim, or is not in violation of this patent claim. The user may wish to add other text, annotations, references to other documents or URL's or files, etc. to the document being viewed. Those thoughts, however they may be phrased or indicated, are important to capture. An attorney or other user going through an intellectual property document, such as a patent, may indicate that a product, license, etc. does not violate this patent, claims 1, 2, 3, etc. because of annotated reasons, or indicate the need to look into this further, and/or indicate the need for a second opinion or any other indication as desired. Multiple users may each provide separate annotations.

The attorney or other user may review, edit and/or annotate an agreement or other intellectual property document in the editing window 401 for example by selecting a section, or traverse the document section by section. (The document may be subdivided previously, currently, and/or subsequently into sections automatically (e.g., within the XML format) manually, and/or semi-manually.) In the present example, beginning, e.g., with Section 1.1 the user may select a portion of the document in the editing window 401 to add an annotation or mark-up data.

Reference is now made to FIG. 5, showing an example mark-up window 501, to interact with the user to obtain annotations. The mark-up window 501 pops up in response to a user indication that he wishes to annotate a document (or portion thereof). In the present example, the user may select one or more type of pre-defined notations, e.g., "conformance" 503, view "notes" 507, view a history 509 of changes to this section, and/or view some user-defined attributes 511, and/or categories or links to images or web pages, etc.

In the illustrated example, "Harvey Wallenbarger" is the user and selects Section 1.1 in the editing window 401 (shown in FIG. 4). In response to the selection, the system obtains the user's annotation via the mark-up window 501. In the mark-up window 501, in "conflicts" under the "conformance" tab 503, the user selects "possible" indicating that there is a possible conformance violation; the user may alternatively or in addition type in text comments, e.g., to memorialize concerns about the possible conformance violation. By selecting at the top of the mark-up window 501, one or more embodiments of the present invention includes a drop down list box or chooser 505 that provides a mechanism for choosing a related intellectual property document, for example one of several documents that the user may be working with, thereby relating the section and/or its annotation to a section of another (or the same) intellectual property document. In the illustrated example, the user notes a relationship between the annotated license section 1.1 to a section of another intellectual property document. Optionally, the other document or other section of the same document is displayed in an optional further editing window 601, shown in FIG. 6. Optionally, a selected section 603 of the related document is highlighted.

According to one or more embodiments of the present invention, annotation is realized as a manually-driven approach. For example, a user goes through a document one item at a time and performs an annotation. The process of annotating is preferably a manually-driven process, for several reasons. For example, one person may use the term "cup" but another person may choose to use the designation "a liquid containing dispensing container" for the same object. To create an automated mapping between those two designations may be possible, using for example a thesaurus, where the user may add synonyms that expand the scope of the search, etc. Nevertheless, to be able to parse-out the complex language that tends to appear in intellectual property documents, and to be able to accurately perform an analysis against similarly complex wording by a completely different person is, may be better done manually or semi-automatically.

Figure 7:
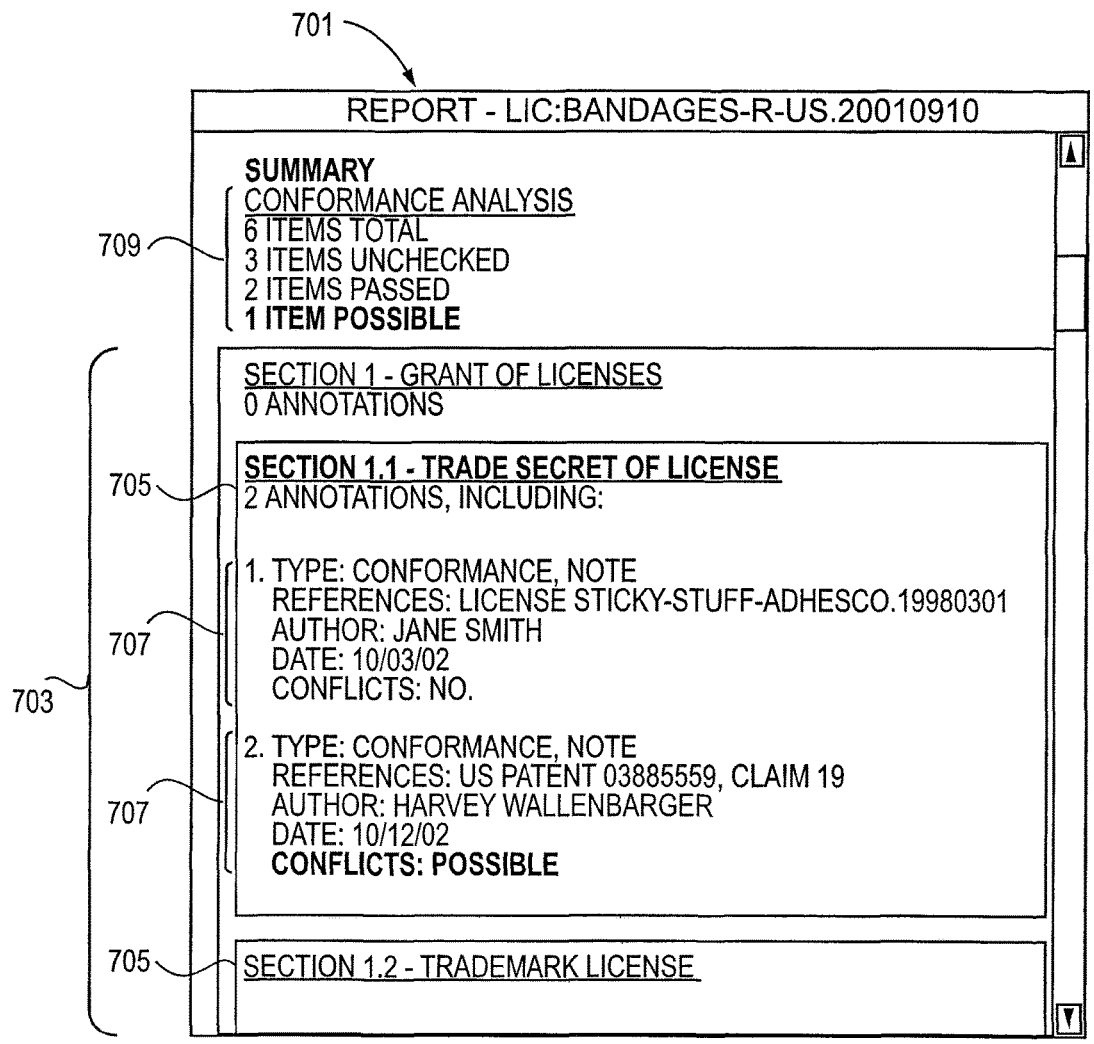
FIG. 7 is a user interface illustrating an example of a report view of a marked-up document, according to one or more embodiments of the present invention.

Reference is now made to FIG. 7. One or more embodiments of the present invention optionally provide for a report window 701. The report window 701 provides a summary of the mark-ups to, e.g., the selected document. In this example, the report window 701 includes a summary 709 of mark-ups including a count of sections and types of mark-ups. Optionally, each section 703 and sub-section 705 also is summarized. A section or subsection summary optionally includes a mark-up summary 707, with, e.g., the standard notation type, any reference(s), author, date, and/or other annotation data. The present example indicates that one or more users has reviewed this license (or other document), checked it against a particular document or documents, and summarized some or all of the mark-up data and associated portions of the document that have been annotated.

Figure 8:
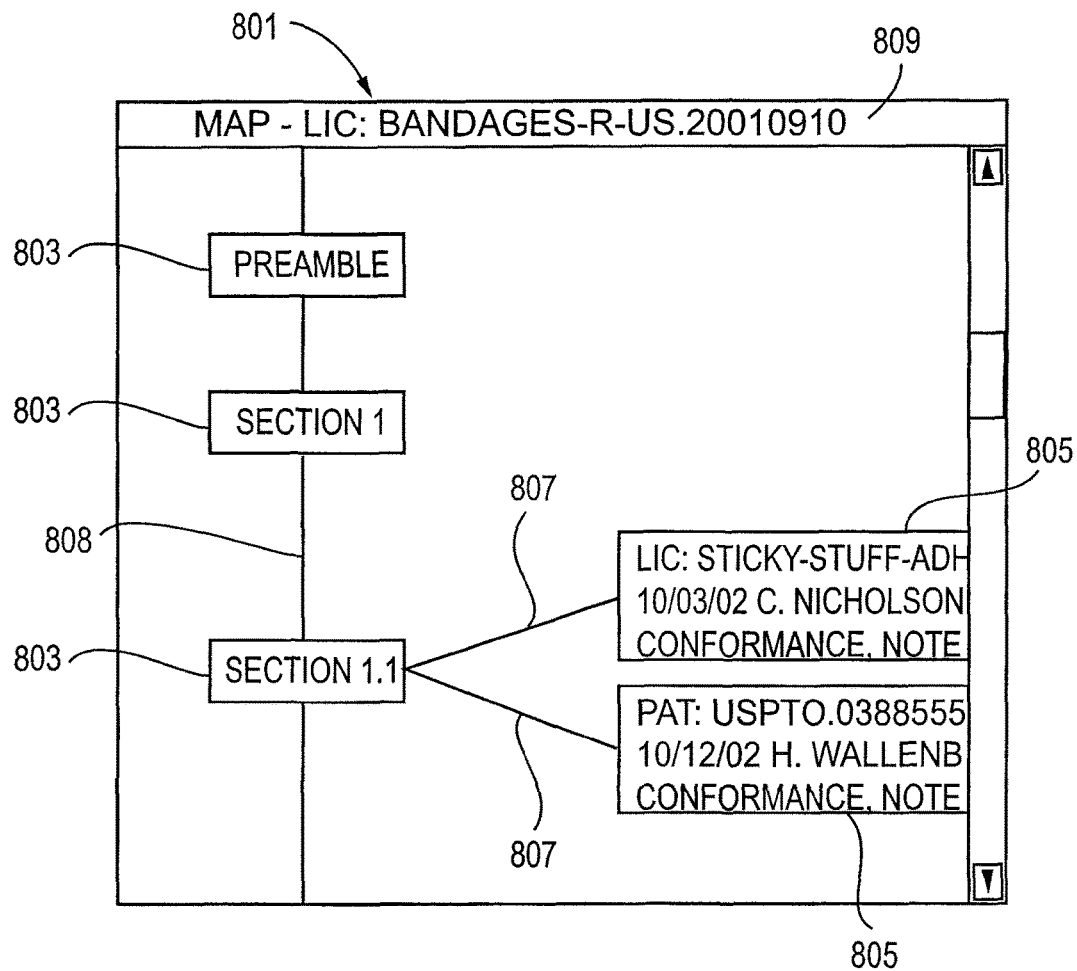
FIG. 8 is a user interface illustrating an example of a map view of a marked up document, according to one or more embodiments of the present invention.

The optional map window 801 illustrated in FIG. 8 provides a map of the sections of the mark-up document 809 and the related intellectual property documents noted in annotations. In the present example, the map window 801 includes a visual representation 803 of each document section and a summary 805 of each related document noted in a mark-up. A map line 807 indicates a relation between document sections and subsections, and a connection 808 is indicated between documents and sections/subsections.

Other components, plug-ins, reports, and/or tools may be provided to view, search, edit, annotate, link and/or mark-up intellectual property documents, in accordance with one or more embodiments of the present invention. The view and window functionality, for example, may be combined, omitted, and/or replaced and/or implemented in an alternative user interface in alternative embodiments of the present invention.

Reference is again made to FIG. 1. The mark-up data optionally is stored logically and/or electronically embedded within the original document, e.g., as an annotation. According to one or more embodiments of the present invention, the system may host most or all of the databases 121, 125, 127, 129, 131 on web servers, for use by any of a large number of users. According to one or more embodiment of the present invention annotated documents are stored, e.g., locally and/or remotely. According to one or more embodiments of the present invention, intellectual property documents are linked to annotations, and the documents are shared.

If the users are unaffiliated with each other, however it would be undesirable to have these unrelated users accessing, e.g., the same patent, marking it up, and physically embedding additional information therein. It would not be suitable to make that information available to all of those users. Consequently, according to one or more embodiments of the present invention, the mark-up data is maintained so that the separate and/or unrelated users are protected from disclosure to each other. Accordingly, the mark-up data optionally is separately maintained from the document data and is correlated to a user and/or group of users.

Further, the mark-up data preferably is seamlessly associated with the document information, and according to one or more embodiments of the present invention is preferably presented to the user as a unitary document. Despite the unitary appearance, when the user is finished working on this document, the document and mark-up information optionally is broken into components, optionally each being stored in the appropriate and/or separate storage. Optionally, the document and mark-ups are stored together.

According to one or more embodiments of the present invention, there are provided two (or more) streams of data, corresponding respectively to the mark-up(s) and the document(s). These data streams are merged together into a single document, and that merged document is presented to the user and/or worked on as a single logical document. When that work is complete or the user otherwise is done, then the document is split up into two (or more) different streams corresponding to the mark-up(s) and the document(s). Preferably, the document is in XML format, but could be in other formats.

Reference is made again to FIG. 3, a block diagram for one or more embodiments of a data manager 201, also showing communications to/from a data server 321 and to/from a data analyzer 323. The data manager 201 may, in accordance with one or more embodiments of the present invention, provide for splitting and merging annotations and documents. In the illustration of FIG. 3, a document with annotations is split into data streams via annotation split 305, and merged into an annotated document via annotation merge 307. Consider an example data flow through the data manager 201: an "XML request" from the data analyzer communications 323 is received by an object API 319. The "XML request" indicates a particular XML intellectual property document (optionally with annotations) to be retrieved, e.g., to be accessed by the data analyzer. The request is received by annotation merge component 307 in the data manager 201. The data manager 201 determines that it needs to obtain one (or more) XML document corresponding to the document data for the intellectual property document, and also one (or more) XML document corresponding to the annotation data. The annotation merge component 307 issues a request to retrieve these two (or more) documents. Consider that one of these, for illustration purposes, is a patent document and the other is annotation data marking up the patent. The annotation data includes, within the set of its information, an association between one or more individual annotations, and the location of the item or section within the patent document (the "entity") that the annotation refers to, for example, specific claims in a patent. So, if (as in this example) the user has annotated a particular claim in the specified patent, then the annotation includes a reference corresponding to the identifier for the entity corresponding to that claim. (There are a number of ways by which an "entity" within a document could be uniquely identified, e.g., offset from document start, logical division, etc.) According to one or more embodiments of the present invention, the annotation merge component 307 processes document data and annotation data (e.g., with an XML parser 308), identifies the one or more entities, within the document with a particular annotation, extracts the annotation (e.g., as an XML mark-up fragment), and embeds the annotation within the section of the document (e.g., an XML section) for the referenced entity within the document.

In accordance with one or more embodiments of the present invention, there are provided two (or more) different documents, one containing annotations and the other containing the document, both including a respective series of entities. The annotation document(s) is broken up into the individual entities; the documents are parsed and it is determined where the annotation entities go in the document; and the document is fattened into a marked-up document. The fattened mark-up document is then returned to the data analyzer as the document in the proper format (e.g., XML) via data analyzer communication 323.

The data analyzer then may, at that point, work with the mark-up document as if it is a single document. That the marked-up document originated from two or three or more different sources, according to one or more embodiments of the present invention, is transparent to the data analyzer. According to one or more embodiments of the present invention, the data analyzer receives, processes, and/or acts on the marked-up document as a unitary document, and when done, returns it as a unitary document. Optionally, the data analyzer works with the document encompassing more than one file, e.g., separate document and annotation data, multiple files for document sections, etc.

According to one or more embodiments of the present invention, the data manager 201 includes one or more annotation split components 305, optionally driven by a mark-up schema 317. The mark-up schema 317 identifies which types of entities belong in a document (e.g., a patent) and which types of entities belong in an annotation. In scanning through the mark-up or expanded document, the system may identify the one or more entities that are an annotation entity. The schema identifies the annotation entities, such as in XML. Further, the system can identify that a particular annotation entity is related to a particular parent document (or entity within a parent document) and may obtain the unique identifier for that parent associated back with the annotation entity. It may then start building a new annotation document. So, in this way the system then supports the collapsing of the expanded mark-up document from the analyzer back into its normal form, extracting the annotations, building another annotation document, and then inserting data for the annotation and/or document back into the Data Server.

In the case of a patent, for example, the original document may be marked as read only, so the user cannot edit the original document. Optionally, the annotation split logic determines whether the document is read-only, thereby avoiding the need to examine edits to the original document, e.g. the original patent document. Consequently, for a read-only document, the annotation split logic 305 may review the mark-up document to extract the annotation information.

Figure 9:
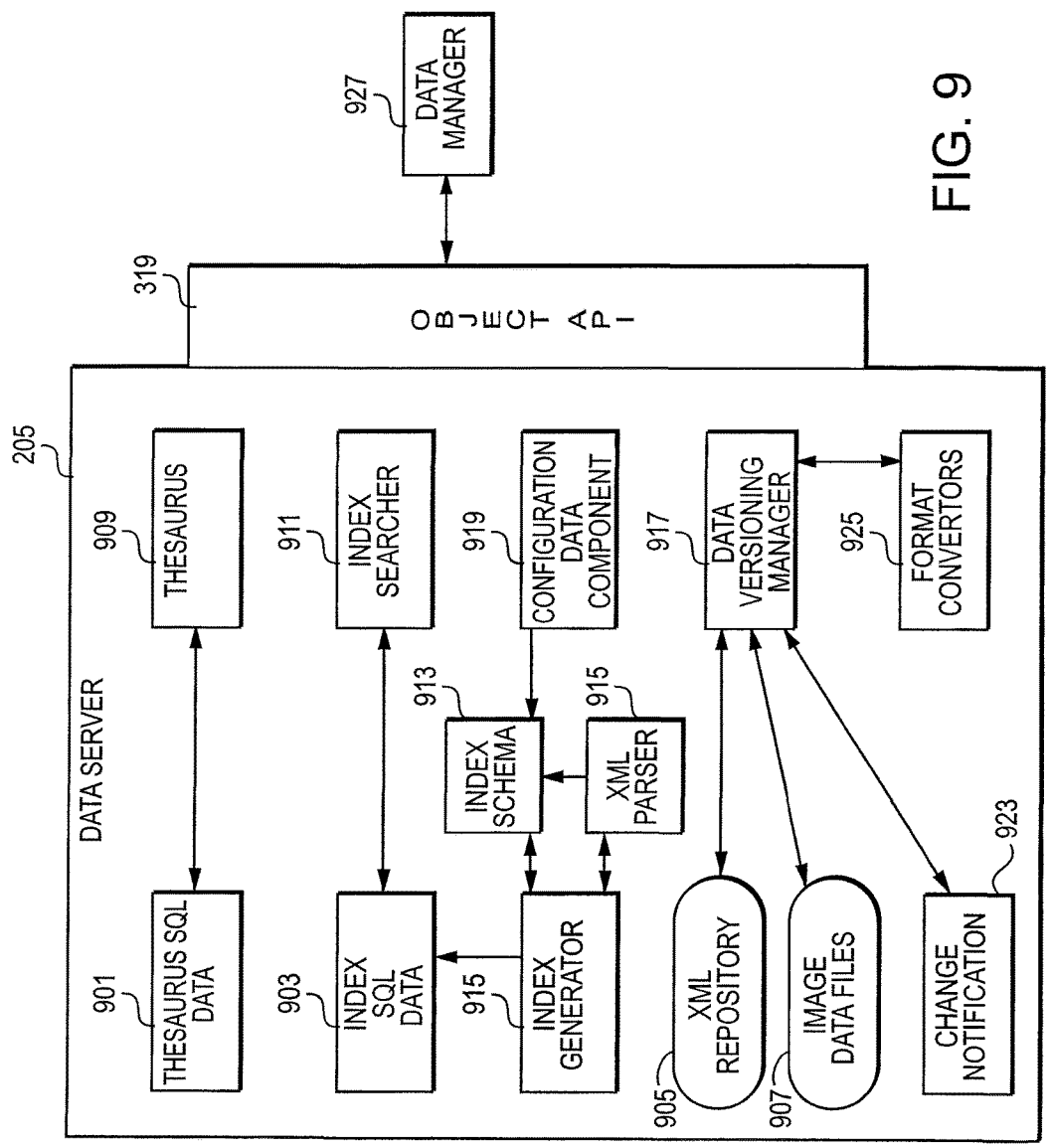
FIG. 9 is a functional block diagram with data flow, illustrating an exemplary data server according to one or more embodiments of the present invention.

Reference is now made to FIG. 9, illustrating an example block diagram of one potential embodiment of the data server 205. According to one or more embodiments of the present invention, one or more data servers 105 retrieve/store documents and/or annotation data. According to one or more embodiments of the present invention, the intellectual property documents are stored separately from the annotation data. If desired, stored documents may be further subdivided, e.g., by intellectual property type (e.g., patent, license, trademark), or file format (e.g., XML, .TIFF, .DOC)

Each data server may advantageously provide an object API 319 which, inter alia receives communications to/from a data manager 927, to insert, update, delete, and/or request data in a format appropriate to the document(s), annotation and/or image data, e.g., XML. Hence, where documents and annotations are stored as, e.g., XML formatted data streams, the data server may act as a repository for document and/or annotation data.

When an XML data insertion or update occurs, the XML data advantageously may be stored within an XML repository 905, e.g., as a new revision of the document. The data server 205 receives the document or documents for storage, e.g., through an XML update request. An XML update request is received through the object API 319 and is optionally sent to a data versioning manager 917 to handle version updates.

According to one or more embodiments of the present invention, revisions may be managed by a data versioning manager 917. For example, when a data request occurs, the specified data may be retrieved from the data versioning manager 917, the default optionally being to retrieve the latest changes; however, a prior version may be specified within the data request. The changed document, for example the annotation document, is inserted into, e.g., a data versioning manager 917, to accomplish version control. There are several appropriate varieties of commercially available version control software. A version control program generally compares the revised document against the prior copy, makes a list of the changes, and associates a new revision with those changes. Optionally, upon changing or updating a document, a change notification 923 may be initiated for use by other processes.

The object API 319 may provide for services, e.g., to insert, update, delete, and/or retrieve binary data (such as for images). Such binary data advantageously may be managed by the data versioning manager 917, and optionally a new revision may be created on update. The binary data type may be stored advantageously with the binary data when inserted or updated, e.g., in image data files 907. The various standard image types (e.g., JPEG, GIF, TIFF, etc.) optionally may be known to the system as predefined data types. Optionally if an image is requested in a different known format than it is stored, conversion to the requested format may be performed, e.g., during retrieval; the may be done advantageously by one or more format converters 925.

One of the other aspects of the optional version control system is that it is possible to label a particular version as having a given name. The label then readily allows the system to associate a version of the annotation data with a version of the document data. (The annotations and the document may be changing at different rates.) One or more embodiments of the present invention provide the ability to create an associated name with a revision, and the version control allows the system to then associate the various into version streams that are changing at different rates.

The document being edited and/or marked up, e.g., a license agreement, may be changing at a very rapid rate initially but then those versions may slow down as the license matures. Conversely, the annotations may start to grow rapidly or there may be a period when a company is working with a particular sub-licensing arrangement where those changes are occurring rapidly as well. The XML document received from the data analyzer is then fit into the data versioning manager, 917. Relevant information optionally is stored into a repository 905 and that reflects one part of the life cycle of that document.

The optional XML repository 905 provides the data versioning manager's log file storage, for change records. It may use a form of data compression that is typically used in version control systems where storing the changes that have happened from one revision to the next of the document.

When XML data is inserted or updated in an XML document, it may be parsed by an XML parser. Optionally, a configuration data section 919 may be used to identify document structure. An index schema 913, for example, may be used to identify XML tags that the XML parser 308 uses to break up the document into major sections; and a separate index may be generated, e.g. by an index generator 915, and may be maintained for each such section. During parsing, the various elements of the XML data stream may be identified. Their contents further may be parsed to extract the individual words within each element. These extracted words may be compared against a table of unimportant words. If not matched in the table, the word, together with the unique (fully qualified) XML document name, plus its new revision number, if any, are may be stored in an index SQL database 903. Each entry (e.g. row) in the table may be identified (via e.g., primary key) by the word, the document name, and the revision, or in any other appropriate way. This table may contain a separate field (e.g., column) for each section of the XML document, which may contain a count of the number of times (e.g. frequency) the word appears within that section. This realization may enable an index searcher 911 to place the most likely candidates at the beginning of the search results. Other realizations are possible, and will be appreciated by one of skill in the art. The data server optionally includes a thesaurus 909, which may reference and/or manage a table of synonyms to be used, inter alia, in broadening the field of search. Thesaurus 909 may maintain relevant data in any appropriate form, such as thesaurus SQL data 901.

When XML or binary data or other data is inserted, updated, or deleted in a document, a change notification 923 event optionally may be generated. This may be broadcast to registered listeners (typically one or more data managers). The change notification event may advantageously provide underlying support for replication, and/or may be used for notifying a user of modifications to a document that they may be reviewing.

Figure 10:
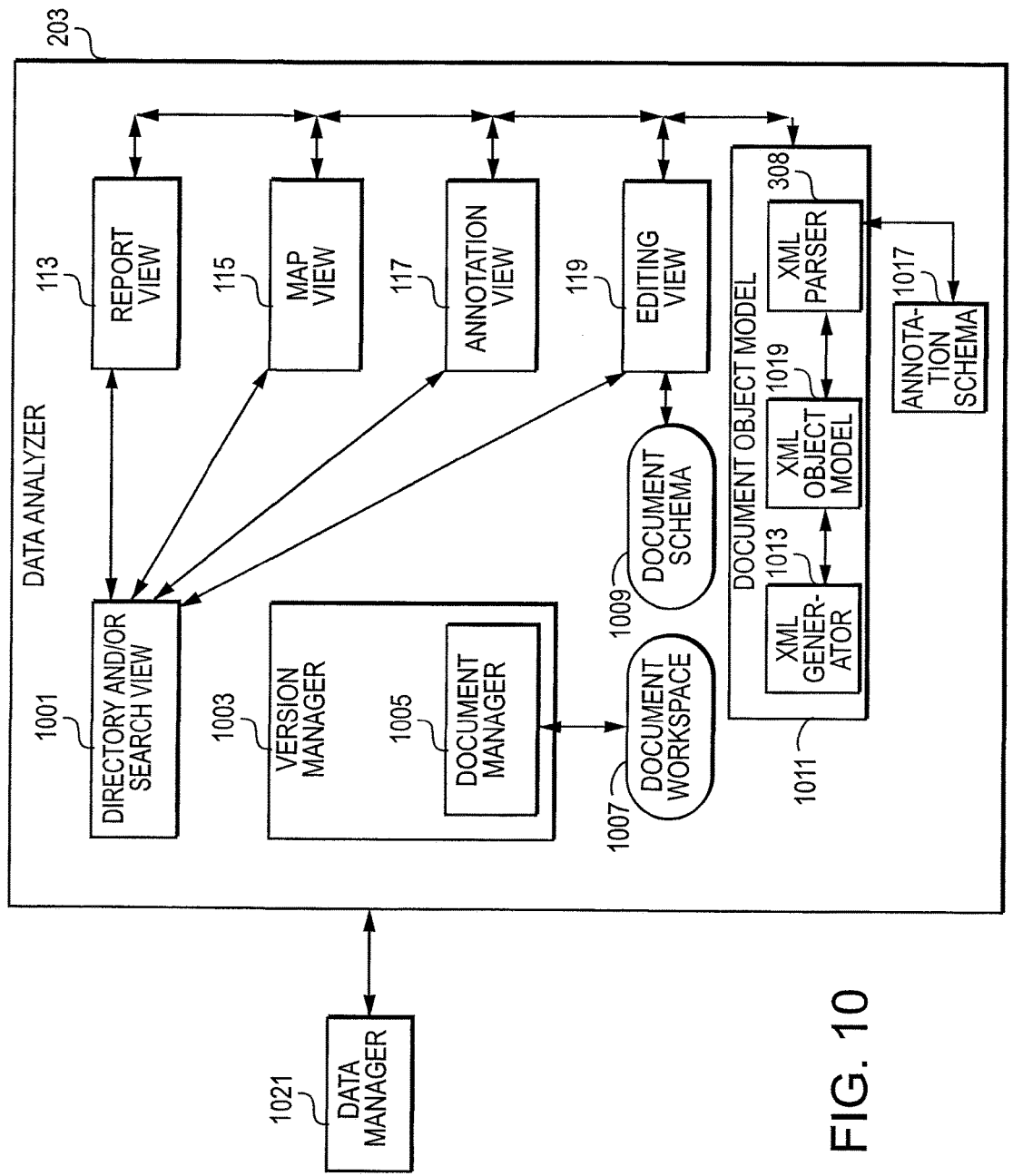
FIG. 10 is a functional block diagram with data flow, illustrating an exemplary data analyzer according to one or more embodiments of the present invention.

Reference is made to FIG. 10, a block diagram of one embodiment of an architecture for the data analyzer 203. The data analyzer communicates via the data manager to one or more data servers on the backend of the system. From a user's perspective, one optionally is interacting with the data analyzer 203 via a user interface, e.g., looking at a directory and/or search view 1001 in order to locate, edit, or annotate a document. For example, a user interface may present a directory as a navigable tree, allowing them to see one or more data managers in connection with respective data servers. Optionally, a data manager may then be responsible for presenting a relevant part of the navigable tree. Other means of displaying documents are equally appropriate, e.g., the data analyzer may show a list of the patents by year issued, by classification, etc. An interface is provided so that the user can identify a document they want to work with. For example, a user may do a search, e.g. for all documents containing the term "cup", and be presented with a list of search results, in order to access documents.

In any event, the user identifies the document of interest, and a request for the document is sent by the data analyzer to the version manager 1003, e.g., for the latest version. In some cases, especially if the user is interested in looking at historical changes, then they may want to obtain a prior version of that document. The version may be important if there is an association between the version of annotation data and the version of the document data. Optionally, the system retrieves multiple versions, e.g., to illustrate a particular moment in the history of that document. The "XML Request" may be sent as a data manager communication 1021 to a document manager 1005, and the requested XML document may be returned. The document manager 1005 reads and then stores that document into the document workspace 1007 according to one or more embodiments of the present invention.

In the document worked on by the data analyzer 203, the annotation data preferably is already merged with the original document data. The merged document may be optionally stored into a document workspace 1007. The purpose of the document workspace 1007 is so that a user may remotely work on a document, such as on a notebook computer not connected to a network. The data may be local in the workspace. Hence, if there is a disconnect from the original data sources, it is irrelevant in terms of working with the document.

When the remote user finishes edits or annotations on those one or more documents, they may then check those documents back into the data server through the data analyzer and the data manager. When a document is to be worked with, it may be extracted from the document workspace 1007. Optionally, the document to be worked on is broken down into elements, if any. The document workspace 1007 may be, for example, a file in a directory or a set of directories on a disk. To break the document into elements, according to one or more embodiments of the present invention, the document is extracted from the document workspace, and fed into the XML parser 308 within a document object model 1011. The document object model 1011 may be, e.g., standard binary representation or object representation of XML. An annotation schema 1017 may be referred to within either the XML parser 308 and/or an XML generator 1013, for example in the process of conversion to and from the object model 1019.

Once the XML data is broken down into an internal object representation, it is possible to look at an individual element, and determine, e.g. what is the content of that element in terms of text, name of the tag, text of the entity, tag name for the entity, and/or parent entity for it.

The merged or annotated document advantageously may be provided in XML format. The XML document is a structure with a balanced mark-up tag; each tag specifies a start and end of the section, and inside a section there may be nested one or more start/end of another section one. Each one of these start/end blocks may be a node. Each entity within that becomes a sub-node of a tree, creating an in-memory representation of the document tree that can be traversed to the parent node, child node, siblings, etc. The XML object model 1019 then contains the document data and child nodes for each one of the paragraphs or items that have been annotated. An annotation node contains the annotation data. It contains the type of a mark-up, e.g., "conformance", link to another document; textual node, etc.

Optionally, the user is provided one or more views in order to assist with analysis of the document. Each of the different views 113, 115, 117, 119 works with the merged document, according to one or more embodiments of the present invention. The views 113, 115, 117, 119 may determine document format, e.g., by a reference to a document Schema 1009. The user selects the function he wishes to perform on a document, e.g., view a report of the document 113; view a map of the document, links and mark-ups 115; view annotations 117; and/or edit the document 119.

Reference is made to both FIGS. 4 and 10. The editing view 119, and editing window 201 illustrate one example of editing an intellectual property document, here, the license. The editing view examines the tree structure of the document or a nesting of levels within a document. Here, there are articles at the outermost levels, sections within that, and perhaps each section has clauses with sub-clauses. They may be broken down separately. In this case, there is an article at the outer-most level, which is at the same level as the preamble, nested within that article 1, "Grant of Licenses", there is article 1.1 "Trade Secret License". The entire text for "Trade Secret Licenses" may be contained within one node in the document object model. The "Trade Secret License" tag may be contained elsewhere within that node and embedded therein; "1.1 Trade Secret License" is a node, the child node of that is the text of the paragraph, etc. At another child node of Section 1.1, there is provided a conformance mark-up (displayed as illustrated in FIG. 5 in the mark-up window 501). The data and/or attributes within the conformance mark-up would indicate that there is a possible conflict, together with the contents of the text within that child node or within a further child node thereof. This mark-up information for the illustrated conformance item may be associated with Section 1.1 as a separate node.

With regard to the illustrated Section 1.1, the user may select the node indicated as selected, e.g., by a frame 405, e.g. by a double click or click inside the frame 405. The view may change to an editing view such as a frame with scroll bars. The user may modify the content of the selected information. The system automatically updates the original document information.

Reference is again made to both FIGS. 5 and 10, illustrating an example mark-up window 501 and annotation view 117 within one or more embodiments of a data analyzer architecture. The annotation view 117 and mark-up window 501 display the mark-up associated with document, and/or documents to which the document has been linked. For example, the systems traverse the object-model tree in memory, locate annotations that exist within that tree, and locate the particular corresponding annotation(s) for items at a given level within the tree. It is also aware of the document object model in this example.

Reference is again made to both FIGS. 8 and 10, illustrating the map view 115 together with the map window 801. The map view 115 reviews each of the nodes within the selected document and displays them for example, within a tree or a map format. In the present example, it displays a tree of boxes representing nodes within the document, nodes of other documents connected from the selected document, and/or annotations associated with the document; and lines connecting the boxes together, representing links from the document (or nodes therein) to other documents (or nodes therein) and/or associated annotations. It is working off of the object model in this example.

Reference is again made to both FIGS. 7 and 10. The report view 113 and report window 701 look at different elements of the document, nodes, and annotations and pull them together into a textual representation and/or summary.

Advantageously, each of the views 113, 115, 117, 119 is provided as a plug-in to the system architecture, or similar fashion, to enable views to be added, omitted, supplemented and/or combined. Other views may be provided, and the examples herein are provided merely for illustration of the underlying principals. Further, although it is advantageous for the views and/or data analyzer to work on one document as a whole, the document could be provided in multiple parts and/or with separate annotations.

Figure 11:
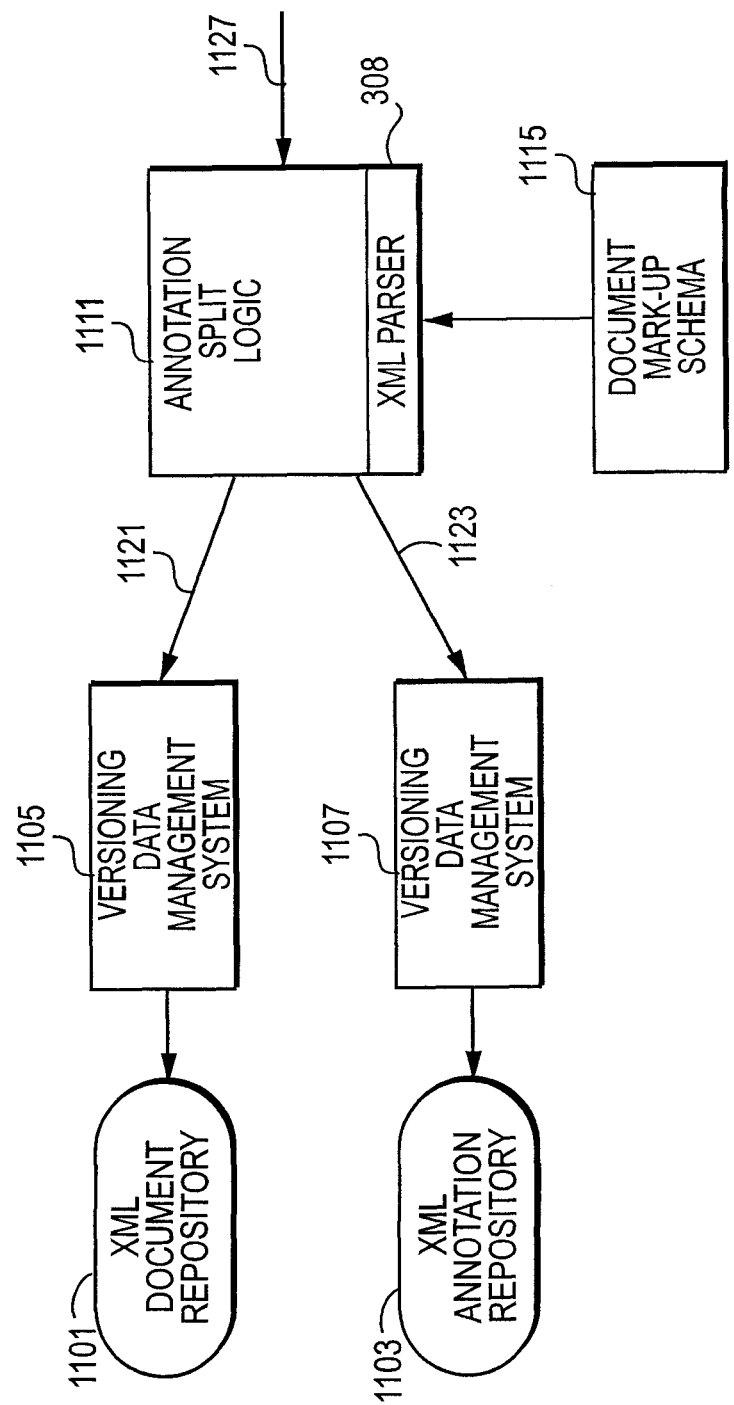
FIG. 11 is a block diagram, illustrating data flow for splitting an annotated document into annotated data and document data, according to one or more embodiments of the present invention.

Reference is now made to FIG. 11 showing an example embodiment of an optional data flow for splitting an annotated document. In this conceptual illustration, the annotation data stream 1123 is separate from the document data stream 1121, and the annotations and documents are stored separately. The annotated document 1127 is received by the annotation split logic 1111 and is broken apart into document output data stream 1121 and annotation output data stream 1123, e.g., for storage, e.g., in an XML document repository 1101 and an XML annotation repository 1103. The document is parsed, e.g., by an XML parser 308, and a document mark-up schema 1115 is used to help identify nodes within the document and/or annotations. If implemented using XML, tags are associated with the document, and the tags that are associated with the annotation.

Optionally, multiple versions of the document and/or annotation are managed, e.g., by respective versioning data management systems 1105, 1107.

Preferably, any kind of annotation data, and/or any kind of document data, and/or format may be accepted. They are advantageously converted into XML, and then converted from XML into their native format.

Figure 12:
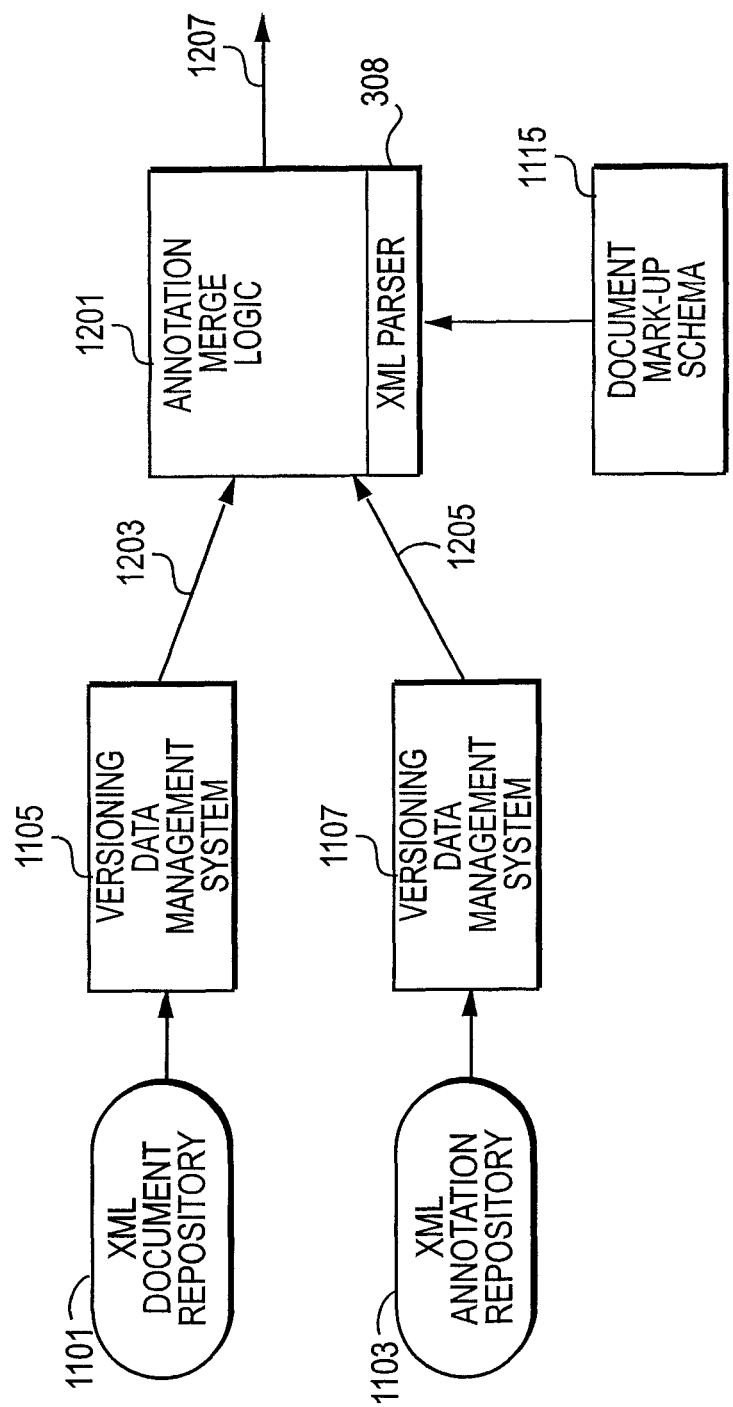
FIG. 12 is a block diagram illustrating data flow for merging the annotation data and document data of FIG. 11 into the annotated document, according to one or more embodiments of the present invention.

FIG. 12 further illustrates that there may be two or more input data streams 1203, 1205, retrieved from the XML document repository 1101 and XML annotation repository 1103, for a particular marked-up document, which are merged together in accordance with one or more embodiments of the present invention. At least one set of the input data streams contains document data 1203, and at least one other set of the input data streams contains the annotation data 1205 to be applied to such document data 1203. Annotation merge logic 1201 identifies locations in the document into which to associate annotation data. If the document is XML, e.g., an XML parser 308 may utilize the document mark-up schema 1115 to identify appropriate locations.

If more than one document is embedded within a stream, the system may extract that document from multiple documents embedded within a single stream, in order to obtain a single-document stream in any event.

The document data may optionally be provided in multiple document streams. In the case of the USPTO database, data from 1976 to 2000 is stored in a formatted character mode, which is non-standard and awkward to handle. This information is stored as provided by the USPTO, in multiple files per patent. Those files contain the abstract information, information about the inventor, a brief description of the claims, drawings, etc., so there are several documents for a given patent. Optionally, all of the annotations that relate to one other document could be stored in one annotation stream, and all of the annotations relating to yet a different document optionally may be stored in a separate annotation data stream. There is no requirement that all annotations for a document come from or be stored into a single annotation file.

Annotation merge logic 1201 inputs the input data streams 1203, 1205, and creates a mark-up representation of the document data, containing, referencing or including the annotation data, whether by structure or reference for associating the annotation data with its corresponding elements within the document data.

FIG. 12 further illustrates a document input data stream 1203 containing document data, and an annotation input data stream 1205 containing annotation data. The annotation merge logic 1201 outputs the result of the merge, i.e., a marked-up output data stream 1207. The representation of marked up output data can reference the annotation information in many different ways. XML is fairly flexible and one advantageously may define the annotations at the top of the document as entities. Accordingly, one may take text as written, paste it into the XML document and then re-parse the document, to further evaluate the XML structure.

The XML element is a macro that may be cut, pasted and inserted into another section of the document by reference. Hence, one alternative according to one or more embodiments of the present invention is to take the annotation data, define each one of them as elements at the top of the file, and then simply embed a reference to that element within each of the paragraphs where it needs to be expanded. That provides the mark-up copy, and it is semantically equivalent to embedding the actual mark-up entities within the entities that they refer to in the original document.

There are several alternative ways to include the annotations, e.g., write the annotation to a separate XML file, and use an include statement to include the contents of that XML file. The concept of the different ways of expanding into the mark-up document may be realigned in different ways, whether by inclusion of an element, the macro-type element, by doing an include to pull it in from another document, or by expanding out the XML code for such representation further containing, referencing or including the annotation data.

There are a number of alternative ways in which the data may be provided. The data stream could be, for example, a named pipe, data from a firewall, data from a disk, or data from a database, etc.

According to one or more alternative embodiments of the invention, the document data and/or the annotation data are stored in multiple data servers, and may be accessed via one or more data managers. For example, data might be distributed among servers physically located, e.g., at a global headquarters of an information service, a corporate headquarters of a company, of a small law office, and/or a personal computer.

According to one or more alternative embodiments, the document data and/or annotation data and/or marked up document are provided as data streams. If a data stream contains image data or other binary data, one of the data streams may include data for associating the image or binary data with the annotation data and/or document data. This is useful if, for example, there are images that are associated with many of the patents, trademarks, etc.

The image/binary data stream is not necessarily distinct from the document data stream or, if appropriate, the annotation data stream. The document itself may contain a reference to an image, and/or the annotation itself may contain the reference. In one or more embodiments of the present invention, on the other hand, the image/binary data stream might or might not be distinct from the document data or the annotation data.

According to one or more embodiments of the present invention, annotation data may contain an association of an external data stream of, e.g. document data. The annotation data may have an association to external data, e.g., a hyperlink to a URL web page, a fully-qualified file name on a network server, the document, a name of a program, a name of a command string that can be executed through a command shell to start, e.g., a computer aided design (CAD) system with a particular CAD file, etc.

According to one or more embodiments of the present invention, associations may be formed between the version of an annotation with a version of the document. Preferably, one or more of the input data streams is from a versioning system, where there is provided a version control system, with multiple versions of a document and/or annotation. The system and/or user selects one of those document versions and/or annotation data, from the versioning system. Where both document data and annotation data are provided from a versioning system, there may be one or multiple versioning systems.

Marked up input data streams may contain annotation text, or may be related to a stream that contains annotation text. According to one or more embodiments of the present invention, a marked up document may be received as an input data stream or marked up document coming in to an input data stream. Annotation data may be included that is associated with, embedded in, or connected with the input data stream. The input data streams may include, inter alia, annotation data, and/or a marked up document representation. The system is capable of parsing such marked up document representation. The system may extract from such marked up document representation the annotation data which may be placed into one or more output data streams. The annotations are optionally stripped out, and made separate and distinct from the marked up data stream.

The system can review the marked up document, and may extract the relationship between the annotation data and the elements of the document.

According to one or more embodiments of the present invention, there is provided a user interface. When the user selects a different kind of annotation or when the content of the annotation changes, for example, the user may dynamically change how a particular user interface displays the information that it is working with.

Depending on the type of the annotation, e.g. a conformance test, one or more parts of the user interface may display themselves differently than for history of the document. Consider that something is displayed in a user interface window. The user selects one of several different annotations that they want to work with. The screen displays the information they are working, as it changes, in one form or another.

Figure 13:
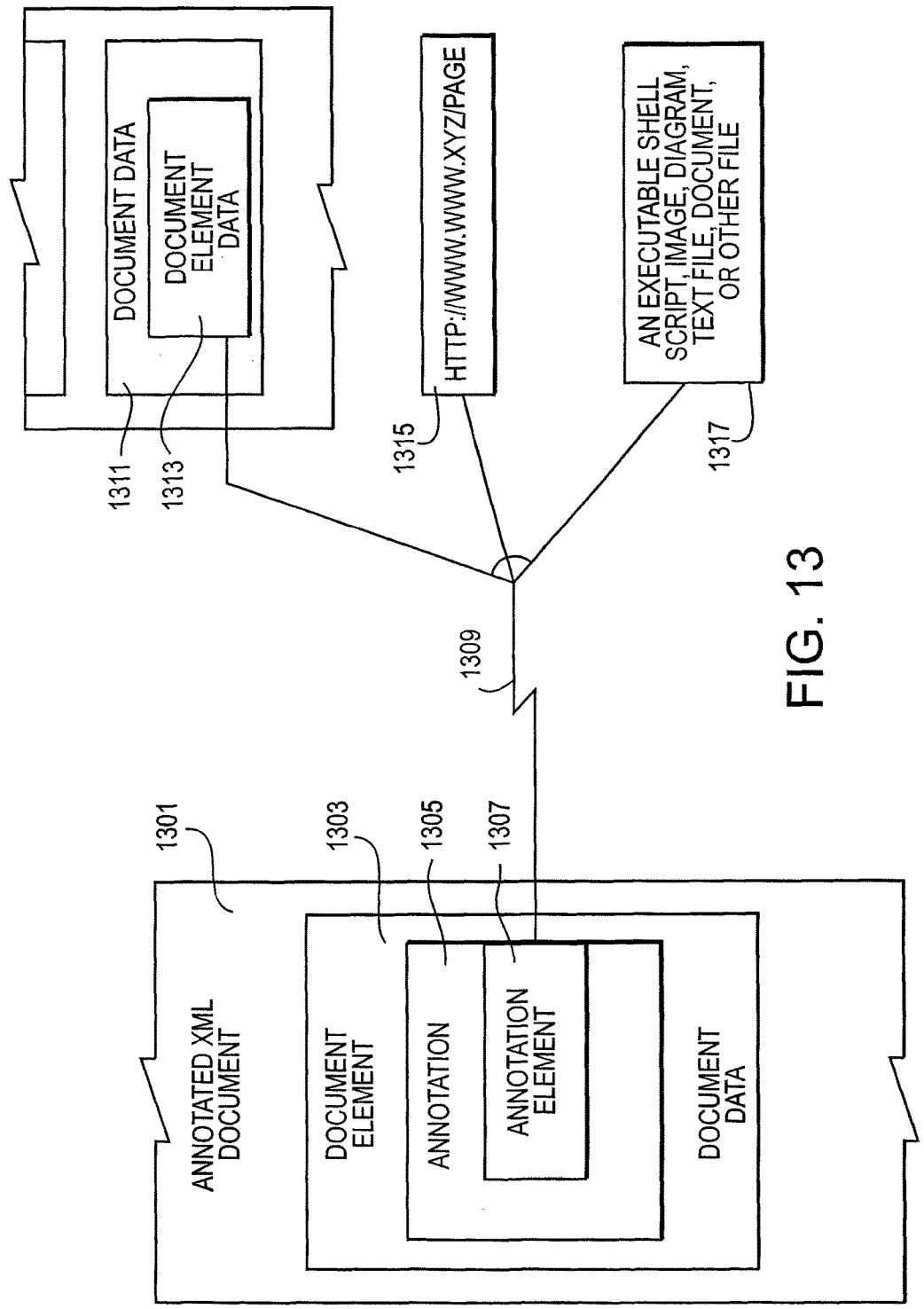
FIG. 13 is a block diagram illustrating an example association of external data with a document that has been annotated, in accordance with one or more embodiments of the present invention.

FIG. 13 illustrates an example of an annotated XML document 1301, according to one or more embodiments of the present invention. The annotated XML document 1301 includes one or more document elements 1303 embedded therein or otherwise associated therewith, with document data. One or more annotations 1305 are embedded or otherwise associated therewith. The annotation 1305 includes one or more annotation elements 1307, which reference data, a document, an external data source, etc. The annotation element 1307 may have a link 1309 to zero, one or more external data streams. In this example, a link 1309 is provided to data streams including a document element data 1313 within another document 1311; a URL 1315, e.g., "http://www.www.xyz/page"; and other external data source 1317, e.g., an executable shell script, image file, diagram, text file, document, or other file (voice, audio, video, binary, etc.)

Reference is now made to FIGS. 14A-B, illustrating an example flow chart for merging document data together with annotation data to produce a marked-up representation of the document. At step 1401, the user selects a document to be marked-up. At step 1403, the system determines whether the currently located document is the correct document for marking-up. If not, at step 1405, the system searches for the correct document. Once the correct document is obtained, at block 1407 the system determines whether the current version is the correct version. If not, the system searches for the current version of the document at block 1409. Once the correct version of the current document is obtained, at block 1411, the system determines whether there is any annotation data for the selected document, for the particular user. If the current annotation data is not the correct annotation data, at block 1413, the system continues to search for the annotation data corresponding to the selected document, block 1417. At block 1415, if the current version of the annotation data is not the correct version of annotation data, then at block 1419 the system continues to search for the correct version of the annotation data.

At block 1421, the system has the correct version of bother the selected document and the annotation data, and the system proceeds to place the document data into a mark-up representation of the document. At block 1423, the system loops to check for additional items of annotation data. For another item of annotation data, at block 1425 the system locates the corresponding element within the mark-up representation of the document, and at block 1429, the system, associates the annotation data with the corresponding element of the document. When there are no further items of annotation data, at block 1427 the system provides the user with a marked-up representation of the document. Processing ends at block 1431.

Reference is now made to FIG. 15, illustrating one example of splitting of a marked-up representation of a document into annotation data and document data. At block 1501, the system obtains a marked-up representation of the document. In blocks 1503, 1507, 1511, 1515 and 1517, the system loops to obtain each element in the marked-up representation of the document, determine the annotation(s) in the element, and split out and store the annotations. In blocks 1505 and 1509, the system separately stores the document data and annotation data. Hence, in block 1503, the system, determines whether there is another element in the document. If so, the system obtains the next element in the marked-up representation of the document at block 1507. At block 1511, the system checks whether the element includes one or more annotations. If so, the system stores the annotation(s) in the annotation data at block 1515. At block 1517, the system stores the element in the document data. The system loops back to block 1503 for the next element in the document. Once done processing elements in the document, the system stores the document data, as a new version, for this user, at block 1505; and stores the annotation data, as a new version, for this user, at block 1509. At block 1513, the system returns from processing.

FIG. 16 is a linked diagram illustrating an example of linked, annotated intellectual property documents and data, according to one or more embodiments of the present invention. Here, one or more users has linked together several related intellectual property documents, in this example including a text document 1601 (titled "Power Projects"), technical description documents 1603, 1605 (titled "Jet Engine" and "Turbine Engine"), a patent infringement analysis 1607, and several patents 1609a-h. In this example, associations between two documents are illustrated by links 1613. A document may be linked one way or both ways. A link may be to/from the document generally, or a specific location in the document. Each link may include an annotation 1611. Preferably, the annotation includes any user comments, user-supplied text, other user-supplied digital data, user-defined attributes (e.g., company's patent, competitor's patent, project name), history, etc. In the present example, a user could select the "Power Projects", view the links and embedded annotations regarding the "Jet Engine" and "Turbine Engine" documents. The user could select one or more of the links to linked other intellectual property documents. The process continues throughout the chain of linked documents. The user optionally may select yet another intellectual property document and create a link with optional annotation. An intellectual property document may be multiply-linked, and may link to itself if desired.

FIG. 17 is a linked diagram illustrating another example of annotated intellectual property documents and data, according to one or more embodiments of the present invention. The subject of this example is a license 1701 including multiple terms 1713. The license generally is linked both ways to a related product document 1715. The license includes annotations with internal notes 1705, 1707 on two terms; an annotation of a term with multiple versions of proposed changes to a license term 1709; an annotation relating to two terms with a digitized voice recording of a negotiation 1711; and a link both ways to a related patent, trademark or other intellectual property document 1703, with annotations 1611.

FIGS. 18 A-B is an example flow chart illustrating an interaction with the user to obtain annotations and links for an intellectual property document, in accordance with one or more embodiments of the present invention. At step 1801, the document to be marked-up is provided to the user, for example via a display. The document may have been previously obtained, for example via a search, browse, or other retrieval component, tool or function. At step 1802, the system interacts with the user to determine a portion of the document to be marked-up. The document may have been previously divided into sections and/or subsections, for example, that are candidates for marking up. Alternatively, the user may, e.g., perform a click-and-select function to selected a portion. At step 1804, the system optionally indicates the determined portion, for example, by highlighting the portion, via a pop-up-window, via special color, etc. At step 1806, the system interacts with the user to obtain a mark-up for this portion of the document. For example, the system may provided a pull-down menu, a pop-up window, a particular font, etc. The permissible contents of mark-up to be applied may be customized by an administrative user, may be free-form, and/or may have a check-list of pre-defined elements, etc. According to one or more embodiments of the present invention, the user may select and/or enter the mark-up information. At step 1808, the system determines whether the mark-up is to include one or more references to an intellectual property document. If so, then at step 1810, the system provides that the user can locate and/or link from the present document to the intellectual property document. In the present example, the system provides a search and/or browse tool to locate the document. At step 1814, the system interacts with the user to indicate a selected portion of the document to be linked to. The selected portion may be some or all of the current document, and/or another document. At step 1818, the system saves a reference, e.g., a link, pointer, identifier, for the other document and any selected portion, together with the associated mark-up. At step 1812, the system saves the mark-up, together with any optional reference to another document and/or the indicated portion thereof, into, for example, temporary storage. At block 1816, the system checks whether there are any further mark-ups to be applied to the current document, and if so, loops back to step 1802.

If there are no further mark-ups and if the document and mark-ups are to be saved, then at block 1820, the system determines whether the marked-up document was edited and/or was editable. If so, the document is stored at step 1822. At step 1824, the system determines whether there is one or more saved mark-ups to be applied to the document. If not, then the system exits. If there are mark-ups, then at step 1826, the system determines whether the mark-ups are stored separately from the document. If not, then at step 1828 the system stores the saved mark-ups together with the document. Otherwise, at step 1830, the system stores the saved mark-ups separately from the document, and at step 1832 stores data representative of the mark-up locations within the document. The function then exits processing.

FIG. 19 is a flow chart illustrating one example of traversing from intellectual property document to intellectual property document, via links associated with the document and/or sections thereof, optionally having annotations. At step 1901, the system obtains the document, and displays the document together with annotations (or indications thereof). At step 1903, the system loops for the user to select an annotation and/or section of the document associated with a link. At step 1905, the system displays the annotation information, if any. At step 1907, the system determines whether the annotation (or selected section) includes or is associated with one or more links. If not, the system loops back to step 1903. If there is at least one link associated with the annotation (or selected section), step 1907, then the system loops at step 1909 until the user selects a link. When the user selects a link, then at step 1911, the system determines the location of the linked document (or section thereof) via reference information, for example, stored or associated with the annotation, obtains the linked document (or section thereof), and displays the just-obtained document, optionally together with any annotation indications. The system then loops back to step 1903, enabling the user thereby to continue to traverse the related linked documents.

Reference is now made to FIG. 20, illustrating an example architecture for use in connection with one or more embodiments of the present invention. In the present example, a computer 2001 hosts one or more annotations components 2003 and one or more linkages components 2005. The annotations component has one or more of the following: a component to apply an annotation 2013 to a document; a component to edit an annotation 2015; and a component for document and/or section selection 2017. The apply annotation component 2013 interacts with the user to create an annotation, e.g., using menus, free form text, cut-and-paste of text, web pages and/or hyper links, and to apply that annotation to the document (or to the selected section of the document). The annotation may be applied, e.g., by inserting the annotation into the document, by saving the annotation separately in an annotations database 2011 and inserting a reference to the annotation into the document, and/or by saving metadata associating the reference and the document (or selected section thereof), etc. The edit annotation component 2015 interacts with the user to edit an existing annotation, e.g., using menus, free form text, cut-and-paste, etc., and optionally to save the edited annotation. The edited annotation may be saved, e.g., by saving the edited annotation with the document, by saving the edited annotation separately and optionally updating a reference to the annotation into the document, and/or by updating metadata associating the reference and the document (or selected section thereof), etc. The document and/or section selection component 2017 interacts with the user to determine a portion, portions or the entirety of the document to be associated with the annotation.

The linkages component(s) 2005 include one or more of: a component to establish, indicate and/or remove one or more links 2019, a component to allow the user to traverse one or more links 2021, and a component for document and/or section selection. The document and/or section selection component 2023 interacts with the user to determine a portion, portions or the entirety of one or more documents to be associated with a link. A link may be between one or more documents or sections thereof. A document may be linked back to itself or a section therein. The component to establish, indicate and/or remove a link 2019 interacts with the user to determine the document and/or section to link from, and the document and/or section to link to. The link may be established or indicated, e.g., by inserting a link (e.g., reference, pointer, etc.) into the document, by saving the links separately in a links database 2009 and inserting a reference to the link into the document, and/or by saving metadata associating the link and the document (or selected section thereof), etc. Optionally, links and annotations are stored in association. Optionally, links are stored within the associated annotations, or vice versa. The component to traverse links 2021 determines one or more links, if any, associated with a selected document and/or selected portions thereof, optionally one or more annotations associated therewith, and optionally the document title or description at the node of the link. Further, the links component 2021 interacts with the user to determine which link to traverse; to obtain the link (pointer, reference, etc.) to the linked document; and to retrieve the linked document and provide to the user. With the retrieved document, the user may traverse further links therefrom. According to one or more embodiments of the present invention, one or more users 2027 are local communicating with the computer 2001, and/or are connected over a network, e.g., the Internet 1005. In the illustrated example, the documents database 2007, links database 2009, and annotations database 2011 are local to the computer 2001; a further documents database 2025 is accessed via the Internet 1005.

According to one or more embodiments of the present invention, attributes associated with an intellectual property document are stored apart from the intellectual property document. For example, attributes may be stored as metadata. Optionally, attributes are stored in conjunction with other annotations associated with the intellectual property documents. A unique identifier is used to locate the related metadata. A serial number, issue number, other unique identifier, or portion thereof, optionally in combination with, e.g., a country code or intellectual property type indicator, may be used to provide a unique identifier.

A type of attribute may reflect that the intellectual property documents are product-centric and/or services-centric. For many companies or concerns, everything they sell is tied to a product or a service. Other traits or information may be used as an attribute type. Once a user is able to group intellectual property documents, and label the intellectual property documents as being related to one or more attributes and attribute types, then the attributes and attribute types may be used for various applications, e.g., searching, generating reports, etc. Hence, attribute types may include one or more of: a product, a service, an actor (a person or entity who performed an action), a user, the current owner (as provided by the user, e.g., not derived by the system from inherent fields or other data), an indication that the patent is the company's or a competitor's, a project name, and/or an indication of level of conformance.

Referring once more to the example of product/services as a type of attribute, assume that a user has determined one or more particular products or services to be associated as an attribute with multiple intellectual property documents. A user can identify the patent(s) and/or other intellectual property associated with a particular product or service by providing information identifying the product or service. Conversely, by identifying a particular patent, for example, a user may determine the products that are relevant to the patent.

Consider for example, that a user wishes to analyze a patent from the perspective that the user owns the patent. In this example, the user specifies the patent, and determines that the patent relates to a particular component. The user may then request a report to see all patents associated with the particular component. Assume further that the attribute type of component is a sub-type of the product attribute type. Hence, the particular component relates to a particular product. The user may then request a report to see all patents associated with the particular product.

By providing one or more attributes and/or attribute types by, e.g., pull-down menu, tree structure, or check-list, a user may easily determine the attribute or attribute type that is desired. For a user with a product- or service-oriented viewpoint, the attribute types may relate to products and/or services. The attributes and/or attribute types may be predefined by the system, and/or may be user-customized, e.g., by an administrative user.

An intellectual property document may be associated with one or more attribute types, and an attribute type associated therewith may be assigned one or more attributes. For example, a patent for a chemical dye may have a product type of "clothing, food, and hair care." A query for intellectual property documents related to the product "clothing" would return results including the patent for the chemical dye.

According to one or more embodiments of the present invention, a company or user may customize the attributes and/or attribute types. According to one or more embodiments of the present invention, one or more attributes and/or attribute types may be locked so as to be unchangeable except by an appropriately authorized user. An attribute optionally permits addition of free-form information by the user, e.g., text, URL to a file, a reference to another intellectual property document, an image file, a video file, an audio file, or a file made using another computer software application.

Optionally, one or more attributes to be associated with a particular intellectual property document may be determined through, e.g., a scanned or typed SKU, model number and/or a manufacturer batch number.

Optionally, information regarding attributes and attribute types can be exported or otherwise provided for use in connection with another entity that has a separate collection of intellectual property documents. Hence, according to one or more embodiments of the present invention, a company may send its attribute data to an outside IP boutique for use in connection with the IP boutique's intellectual property documents.

Optionally, attributes may be assigned to one or more intellectual property documents within a project grouping, individually and/or as a group. As a further option, an intellectual property document may be included in more than one project.

One or more embodiments of the present invention provide for utilizing the attributes as a filter. For example, the user could filter the intellectual property documents and view all documents that have a specified attribute or attribute(s). Filtration utilizing attributes could be used, for example, with searching, retrieving, reporting and/or viewing. Optionally, filtration could utilize one or a combination of: (i) attribute content; (ii) type of attribute; (iii) sub-types of attribute types; (iv) content of a field in the intellectual property document; (v) type of a field in the intellectual property document; and/or (vi) information derived from one or more of the foregoing, e.g., current owner of record. Optionally, where attributes are stored as metadata, the metadata can be searched to determine the intellectual property document(s) having specified attributes.

The determination of intellectual property documents included in a report generated using attributes and/or attribute types as a filter can be very flexible. One or more of the attributes and/or attribute types associated with the subjects of a report may be included as or the basis for information in the report. For example, a report could count the number of trademarks owned by a company for each of several products or service lines.

In accordance with one or more embodiments of the present invention, the attributes may be provided in a hierarchy structure with attributes, sub-attributes, sub-sub-attributes and so forth to create a tree structure. An intellectual property document or file may be associated or tagged with anyone or more of these attributes and sub- or sub-sub-attributes. At the time of association or tagging, the intellectual property document or file is simultaneously or automatically associated or tagged with all of the attributes that are at a level higher than the particular attribute or attributes with which the intellectual property document or file is associated or tagged. In other words, the intellectual property document or file adopts or inherits the tag or associated profile of the attribute or attributes with which it is associated or tagged. In this manner, all of the attributes that otherwise would have been selected in a step-by-step manner may be assigned simultaneously and automatically by tagging the intellectual property document or file with not only the selected attribute(s), but all of the other attributes that are at a level higher than the particular attribute(s) with which the document has been associated.

The following provides an example use of one or more embodiments of the present invention. Initially, ABC Corp. decides to intake the intellectual property portfolio of a company it acquired, XYZ Corp. In this example, the XYZ Corp. intellectual property assets have not yet been assigned attributes. The ABC Corp. user performs a search for all patents and trademarks with XYZ Corp. as the current owner of record. This provides a list (for example) of 2,000 patents and 200 trademarks. The user sorts the list, first by type of intellectual property; the user then sorts the patents by class/sub-class, and the trademarks by International Class. The user then selects, drags and drops, into various projects, the sorted intellectual property. (The projects can be worked on by other users, and provide a convenient way to subdivide large numbers of documents.) By working through documents within a project, a user then may assign attributes to the intellectual property therein. For example, consider that one project has patents for copier technology. The user selects one or more patents in the project and chooses to assign attributes. The system prompts the user to provide an attribute type, e.g., product. Attribute types may be customized to include, in this example, Company, Division and Technology Type. Acceptable attributes for the selected attribute type(s) are displayed to the user, optionally, the user may type in text. In our example, the user selects:

| Attribute Type | Attribute |
| --- | --- |
| Company | ABC Corp. |
| Division | Electrical Division |
| Technology type | copier technology |
| Product | Model 123 |

This process is eventually performed for all of the documents in the project. Other searches and/or sorting can be performed if desired to better identify documents to be grouped into projects. Further, the intake can be performed on a periodic basis, for example when patents and registrations issue. Portions of the process may be automated if preferred. Optionally, a selection of a particular product (e.g., model number, component name) as a product type will cause the higher-level attribute types to inherit the appropriate attributes. For example, a selection of "Copier Technology" causes the "company" and "division" attribute types to inherit the attributes "ABC Corp." and "Electrical Division", respectively. Optionally, an intellectual document may have multiple attributes for an attribute type.

Continuing with the same example, a user later wants to retrieve a list of trademarks for a particular product. A search can be performed for such trademarks by, e.g., the attribute type "product" and the attribute of a specified model number; and the search will return, as results, the trademarks that were assigned to the specified model number. This search, filtered by an attribute, optionally may be combined with searching based on pre-existing or inherent document field contents, such as "country," to yield, e.g., a list of trademarks on a particular product sorted alphabetically and by country. As another example on the patent side, a search for a particular product would yield a list of patents (if any) relevant to the product.

Similarly, an intake can be performed on copyrights. Optionally, the copyright information is linked to an electronic copy of the copyright document. The user can retrieve a list of ingested copyrights, e.g., for a particular product. Documents and/or electronic representations of information relating to other intellectual property are optionally included in the system. For example, trade secret-related information may be reflected in documents specifying treatment of building access, etc.; technical data rights may be reflected in licenses; contracts may be reflected in licenses, non-disclosure agreements, memoranda of understanding, joint development agreements, joint venture agreements, etc.

The use of the optional multiple-layer attributes permits a user to search, retrieve, or otherwise access one or more intellectual property documents via one or more attributes within the multiple layers. Similarly, by accessing the document(s), the user can easily determine each attribute within the multiple layers. For example, the user accessing a user interface patent assigned the attribute "Model 123" for the attribute type "Product" can determine the remaining attributes, e.g., "copier technology, "Electrical Division", and "ABC Corp." According to one or more embodiments of the present invention, an intellectual property document may be assigned to one or more sets of attributes. For example, the just-mentioned user interface patent may optionally be assigned an additional attribute "Model 456" which inherits the attributes "telephone technology", "Communications Division" and "ABC Corp." for the respective attribute types of "Technology type," "Division," and "Company." A list of intellectual property corresponding to one or more specified attributes may be generated.

Claim charts can be generated that can be linked to other information in various ways.

According to one or more aspects of the present invention, tools can be used to automate, at least partially, the generation of claim charts. Once the charts are generated, they can be organized, sorted, and or used in connection with reports. Moreover, a library of claim charts can themselves be analyzed. Optional tools can be provided to query, search, sort, and issue reports based on multiple claim charts. Furthermore, the claim charts can themselves be tagged as previously described, so that the analysis can accommodate user specifications.

One or more aspects of the present invention provide for analysis in comparison to an intellectual property, e.g., a claim chart of infringement analysis in relation to a patent, trademark or copyright. The types of charts provided are appropriate to the underlying intellectual property. For example, claim charts are provided for patents, likelihood of confusion factors are provided for trademarks, and constituent original elements are provided for copyrights.

Within each category of intellectual property, various types of analyses may be provided. For example, where the intellectual property is a patent, types of analysis include, e.g., non-infringement chart, invalidity claim chart, freedom to operate, product coverage claim chart, and general claim construction. Where the intellectual property is a trademark, types of analyses might include, e.g., likelihood of confusion, and confusing similarity. Where the intellectual property is a copyright, types of analyses might include, e.g., infringement, and derivative work analysis. Other types of intellectual property analyses may be used, or may be referred to by other names. Generally, the analysis compares a selected intellectual property (e.g., a patent or patent claims, trademark, or copyrighted work) to a target, e.g., other documents and/or products, typically to determine validity, scope, and/or coverage by the specified intellectual property, optionally vis-à-vis the product(s).

Analyses can be displayed, printed, or otherwise presented to the user in one or more representations. According to one or more embodiments of the present invention, a representation of an analysis as a chart is static. Alternatively, a representation of an analysis as a chart is dynamic, where one or more rows, columns, or cells in the chart are selectable to open an additional window or screen with information related to the selected cell. Optionally, the representation includes various items embedded therein. The embedded items optionally may include, e.g., thumbnails, hyper links, a reference to a URL, a reference to an other file, user-provided text, etc. Selecting the embedded item optionally results in opening or linking to the item. The system optionally determines the type of the item and begins execution of the related application, e.g., the system opens a Powerpoint® item in the Powerpoint® application.

Optionally, the present invention provides for automatic and/or semi-automatic evaluation of the intellectual property in question. Consider, for example, that a user selects a trademark infringement analysis, together with the trademark (the intellectual property document) in comparison to an alleged infringing trademark. The trademark infringement analysis may be provided as a chart with, for example, an enumeration of the likelihood of confusion factors, prepopulated where possible with information from the intellectual property document and information gathered regarding the alleged infringing trademark. The user can then be prompted for remaining information and any decisions to be made, e.g., degree of similarity of the trademarks.

Or, consider, for example, that a user selects a patent invalidity analysis. The user is prompted for the patent to be analyzed, and is prompted where necessary to populate the chart with an element-by-element claim language and/or relevant prior art analyses. Where appropriate, the user is prompted for a response, e.g., "yes," "no," or "possible" for a claim element comparison. The user optionally may interact with the system to insert other information, text, files, etc., into the analysis.

One or more embodiments of the present invention provides for an automatic or semi-automatic overall analysis encompassing the element or factor analysis. For example, where a patent claim element-by-element infringement analysis indicates that each element is covered (e.g., a "yes"), then the system determines that the patent being analyzed is infringed by the product under consideration. As other examples, the system can provide an overall analysis by claim and/or by intellectual property, e.g., that the patent being analyzed covers the product, that the patent being analyzed is invalid, that the trademark being analyzed is infringed (or not infringed) by the trademark under consideration, or that the copyright being considered is not infringed by a work under consideration. Aspects of the present invention take into consideration elements in a base claim, when performing an overall analysis.

Optionally, claim language is automatically populated in a chart for patent analysis. The patent claims are evaluated to determine claim elements, which are then populated throughout the chart. Optionally, the user can refine the previously determined claim elements, e.g., by collapsing multiple elements ("concatenating") and/or by expanding an element into multiple elements.

One or more optional embodiments of the present invention accommodate components of claims that are not in standard format. Some patent claims include, e.g., chemical equations, formulas, mathematical equations or other information that is not in the same format as the remainder of the claim and/or can require a different application program to display. Optionally, the present invention provides a concise representation of the different format information, e.g., a thumbnail, a link, etc. Optionally, the present invention determines the proper program for handling the different format of the embedded information and displays the information together with the remainder of the claim.

One or more embodiments of the present invention support queries that users may want to pose regarding the charts, including for example:

How many patents (trademarks and/or copyrights) owned by our company are infringed by our competitor ABC Corp.?

Which of our patents have claims covering a specific product of our company?

Which of our patents have claims covering specific products of our competitors?

Which of our patents do not have claims covering any current product?

Who is potentially infringing our patents/trademarks/copyrights? In which technologies or services? Covering which products/services/models, and/or components?

How many of our products/services at the concept/design/manufacturing/sales stage are covered and protected by our patents/trademarks/copyrights/trade secrets?

Do the claims of our patent application(s) prepared and filed at the conception of our invention(s) cover and protect the products/services developed and marketed under those inventions? If not, how can we change the scope of our claims to better support the product/service?

How many of our products/services at the concept/design/manufacturing/sales stage are cleared of known third party intellectual property rights?

How many of our current products/services on the market face potential infringement claims from third party intellectual property owners?

How did we design around a particular patent or set of patents for our products/services?(e.g., based on answers to "do our competitor's patents cover his products"?)

How many patents/trademarks/copyrights/trade secrets do we have in a particular technology?

How many patents/trademarks/copyrights/trade secrets do our competitors have in a particular technology?

How many patents/copyrights/trademarks do we have that are not currently being used?

Who do we license intellectual property from? Which intellectual property? Under what types of terms and conditions? Are we in compliance with the terms and conditions of the license agreements?

Who licenses our intellectual property? Under what types of terms and conditions? Which intellectual properties are licensed? Are the terms and conditions of the license agreement satisfied by the licensees? How much license royalty revenue is being generated by our intellectual property?

From whom do our competitors license their patents/trademarks/copyrights/trade secrets?

How many of our patents have been annotated or claim charted?

How many prior art references did our invalidity claim charts cite?

How many of our patents are invalid?

How many of our competitors' patents in a particular product area are invalid?

Which of our patents are invalid?

How many patents have more than one invalidity claim chart?

As described previously, one or more aspects of the present invention optionally provide for grouping intellectual property documents within a hierarchy. The hierarchy can be presented as, e.g., one or more enterprise level trees. An appropriate hierarchy of patents or other intellectual property reflects corporate divisions, technologies, products and/or services within the company (or its competitors). However, optionally, a hierarchy can be customized by a user, such as to reflect other logical divisions.

The intellectual property documents that have been assigned a position within the hierarchy inherit the context of their place within the hierarchy. Because a particular intellectual property document may be included in more than one place in the hierarchy, it is useful to track the contexts of documents logically (or physically) separate from the intellectual property document. Hence, each intellectual property document may have its usual content, and tags that reflect hierarchy context.

An intellectual property analysis, or a detail within the analysis, may reference one or more documents or files external to the system. For example, an analysis may reference a white paper published on the Internet. According to one or more embodiments of the present invention, the system stores a copy of the external reference. In this manner, a current snapshot is created of a transient file. The stored copy of the external reference may be referenced by more than one analysis. Hence, the stored external reference may have tags that reflect context.

According to one or more embodiments of the present invention, context is provided by tagging associated with the document. Context can be inherited from an intellectual property document, reflecting characteristics of placement within the hierarchy, e.g., an enterprise level tree. Context can also be created by relating one or more intellectual property documents and/or one or more external references within an analysis; this context reflects the analysis.

Context can be stored, e.g., by tags such as in metadata, and/or by other searchable/queryable indices. If the context is stored, the context itself is searchable. Optionally, the context, e.g., a tag, is associated with a pointer or other reference to the relevant annotation within the analysis, the intellectual property document, and/or the stored external reference.

Because the tags storing the context are searchable, the available types of searches are readily defined by the tags. Hence, the analysis context as well as the hierarchical context is searchable. For example, the user can format a query reflecting one or more hierarchy context (e.g., particular division within the company) and analysis context (e.g., target of analysis, invalid patents).

Optionally, the tags are stored with versions, to enable a user to trace a history.

In accordance with one or more aspects of the present invention, an analysis related to one or more particular intellectual property documents can be initiated by, e.g., selecting the intellectual property documents. According to one or more embodiments of the present invention, the user interacts with the system to indicate that an analysis based on the type of intellectual property document (e.g., a claim chart for a patent) is to be created, and to determine the type of chart (e.g., an infringement analysis claim chart).

The analysis, such as a claim chart, may be represented in any of several convenient displays. According to one or more embodiments, the analysis is represented as a chart comprising several windows within a frame, or several selectable items within a frame.

Analysis context is initially determined responsive to a user assigning values and relations to a particular unit of an analysis. For example, a representation of a claim chart would present several cells to be assigned values and/or to be related to intellectual property documents and/or other documents. One or more cells within the analysis representation correspond to a unit of analysis. The cell comprises information identifying the particular analysis, information on the type of analysis (e.g., patent infringement), information appropriate to the analysis and the particular cell (e.g., conformance), the relevant intellectual property document and (optionally) portion of the intellectual property document, what it is compared to, together with the contextual information inherited from the intellectual property document.

The representation of an analysis, such as a claim chart, can be determined from the tags that relate to the particular analysis. According to one or more embodiments of the present invention, storage of representation itself, such as in a Word® document, is optional.

According to one or more embodiments of the present invention, for a claim chart, the context associated with an intellectual property unit of analysis for a claim chart of infringement analysis include: hierarchical context (e.g., patent number, company, division); and analysis context: for example, type of analysis, patent, patent claim, element of patent claim, reference, annotation, and conformance.

Reference is now made to FIG. 24 is an example representation of an analysis, in a static style. This particular example is appropriate for patent claims analysis. It includes a column for patent claims 24023, a column for elements of the claim language 24017, a column for annotations (e.g., comments relevant to the analysis) 24015, columns reflecting the conformance of the product under consideration to the claim element 24019, and an optional miscellaneous column 24051. In correspondence to the usual element-by-element analysis, the patent claims are divided into elements, e.g., preamble (24025, 24033, 24041, 24045), and subsequent elements (24027, 24029, 24031, 24035, 24037, 24041, 24043, 24047, 24049). The annotations column 24015 optionally includes, e.g., text, hyperlinks, thumbnails, image, playable audio, and/or playable video. The conformance column 24019 includes indications, in the present example, of "yes" 2409, "no" 24011, and "?" (unknown or possible) 24013. The optional miscellaneous column 24051 contains attachments and references, e.g., hyperlinks, URLs, paths, etc., locally or networked, to any kind of digital media.

According to one example embodiment of the present invention, this analysis chart is generated by selecting the patent and indicating that, e.g., an invalidity analysis is desired. A unique analysis identifier may be assigned to the particular analysis. Typically, the patent is selected from a hierarchy such as an enterprise tree. Optionally, the context includes the intellectual property identifier (e.g., patent number). The hierarchy context is inherited by the analysis elements. The analysis context of each unit of analysis may be assigned through interaction with the user: for example, type of analysis, patent, patent claim, patent claim element, annotation (if applicable), conformance (if applicable), and miscellaneous information (if applicable). The claim number, claim language and claim elements optionally initially default, e.g., to an automatic insertion by the system of the content of the claims of the selected patent.

FIG. 25 is an example of a claim chart corresponding to FIG. 24, in a dynamic style, where the cells of the chart open windows or screens. The analysis includes a column for patent claims 25023, a column for elements of the claim language 25017, a column for the comparison object (information representing product, claims, etc.) to which the intellectual property is being compared 25021, a column for annotations (e.g., comments relevant to the analysis) 25015, columns (also referred to as "analysis indications") reflecting the conformance of the product under consideration to the claim element 25019, and an optional attachment/reference column 25053. In correspondence to the usual element-by-element analysis, the patent claims are divided into, e.g., preamble (25025, 25033, 25041, 25045), and elements (25027, 25029, 25031, 25035, 25037, 25041, 25043, 25047, 25049). The annotations column 25015 includes, e.g., text, hyperlinks, thumbnails, image, playable audio, and/or playable video. The conformance column 25019 (referred to as "analysis indications") includes indications (also referred to as "legal analysis"), in the present example, for "yes" 2509, "no" 25011, and "?" (unknown or possible) 25013. The optional attachment/reference column 25053 contains attachments and references, e.g., hyperlinks, URLs, paths, etc., locally or networked, to any kind of digital media. Hierarchy context and analysis context is assigned is described further. A tag representing the comparison object is included as the analysis context. Selection of a particular row, column, or cell optionally opens a new window or screen for the selected row, column or cell.

According to one or more embodiments of the present invention, one or more features may determine additional information and add it to the chart. Additional information may be determined automatically, or with manual intervention. For example, claim dependencies may be determined and added to a patent claim chart. FIG. 26 is an example of a claim chart corresponding to FIG. 24, including an example of a dependencies feature. Here, the dependencies feature provides an indication of whether the claim is independent, dependent, and/or multiply dependent, as well as the claim it depends from. It includes a column for patent claims 26023, a column for elements of the claim language 26017, a column for annotations (e.g., comments relevant to the analysis) 26015, columns reflecting the conformance of the product under consideration to the claim element 26019, and a column for information representative of the object being compared to the intellectual property 26021. The patent claims are divided into, e.g., preamble (26025, 26033, 26041, 26045), and elements (26027, 26029, 26031, 26035, 26037, 26041, 26043, 26047, 26049). The annotations column 26015 includes, e.g., text, hyperlinks, thumbnails, image, playable audio, and/or playable video. The conformance column 26019 includes indications, in the present example, for "yes" 2609, "no" 26011, and "?" (unknown or possible) 26013. An optional miscellaneous column 26051 contains attachments and references, e.g., hyperlinks, URLs, paths, etc., locally or networked, to any kind of digital media.

In the above examples, charts have been presented in tabular format. Nevertheless, because the units of analysis are constructed from stored context, the format of the analysis does not necessarily need to be a tabular chart. According to one or more aspects of the present invention, an analysis may be presented in a non-tabular format. For example, FIG. 27 illustrates an alternative, multiple-window view or screen corresponding to a chart. A first analyzed element, e.g., the claim(s) of a patent, a trademark, or a copyright constituent element, is displayed in a first window 2701. A second window 2705 provides a display of the object of the analysis, e.g., a product being analyzed for patent coverage, a trademark being analyzed for confusing similarity, or a potentially infringing work. A third window 2703 provides a display of, e.g., an annotation to be entered relating to the analyzed element and/or the analyzed object. In the present example, a fourth window 2707 provides an optional display of the chart or other open document, optionally with tag represented in this example as selectable tabs 2709, 2711, 2713, 2715, commands and/or links to further information. Tabs, commands and/or links may include information associated with the chart or other open document regarding, e.g., attributes, conformance, etc.

According to one or more aspects of the present invention, a chart includes one or more tags of information, optionally specific to one or more types of charts. According to one or more aspects of the present invention, tags associated with the chart further may be associated with an intellectual property document in combination with one or more other tags. For example, a patent chart may be associated with an infringement analysis that is tagged to a hierarchy context, e.g., a particular division of a company, to a competitor company, and/or to a competitor's product, etc. Optionally, the tags associated with a chart may be populated by being assigned to an enterprise tree structure and inheriting the values of the tree structure. Optionally, tags are specific to a type of chart, that is, an analysis context, e.g., indication of patent number, indication of type of chart, indication of product. According to at least one aspect of the present invention, one or more tags are searchable, and/or may be used for sorting charts, organizing charts, reporting charts, and querying charges. Optionally, various search and/or report commands are provided to navigate charts and provide reports. The tags for the chart may be presented in any convenient format, for example as illustrated in FIG. 27.

Reference is now made to FIG. 28, providing an example of a user interface 2800 including an intellectual property document tree 2807 and an intellectual property analysis application 2805, according to one or more embodiments of the present invention. According to one or more aspects of the present invention, the patent or other intellectual property to be analyzed is located, for example prior to performing the analysis. In the present example, patents relevant to a particular corporation have been stored in a document tree 2803. Sub-trees 2801 optionally are included. The document tree reflects an enterprise hierarchy, in this example, General Electric, and divisions thereof. A portion of the document tree can be expanded to reveal further subdivisions, or finally, a particular intellectual property document. In the present example, once the intellectual property document is selected, the system interacts with the user to determine whether the document should be analyzed 2813.

Reference is now made to FIG. 29, providing an example of a user interface 2900 including an intellectual property document tree 2907 and an intellectual property analysis application 2905, according to one or more embodiments of the present invention. According to one or more aspects of the present invention, the patent or other intellectual property to be analyzed is located, for example prior to performing the analysis. In the present example, patents relevant to a particular corporation have been stored in a document tree 2903. Sub-trees 2901 optionally are included. The user in this case has drilled down to a particular intellectual property document 2913. The selected document includes the context determined by its position in the hierarchy. This example user interface also includes an intellectual property organizer tree 2909, providing a file structure 2916 for temporary storage of pointers to patents. This is useful, for example, to structure projects comprising patents intended for intake into the hierarchy structure; when the patents or other intellectual property documents are positioned in one or more places of the hierarchy, they are assigned the context of the position(s). Also provided in this example user interface is an explorer 2911 for storing user folders, files, etc.

Reference is now made to FIG. 30, providing an example of a user interface 3000 including an intellectual property analysis application 3005, according to one or more embodiments of the present invention. Here, the user has located a particular patent 3009 within a subdivision 3001 of the document tree 3003. This particular instance of the intellectual property document has a hierarchical context since it is within the hierarchy. The system interacts with the user to determine what actions to perform on the selected document, e.g., "analyze". Together with the analysis, the system will assign analysis context to the particular instance of the intellectual property document. According to one or more aspects of the present invention, a synopsis of the selected document is displayed in the synopsis window 3007. In the present example, the display includes the abstract of the patent 3011; and links to fields within the patent 3013 within the patent itself, such as inventor, assignee, classification, background/brief summary, description of invention, claims, description of drawings, and drawings/images/figures. Optionally, the synopsis includes information obtained from other sources, e.g., forward references, and assignment detail information.

Reference is now made to FIG. 31, providing an example of a user interface 3101 including an intellectual property document tree 3112 and an intellectual property analysis application 3115, according to one or more embodiments of the present invention. The user interface displays the intellectual property analysis 3133. In the present example, the analysis provides a claim analysis chart. The analysis 3133 includes columns for claim number 3127, claim language 3129, reference 3131 (e.g., what the intellectual property is being compared to), an indication of infringement 3135 (or indication of other conformance), and optional annotations 3137. The user interface includes references to alternative intellectual property applications, for example, an intellectual property organizer 3113, an intellectual property licensing application 3117, a docketing application 3119, an automated prosecution application 3121, an automated filing application 3123, and an automated annuity application 3127.

According to one or more aspects of the present invention, the patent or other intellectual property to be analyzed is located, for example prior to performing the analysis. In the present example, patents relevant to a particular corporation have been stored in a document tree 3111. Sub-trees 3109 optionally are included. A user may drill down through the document tree to a particular intellectual property document 3107, for example a patent. The user may select a standard or customized application 3105 to perform on the document, for example, analyze. In the present example, the user selects to analyze, and the system interacts with the user to determine the type of analysis 3103 based on the type of document, e.g., patent infringement or conformance analysis. Further, the system interacts with the user to determine the analysis. The analysis context and hierarchy context are assigned to the units of the analysis.

FIG. 32 illustrates an example block diagram of one or more embodiments of the system according to FIG. 1. Some elements have been omitted for brevity, although they may be included in one or more embodiments of the present invention. In this example, the system 111 includes an analysis application 3201. The analyses are stored, according to one or more embodiments of the present invention, in one or more opinions databases 123. The patents database 131, trademarks data base 125, and/or copyrights database 127 were previously described. According to one or more embodiments of the present invention, a reference between an analysis reference and one or more patents, trademarks, or copyrights in the databases 131, 125, 127 may be stored in an analysis references data base 3203. The analysis references may include details including, e.g., the particular analysis (e.g., claim chart) and/or elements in the analysis; the intellectual property forming the basis of the analysis (e.g., patent, trademark, copyright, trade secret, etc.); intellectual property or other documents (e.g., representations of products) which is the target of the analysis; and other documents, files, intellectual property, etc. referred to in the analysis. The format of the analysis reference may depend on the type of analysis.

For example, according to one or more embodiments of the present invention, an invalidity analysis reference may include an indication of analysis type (invalidity), claim chart, patent analyzed for invalidity, elements in the claim chart; and for each element, a target document (e.g., another patent) and location of interest in the target document, an indication of whether the claim language is met, and one or more user annotations (e.g. text, hyper links, pointers to other files). As another example, according to one or more embodiments of the present invention, a patent infringement analysis reference may include an indication of the analysis type (infringement), a particular claim chart, a patent analyzed for infringement, elements in the claim chart, and the target product analyzed for infringement; and for each element, an indication of the portion of the target, and any annotations. According to one or more embodiments of the present invention, the references may be utilized in connection, for example, with searching, sorting, reporting, analyzing over groups of analyses.

Reference is now made to FIGS. 36 and 37, illustrating an example user interface for creation or access of an intellectual property analysis 3603. FIG. 36 provides an alternative example of a user interface 3601. Here, the user 3605 is presented with a hierarchy 3615 within which intellectual property documents are assigned. A particular intellectual property document 3607 has been selected from the hierarchy 3615. The system interacts with the user to determine that the user wishes to analyze 3609 the selected document. The system further interacts with the user to determine the type of analysis 3611, and whether the user wishes to create a new analysis or to select an existing analysis 3613. Processing of the analysis continues as described, for example, above.

FIG. 37 provides an alternative example of a user interface 3701 illustrating an intellectual property analysis corresponding to FIG. 36. In this example, the analysis provides a representation of a validity claim chart for the selected document. Parts of the analysis that are displayed include, e.g., the claim number 3703, the claim language of the element 3705, the references 3707 (e.g., to an other document), the validity analysis 3709 for the element, and annotations for the element 3711.

The system may prompt the user for further details with regard to the element-by-element analysis. For example, if the type of analysis being performed is an infringement chart, there is an issue of whether there is infringement literally and/or under Doctrine of Equivalents. Accordingly, the system may prompt the user to indicate whether there would be infringement/coverage literally, and if not, by applying Doctrine of Equivalents. This may be implemented, for example, by providing another pop-up box that queries the user as to infringement by application of the Doctrine of Equivalents.

Optionally, if appropriate, the system may pre-determine portions of the analysis based on the analysis up to the point. For example, in an infringement analysis, it is known that a dependent claim is non-infringing if it depends from a claim (dependent or independent) which is itself non-infringing. No further analysis is necessary. One or more embodiments of the present system, performing an infringement analysis, determine the claims from which a dependent claim depends, and whether those claims are non-infringing, based on a summary of the element-by-element analysis. If a dependent claim is non-infringing due to its dependency, the system indicates that the entire dependent claim is non-infringing and indicates the basis for the determination. This indication can be displayed in any appropriate manner, e.g., an additional column or a pop-up box. The user optionally may analyze elements of the non-infringing dependent claim.

Reference is now made to FIG. 38, illustrating a user interface 3801 with an example summary report 3803 of intellectual property analyses. Here, the user has searched the system to determine the intellectual property analyses involving the particular patent. The system lists, optionally by type of analysis, each analysis 3805, the target of the analysis 3807, and the bottom-line analysis 3817. For an infringement chart 3819, the bottom-line analysis is whether or not the target of the analysis 3807 infringes; whereas for a validity claim chart 3821, the bottom-line analysis is whether or not the document forming the basis of the analysis is valid. The system can determine the bottom-line analysis 3817 from the per-element validity analysis (e.g., 3709) or infringement analysis in a particular analysis associated with the document forming the basis of the analysis. Where the particular analysis includes details such as infringement/coverage by Doctrine of Equivalents, the report optionally includes an indication of which patents are infringed by applying the Doctrine of Equivalents. Other identifying information can be included, e.g., creation date 3809, author 3811, update date 3813, and update author 3815. It is not necessary to access the document itself in order to determine the various analyses surrounding the document, and hence the relative strength of the document.

FIG. 21 is an illustration of a computer 58 used for implementing the computer processing in accordance with a computer-implemented embodiment of the present invention. The procedures described above may be presented in terms of program procedures executed on, for example, a computer or network of computers.

Viewed externally in FIG. 21, computer 48 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Alternatively, referring to FIG. 23, computer 58 may also include a CD ROM reader 95 and CD recorder 96, which are interconnected by a bus 97 along with other peripheral devices 98 supported by the bus structure and protocol. Bus 97 serves as the main information highway interconnecting other components of the computer. It is connected via an interface 99 to the computer 58.

FIG. 22 illustrates a block diagram of the internal hardware of the computer of FIG. 21. CPU 75 is the central processing unit of the system, performing calculations and logic operations required to execute a program. Read only memory (ROM) 76 and random access memory (RAM) 77 constitute the main memory of the computer.

Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices occurs using communications port 84.

In addition to the standard components of the computer, the computer may also include an interface 85, which allows for data input through the keyboard 86 or pointing device, such as a mouse 87.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the information system may include a general purpose computer, or a specially programmed special purpose computer. It may be implemented as a distributed computer system rather than a single computer. Similarly, a communications link may be World Wide Web, a modem over a POTS line, and/or any other method of communicating between computers and/or users. Moreover, the processing could be controlled by a software program on one or more computer system or processors, or could even be partially or wholly implemented in hardware.

This invention is not limited to particular types of intellectual property. It is intended for use with any type of intellectual property, e.g., patents, trademarks, trade secrets, designs, sui generis protection, copyrights, licenses, litigations, and/or other rights. Further, various aspects of one or more embodiments of the present invention are useful with documents including those not related to intellectual property.

Further, the invention is not limited to particular protocols for communication. Any appropriate communication protocol may be used.

The report may be developed in connection with HTML display format. Although HTML is the preferred display format, it is possible to utilize alternative display formats for displaying a report and obtaining user instructions. The invention has been discussed in connection with particular examples. However, the principles apply equally to other examples and/or realizations. Naturally, the relevant data may differ, as appropriate.

Further, this invention has been discussed in certain examples as if it is made available by a provider to a single customer with a single site. The invention may be used by numerous customers, if preferred. Also, the invention may be utilized by customers with multiple sites and/or agents and/or licensee-type arrangements.

This invention has been described in connection with example data formats, for example XML and USPTO defined XML. However, the invention may be used in connection with other data formats, structured and/or unstructured, unitary and/or distributed.

The system used in connection with the invention may rely on the integration of various components including, as appropriate and/or if desired, hardware and software servers, applications software, database engines, server area networks, firewall and SSL security, production back-up systems, and/or applications interface software. The configuration may be, preferably, network-based and optionally utilizes the Internet as an exemplary primary interface with the customer for information delivery.

The system may store collected information in a database. An appropriate database may be on a standard server, for example, a small Sun Sparc or other remote location. The database is optionally an MSQL, MYSQL, mini sequel server, or Oracle. Information is stored in the database, and optionally stored and backed up by a back-up server, periodically or a-periodically, for example, every night along with all other data in the servers that are behind the corporate firewall into a back-up storage facility. Back-up storage facility comprises, for example, one or more tape silos that are also used to back up the entire network every night. Data security and segregation of the various customers' data is advantageously maintained. The information, for example, will eventually get stored, for example, on a platform that may, for example be UNIX-based.

The various databases may be in, for example, a UNIX format, but other standard data formats may also be used. Windows NT, for example, is used, but other standard operating systems may also be used. Optionally, the various databases include a conversion system capable of receiving data in various standard formats.

From the user's perspective, according to some embodiments the user may access the public Internet or other suitable network and look at its specific information at any time from any location as long as it has Internet or other suitable access. For example, the user opens its standard web browser, goes to the address that is specified for its load data, and optionally fills out a user ID to log on, and a password to identify it as the specific user or the specific customer of that particular information.

Optionally, security of the networks is as tight as possible such that the data, not only customer data, but any information that is beyond the firewall is always protected against any kind of potential intrusion. The user, and, indeed, multiple users concurrently can look at the same information. Advantageously, having this system on the Internet enables users at various locations throughout the country or the world, to visit the same site at the same time and enter into a discussion or talk group as to what they are seeing, what it means, and maybe what they can do with that information.

A method for generating a claim construction analysis comprises providing, in a computer, one patent claim separated without manual intervention into analysis indications for each of claim elements that constitute the one patent claim;

generating a claim chart for the one patent claim, in which each of the analysis indications for the claim elements in the one patent claim is configured to indicate a legal analysis related to the patent claim element; and providing, in the computer without manual intervention and without reference to language in the patent claim, the analysis indications for the claim elements for the one patent claim as searchable tags.

The method can further comprise prompting the user to enter the legal analysis related to the claim element.

The legal analysis input by the user can further include a link to an attachment.

The method can further comprise interacting with the user to subdivide one of the claim elements into plural separate claim elements, each of which separately and independently have analysis indications.

The method can further comprise interacting with the user to concatenate two adjacent ones of the claim elements into a single claim element, the single claim element combining the analysis indications from the separate claim elements as a single analysis indication.

The method can further comprise inputting analysis indications in the one patent claim; and automatically without manual intervention applying the analysis indications tagged to the one patent claim to a dependent claim of the one patent claim.

The method can further comprise prompting the user to select a document to be used as a target of the analysis, copying the document to a document repository leaving an original of the document to be changed whereas the copied document is not changeable, and storing information indicating a source of the document used as the target.

The method can further comprise prompting the user to select a document to be used as a target of the analysis from a document repository, and to link the document in the document repository to one of the separate claim elements.

The method can further comprise generating a report listing only patents that have claims which have analysis indications, thereby listing only patents that have been claim charted.

A computer readable non-transitory storage medium can comprise executable instructions for performing the above method.

A computer apparatus configured to generate a claim construction analysis, comprises:

an input interface configured to receive a selection of a patent to be claim charted; and a computer processing unit in communication with the input interface, the computer processing unit being configured to provide one patent claim separated without manual intervention into analysis indications for each of claim elements that constitute the one patent claim;

generate, without manual intervention after receipt of the selection of the patent to be claim charted, a claim chart for each one patent claim in the selected patent, in which each of the analysis indications for the claim elements in the one patent claim is configured to indicate a legal analysis related to the patent claim element; and store, in the computer without manual intervention and without reference to language in the patent claim, the analysis indications for the claim elements for the one patent claim as searchable tags.

In the computer apparatus, the computer processing unit can be further configured to prompt the user to enter the legal analysis related to the claim element.

In the computer apparatus, wherein the legal analysis input by the user can further include a link to an attachment.

In the computer apparatus, the computer processing unit can be further configured to interact with the user to subdivide one of the claim elements into plural separate claim elements, each of which separately and independently have analysis indications.

In the computer apparatus, the computer processing unit can be further configured to interact with the user to concatenate two adjacent ones of the claim elements into a single claim element, the single claim element combining the analysis indications from the separate claim elements as a single analysis indication.

In the computer apparatus, the computer processing unit can be further configured to input analysis indications in the one patent claim; and automatically without manual intervention apply the analysis indications tagged to the one patent claim to a dependent claim of the one patent claim.

In the computer apparatus, the computer processing unit can be also configured to prompt the user to select a document to be used as a target of the analysis, copy the document to a document repository leaving an original of the document to be changed whereas the copied document is not changeable, and store information indicating a source of the document used as the target.

In the computer apparatus, the computer processing unit can be also configured to prompt the user to select a document to be used as a target of the analysis from a document repository, and to link the document in the document repository to one of the separate claim elements.

What is claimed is:

1. A method for generating a claim construction analysis, comprising:

providing, in a computer, one patent claim separated without manual intervention into analysis indications for each of claim elements that constitute the one patent claim;

generating a claim chart for the one patent claim, in which each of the analysis indications for the claim elements in the one patent claim is configured to indicate a legal analysis related to the patent claim element; and providing, in the computer without manual intervention and without reference to language in the patent claim, the analysis indications for the claim elements for the one patent claim as searchable tags.

2. The method of claim 1, further comprising prompting the user to enter the legal analysis related to the claim element.

3. The method of claim 1, wherein the legal analysis input by the user further includes a link to an attachment.

4. The method of claim 1, further comprising interacting with the user to subdivide one of the claim elements into plural separate claim elements, each of which separately and independently have analysis indications.

5. The method of claim 1, further comprising interacting with the user to concatenate two adjacent ones of the claim elements into a single claim element, the single claim element combining the analysis indications from the separate claim elements as a single analysis indication.

6. The method of claim 1, further comprising, inputting analysis indications in the one patent claim; and automatically without manual intervention applying the analysis indications tagged to the one patent claim to a dependent claim of the one patent claim.

7. The method of claim 1, further comprising prompting the user to select a document to be used as a target of the analysis, copying the document to a document repository leaving an original of the document to be changed whereas the copied document is not changeable, and storing information indicating a source of the document used as the target.

8. The method of claim 1, further comprising prompting the user to select a document to be used as a target of the analysis from a document repository, and to link the document in the document repository to one of the separate claim elements.

9. The method of claim 1, further comprising generating a report listing only patents that have claims which have analysis indications, thereby listing only patents that have been claim charted.

10. A computer readable non-transitory storage medium comprising executable instructions for performing the method of claim 1.

11. A computer apparatus configured to generate a claim construction analysis, comprising:
an input interface configured to receive a selection of a patent to be claim charted;
a computer processing unit in communication with the input interface, the computer processing unit being configured to
provide one patent claim separated without manual intervention into analysis indications for each of claim elements that constitute the one patent claim;
generate, without manual intervention after receipt of the selection of the patent to be claim charted, a claim chart for each one patent claim in the selected patent, in which each of the analysis indications for the claim elements in the one patent claim is configured to indicate a legal analysis related to the patent claim element; and
store, in the computer without manual intervention and without reference to language in the patent claim, the analysis indications for the claim elements for the one patent claim as searchable tags.

12. The computer apparatus of claim 11, wherein the computer processing unit is further configured to prompt the user to enter the legal analysis related to the claim element.

13. The computer apparatus of claim 11, wherein the legal analysis input by the user further includes a link to an attachment.

14. The computer apparatus of claim 11, wherein the computer processing unit is further configured to interact with the user to subdivide one of the claim elements into plural separate claim elements, each of which separately and independently have analysis indications.

15. The computer apparatus of claim 11, wherein the computer processing unit is further configured to interact with the user to concatenate two adjacent ones of the claim elements into a single claim element, the single claim element combining the analysis indications from the separate claim elements as a single analysis indication.

16. The computer apparatus of claim 11, the computer processing unit being further configured to
input analysis indications in the one patent claim; and
automatically without manual intervention apply the analysis indications tagged to the one patent claim to a dependent claim of the one patent claim.

17. The computer apparatus of claim 11, wherein the computer processing unit is also configured to prompt the user to select a document to be used as a target of the analysis, copy the document to a document repository leaving an original of the document to be changed whereas the copied document is not changeable, and store information indicating a source of the document used as the target.

18. The computer apparatus of claim 11, wherein the computer processing unit is also configured to prompt the user to select a document to be used as a target of the analysis from a document repository, and to link the document in the document repository to one of the separate claim elements.

* * * * *